United States Patent
Wippermann et al.

(10) Patent No.: US 10,606,152 B2
(45) Date of Patent: Mar. 31, 2020

(54) MULTI-APERTURE IMAGING DEVICE, IMAGING SYSTEM AND METHOD FOR CAPTURING AN OBJECT AREA

(71) Applicant: Fraunhofer-Gesellschaft zur Foerderung der angewandten Forschung e.V., Munich (DE)

(72) Inventors: Frank Wippermann, Meiningen (DE); Andreas Brueckner, Jena (DE); Andreas Braeuer, Schloeben (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 6 days.

(21) Appl. No.: 16/132,074

(22) Filed: Sep. 14, 2018

(65) Prior Publication Data
US 2019/0011809 A1    Jan. 10, 2019

Related U.S. Application Data

(63) Continuation of application No. PCT/EP2017/055329, filed on Mar. 10, 2017.

(30) Foreign Application Priority Data

Mar. 14, 2016  (DE) ........................ 10 2016 204 148

(51) Int. Cl.
| | |
|---|---|
| H04N 5/225 | (2006.01) |
| G03B 17/17 | (2006.01) |
| G03B 17/00 | (2006.01) |
| G02B 26/08 | (2006.01) |
| G03B 5/00 | (2006.01) |
| G03B 9/02 | (2006.01) |
| G03B 13/34 | (2006.01) |
| H04N 5/232 | (2006.01) |

(Continued)

(52) U.S. Cl.
CPC ......... *G03B 17/17* (2013.01); *G02B 26/0816* (2013.01); *G03B 5/00* (2013.01);
(Continued)

(58) Field of Classification Search
CPC . G03B 17/17; G03B 5/00; G03B 9/02; G03B 13/34; G03B 2205/0015;
(Continued)

(56) References Cited

U.S. PATENT DOCUMENTS

| | | |
|---|---|---|
| 6,992,699 B1 | 1/2006 | Vance et al. |
| 2007/0041723 A1 | 2/2007 | Gutierrez et al. |

(Continued)

FOREIGN PATENT DOCUMENTS

| | | |
|---|---|---|
| CN | 2662265 Y | 12/2004 |
| DE | 102013209246 A1 | 11/2014 |

(Continued)

*Primary Examiner* — Nhan T Tran
*Assistant Examiner* — Angel L Garces-Rivera
(74) *Attorney, Agent, or Firm* — Michael A. Glenn; Perkins Coie LLP

(57) ABSTRACT

Multi-aperture imaging device includes at least one image sensor, an array of juxtaposed optical channels, wherein each optical channel has optics for projecting at least one partial area of an object area on an image sensor area of the image sensor, and a beam deflector for deflecting an optical path of the optical channels in beam-deflecting areas of the beam deflector. The beam deflector is formed as an array of facets arranged along a line-extension direction of the array of optical channels. One facet is allocated to each optical channel. Each facet has a beam-deflecting area. A stray light suppressing structure is arranged between a first beam-deflecting area of a first facet and a second beam-deflecting area of a juxtaposed second facet, which is configured to reduce transition of stray light between the first beam-deflecting area and the second beam-deflecting area.

41 Claims, 48 Drawing Sheets

(51) Int. Cl.
*H04N 5/247* (2006.01)
*H04N 13/207* (2018.01)

(52) U.S. Cl.
CPC ............. *G03B 9/02* (2013.01); *G03B 13/34* (2013.01); *G03B 17/00* (2013.01); *H04N 5/2252* (2013.01); *H04N 5/2254* (2013.01); *H04N 5/2258* (2013.01); *H04N 5/23287* (2013.01); *H04N 5/247* (2013.01); *G03B 2205/0015* (2013.01); *H04N 13/207* (2018.05)

(58) Field of Classification Search
CPC ............. G03B 17/00; G02B 26/0816; H04N 5/23287; H04N 5/247; H04N 5/2252; H04N 5/2254; H04N 13/207; H04N 5/2258
See application file for complete search history.

(56) References Cited

U.S. PATENT DOCUMENTS

| | | |
|---|---|---|
| 2014/0055624 A1 | 2/2014 | Gaines et al. |
| 2015/0109468 A1* | 4/2015 | Laroia .................... G02B 13/02 348/208.6 |
| 2015/0318308 A1 | 11/2015 | Matsumoto |
| 2015/0373263 A1 | 12/2015 | Georgiev et al. |
| 2017/0111558 A1 | 4/2017 | Brueckner et al. |
| 2017/0118388 A1 | 4/2017 | Wippermann et al. |

FOREIGN PATENT DOCUMENTS

| | | |
|---|---|---|
| DE | 102014213371 B3 | 8/2015 |
| DE | 102014212104 A1 | 12/2015 |
| JP | S63-159588 U | 10/1988 |
| JP | H10-4540 A | 1/1998 |
| JP | 2000-227332 A | 8/2000 |
| JP | 2002-171430 A | 6/2002 |
| JP | 2004-279556 A | 10/2004 |
| JP | 2007-116361 A | 5/2007 |
| JP | 2008-180773 A | 8/2008 |
| JP | 2009-027311 A | 2/2009 |
| JP | 2011-239207 A | 11/2011 |
| KR | 10-2013-0030065 A | 3/2013 |
| TW | 201607317 A | 2/2016 |
| WO | 2005/041562 A1 | 5/2005 |
| WO | 2014/184055 A1 | 11/2014 |
| WO | 2015/015383 A2 | 2/2015 |

* cited by examiner

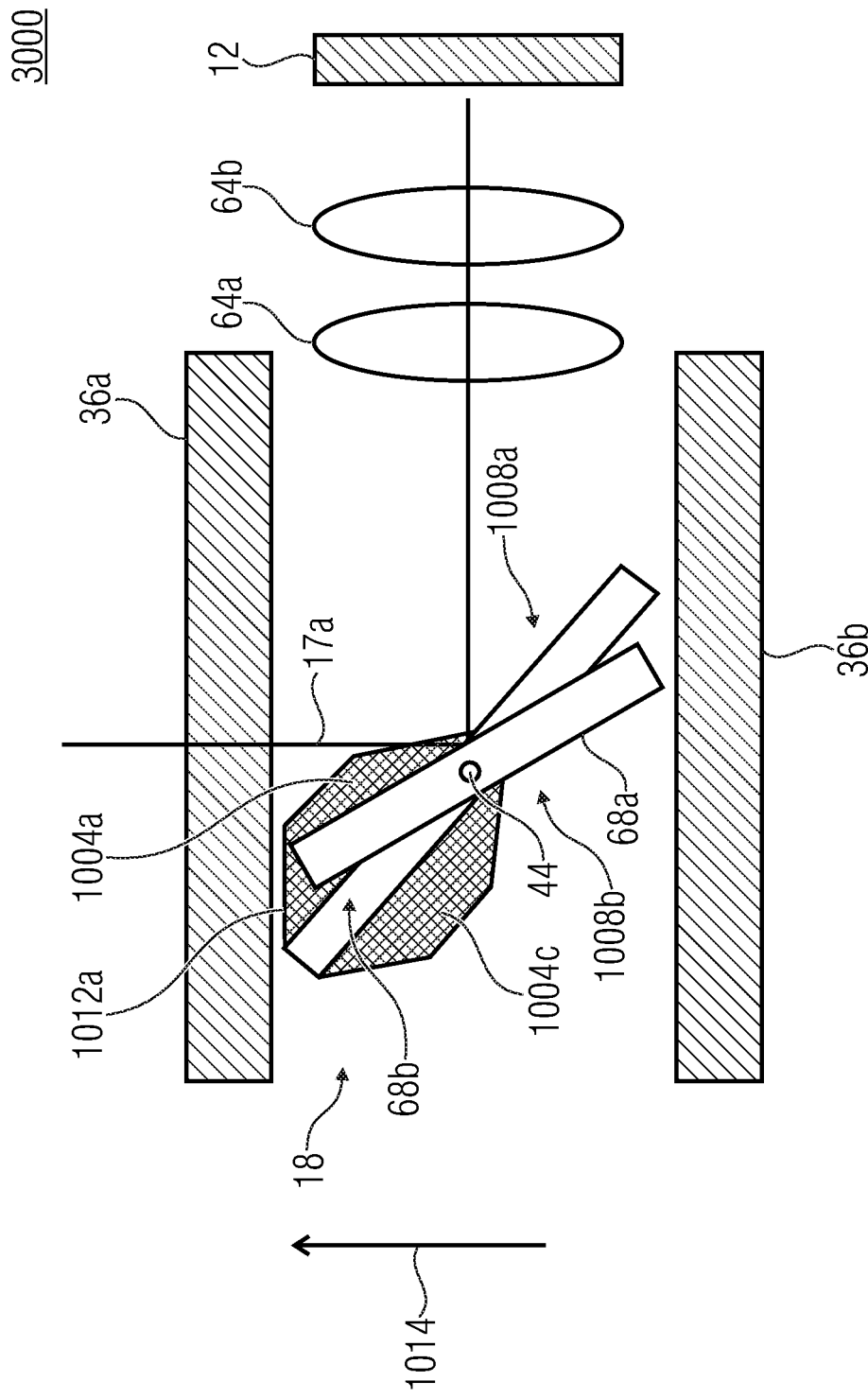

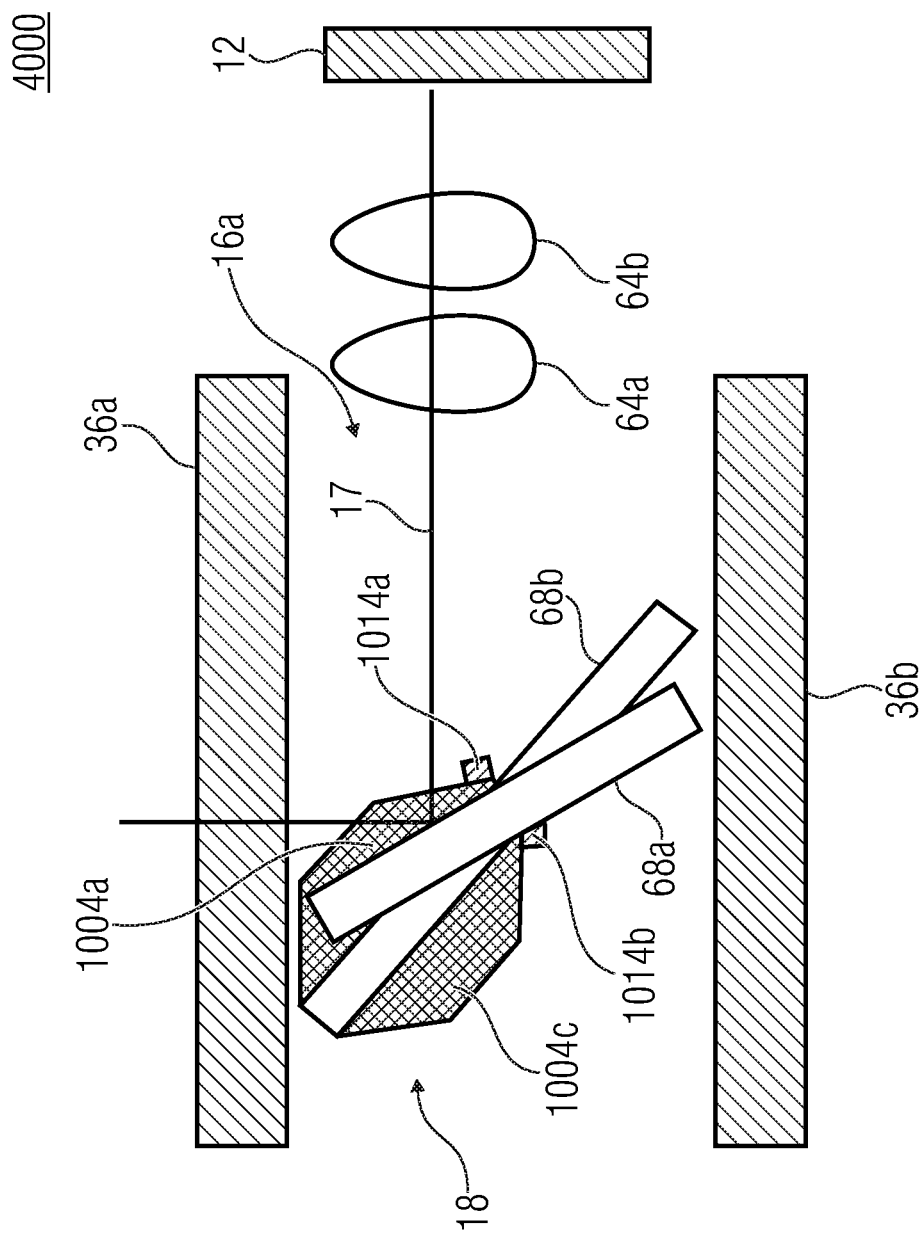

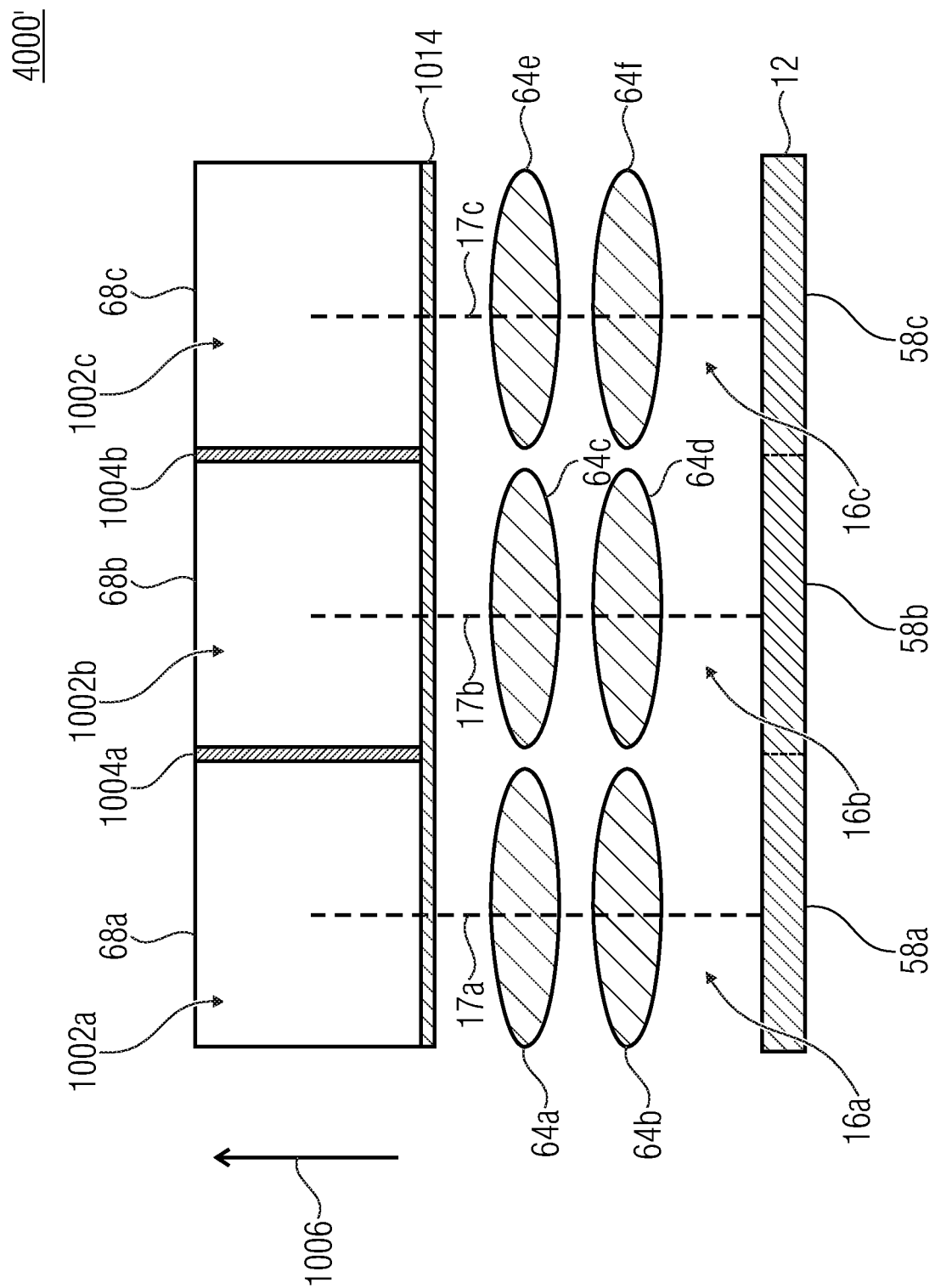

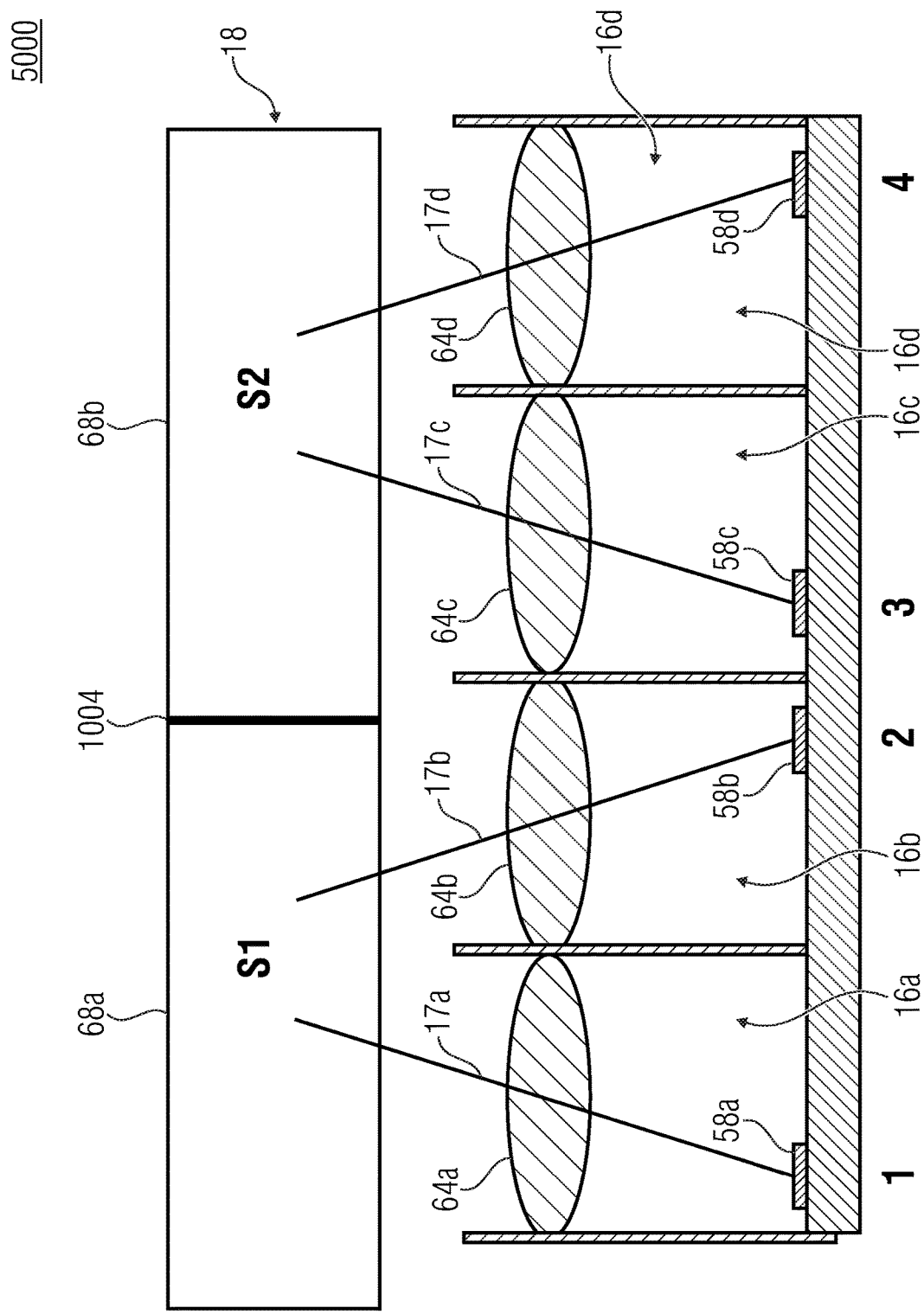

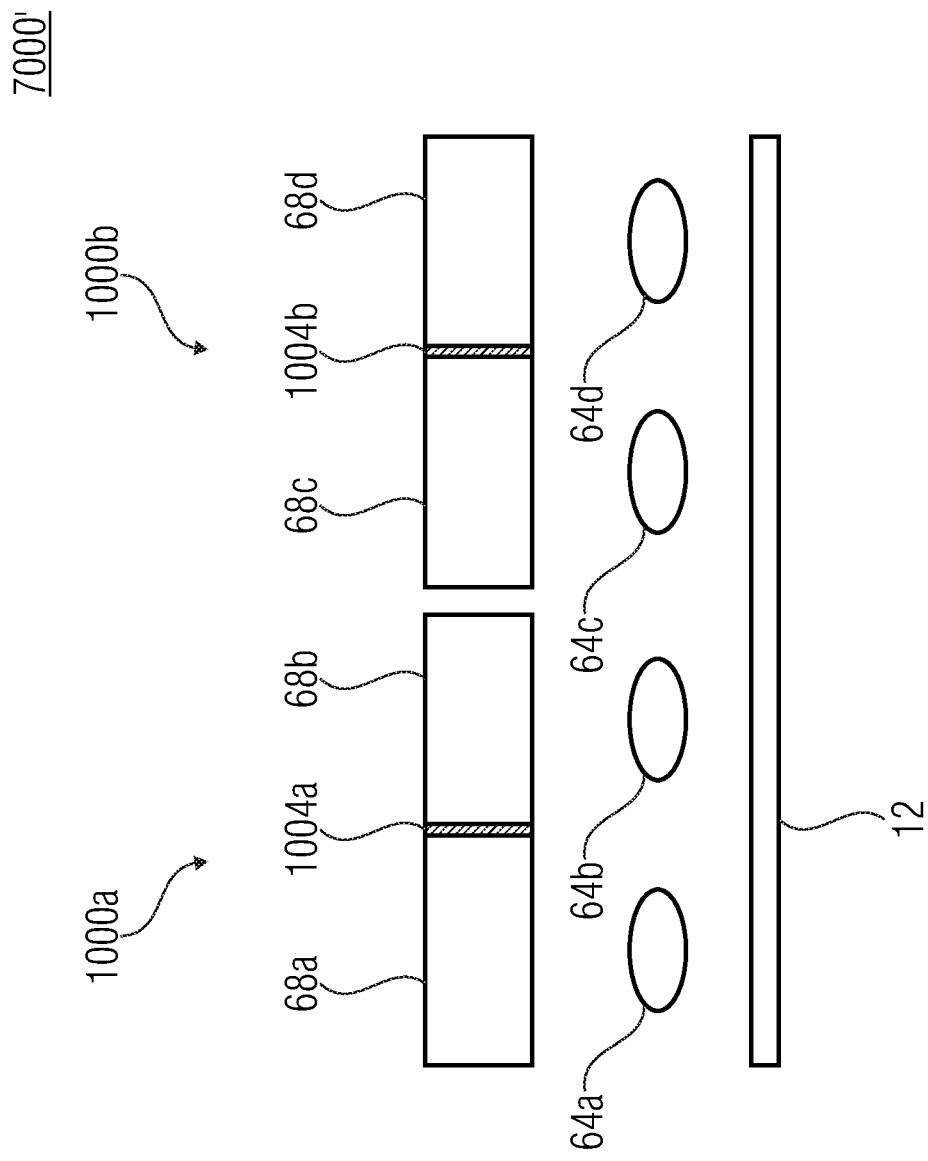

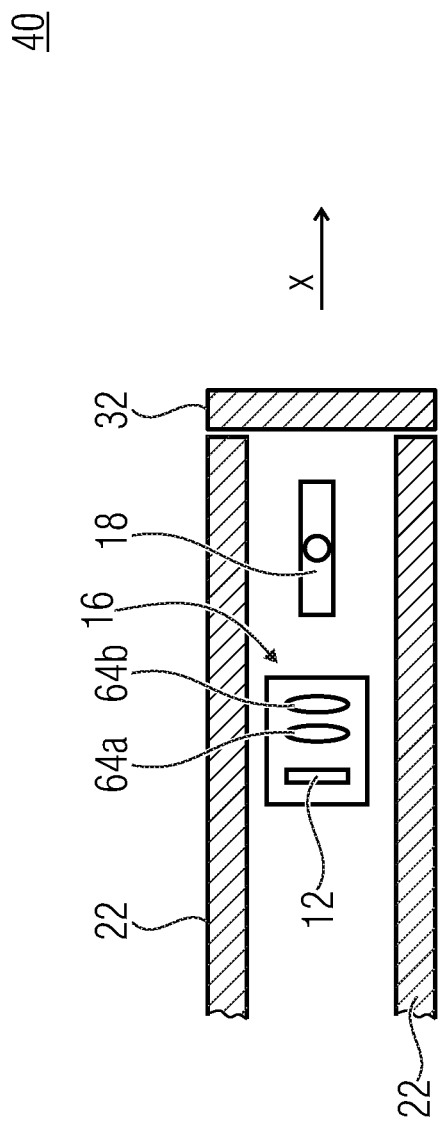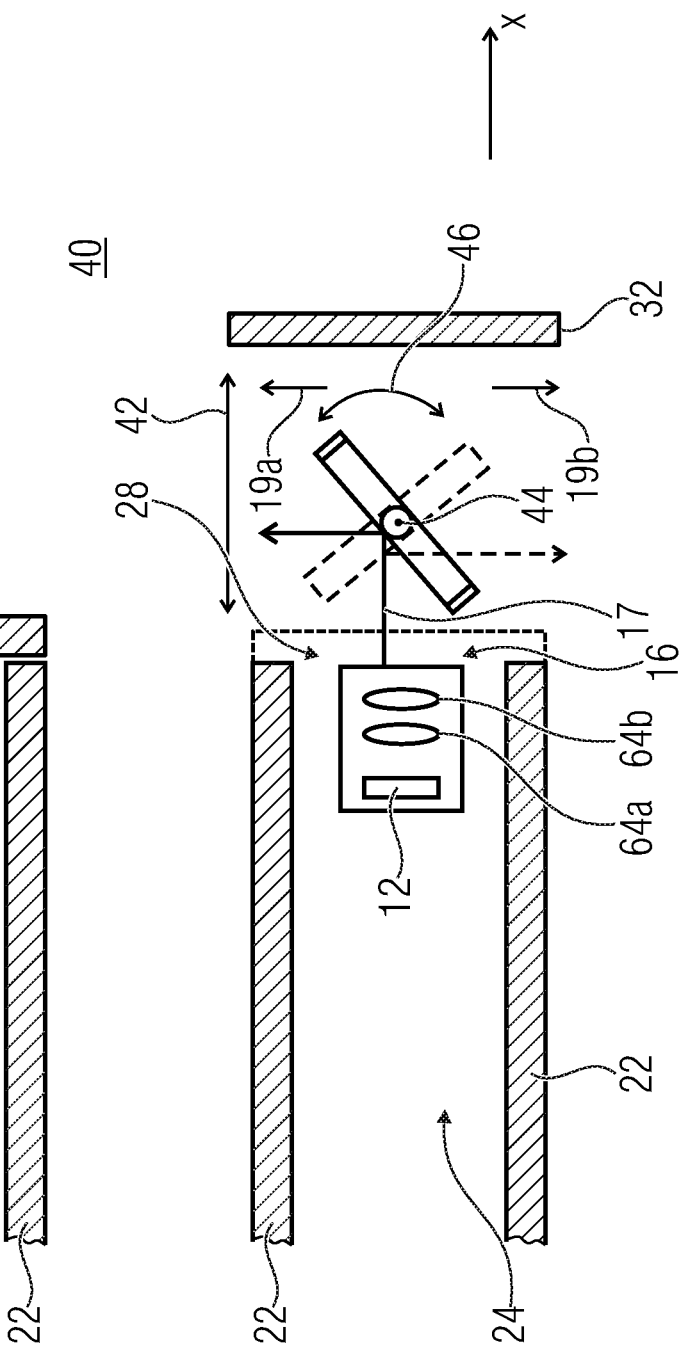

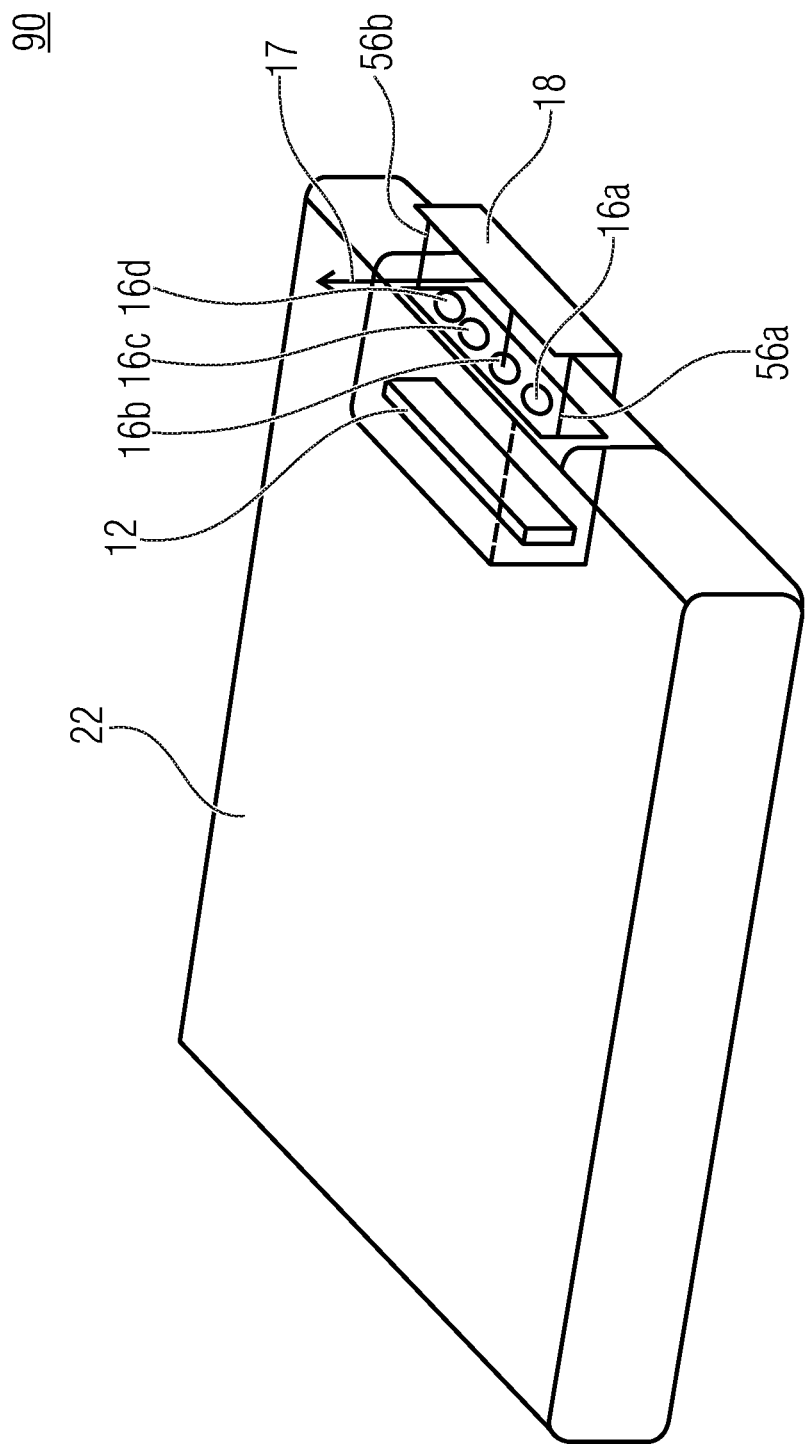

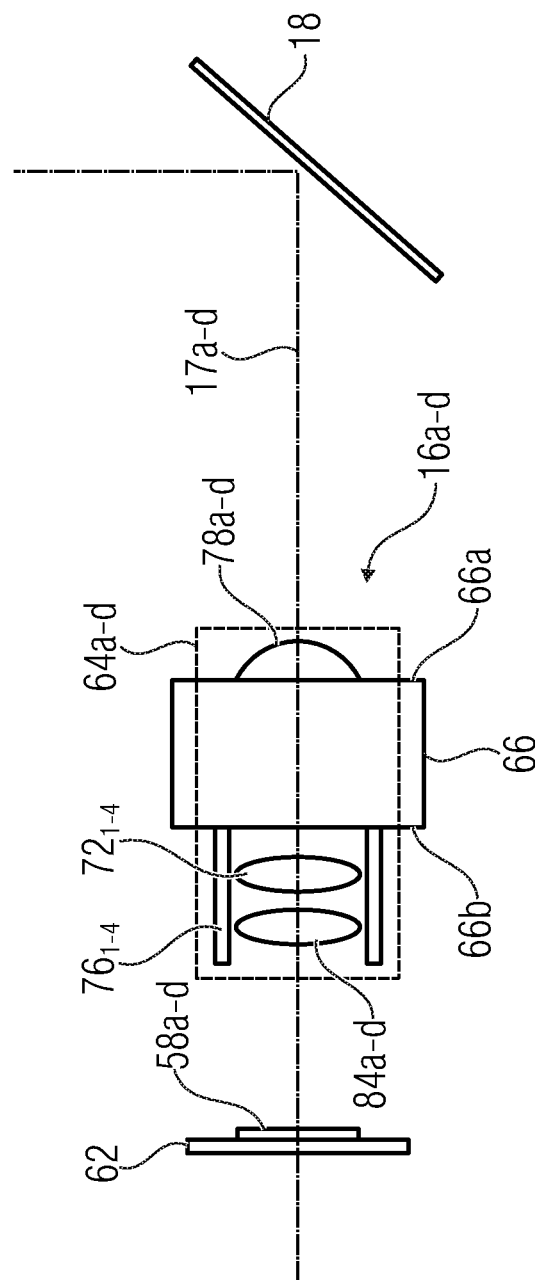

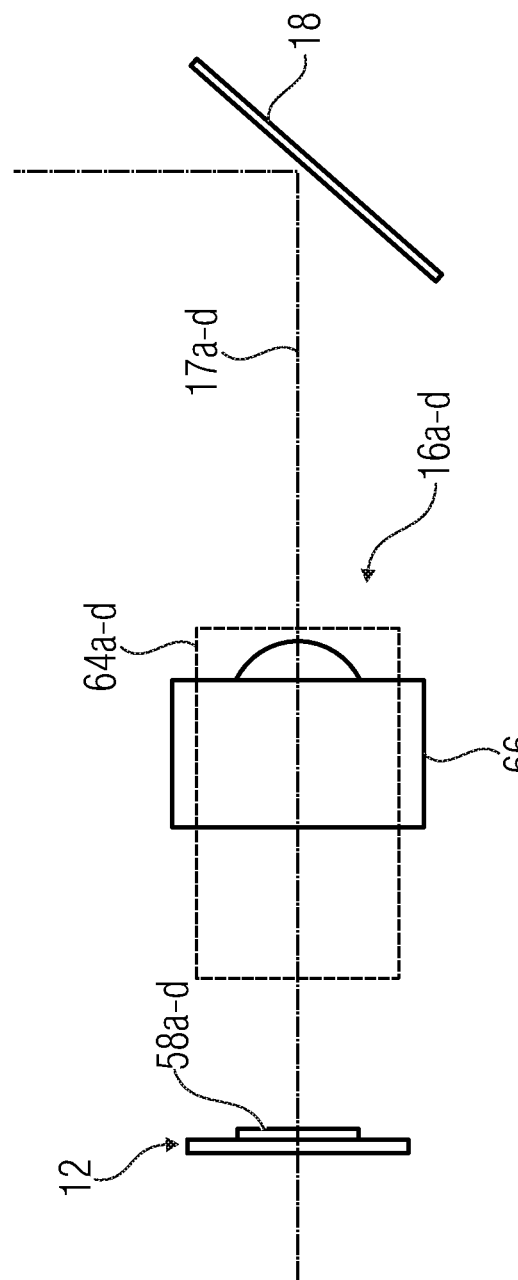

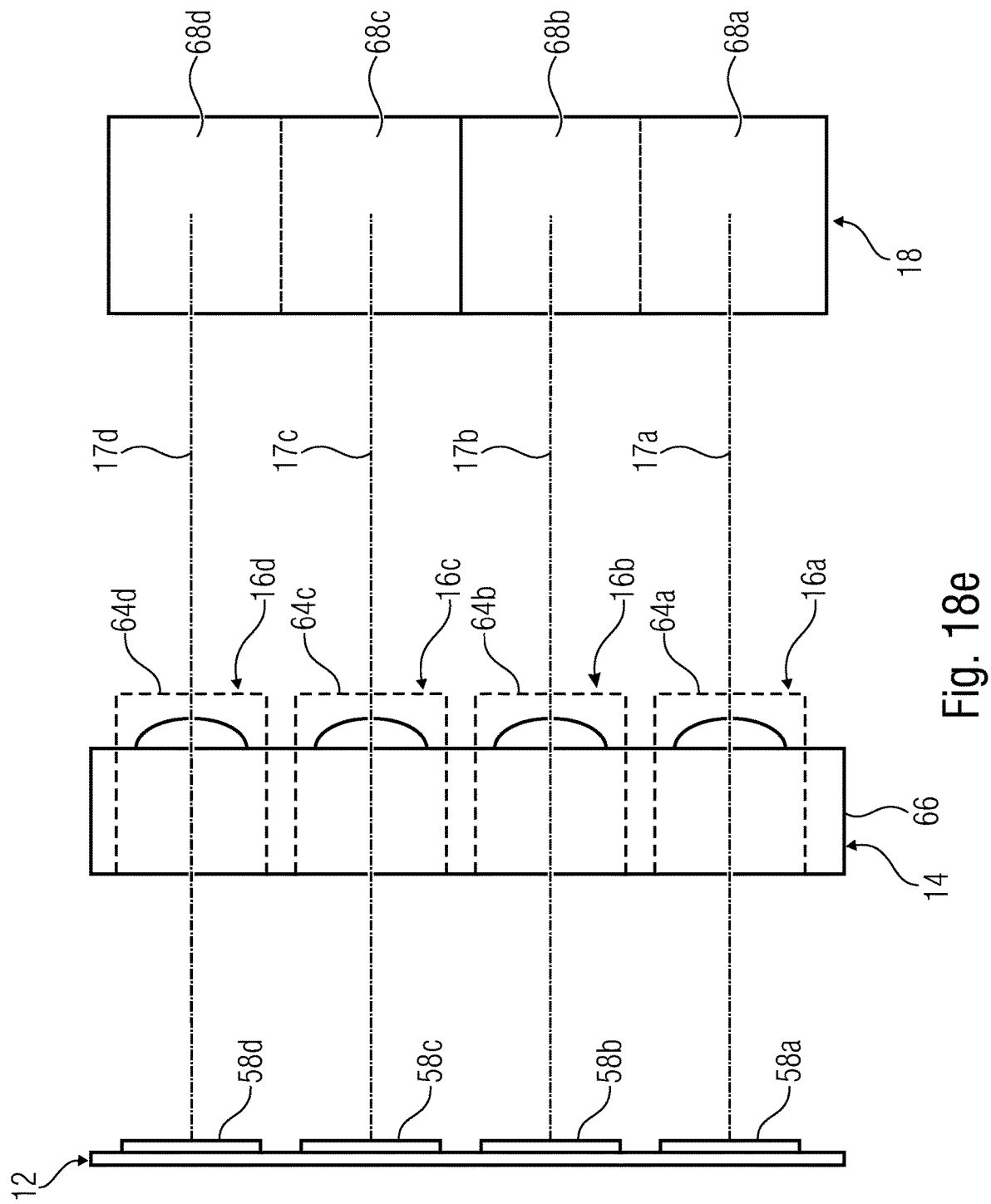

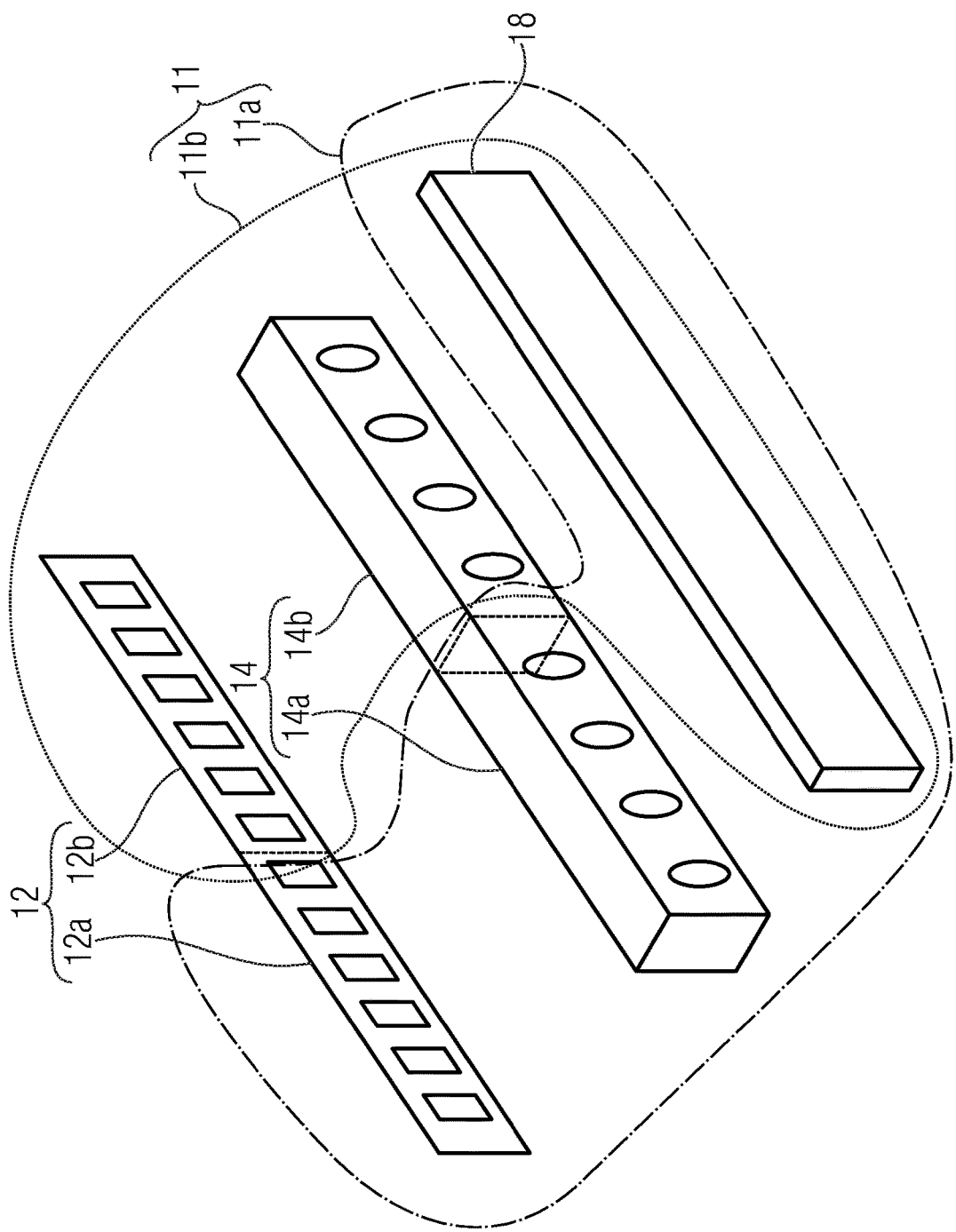

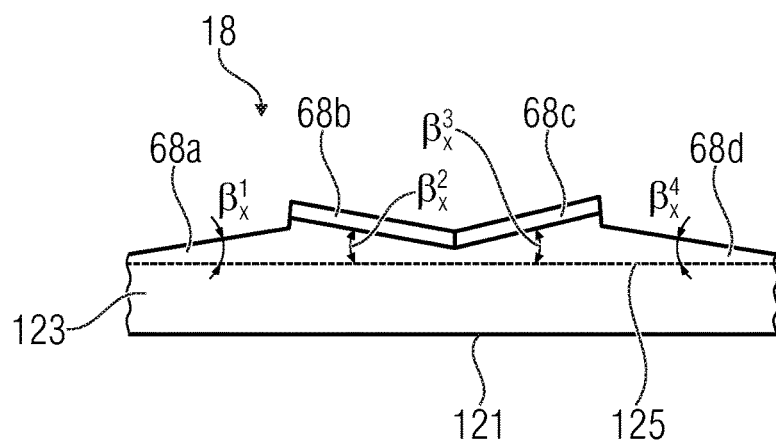
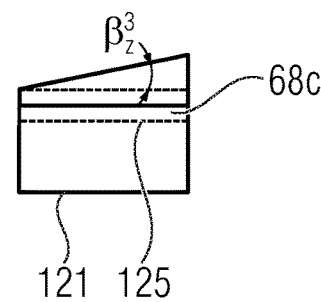
Fig. 22b    Fig. 22e
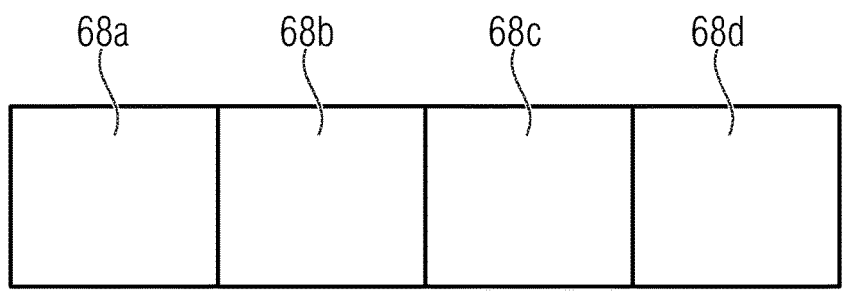
Fig. 22c
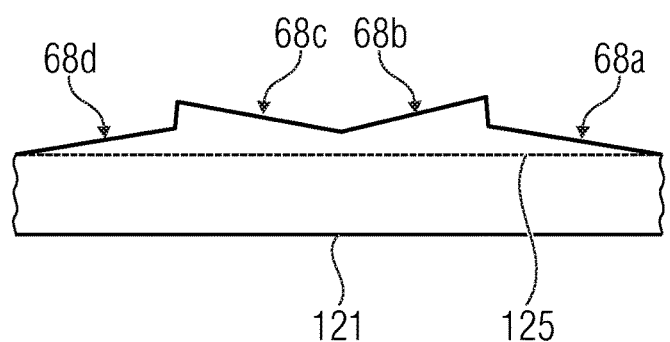
Fig. 22d

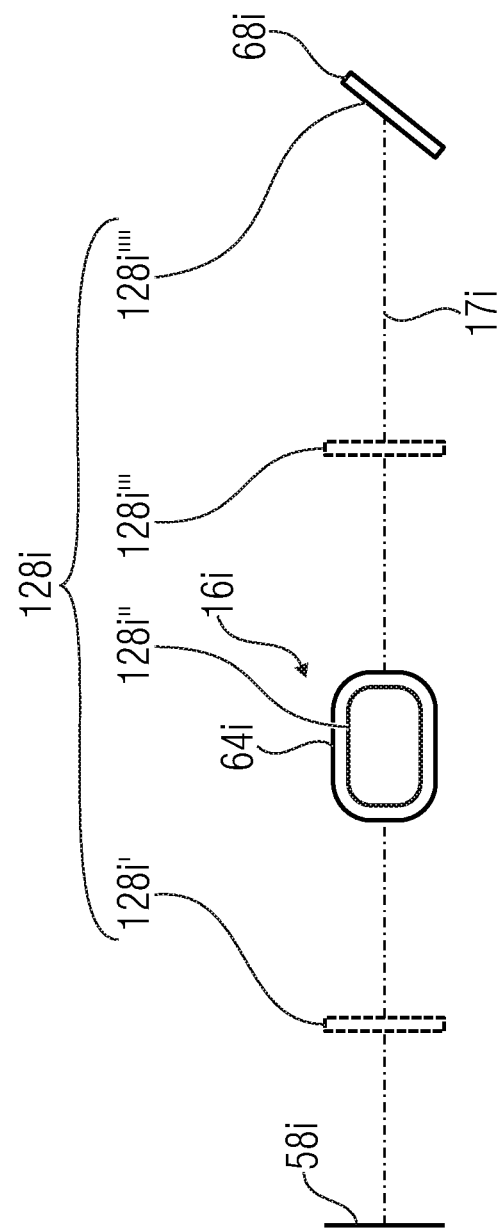

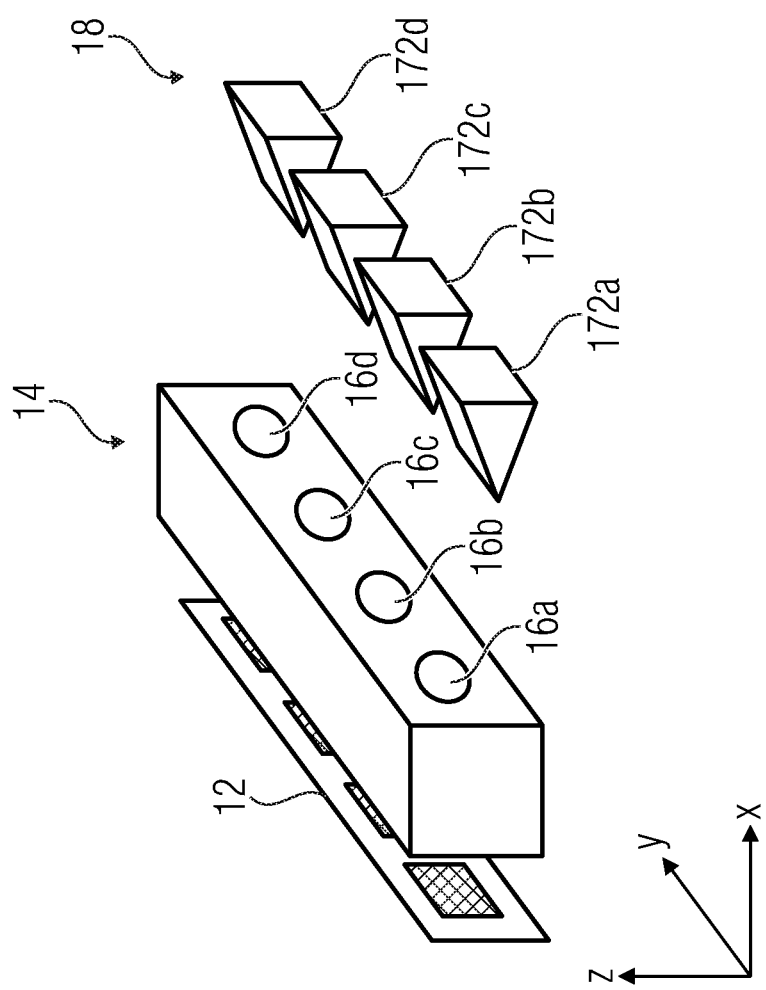

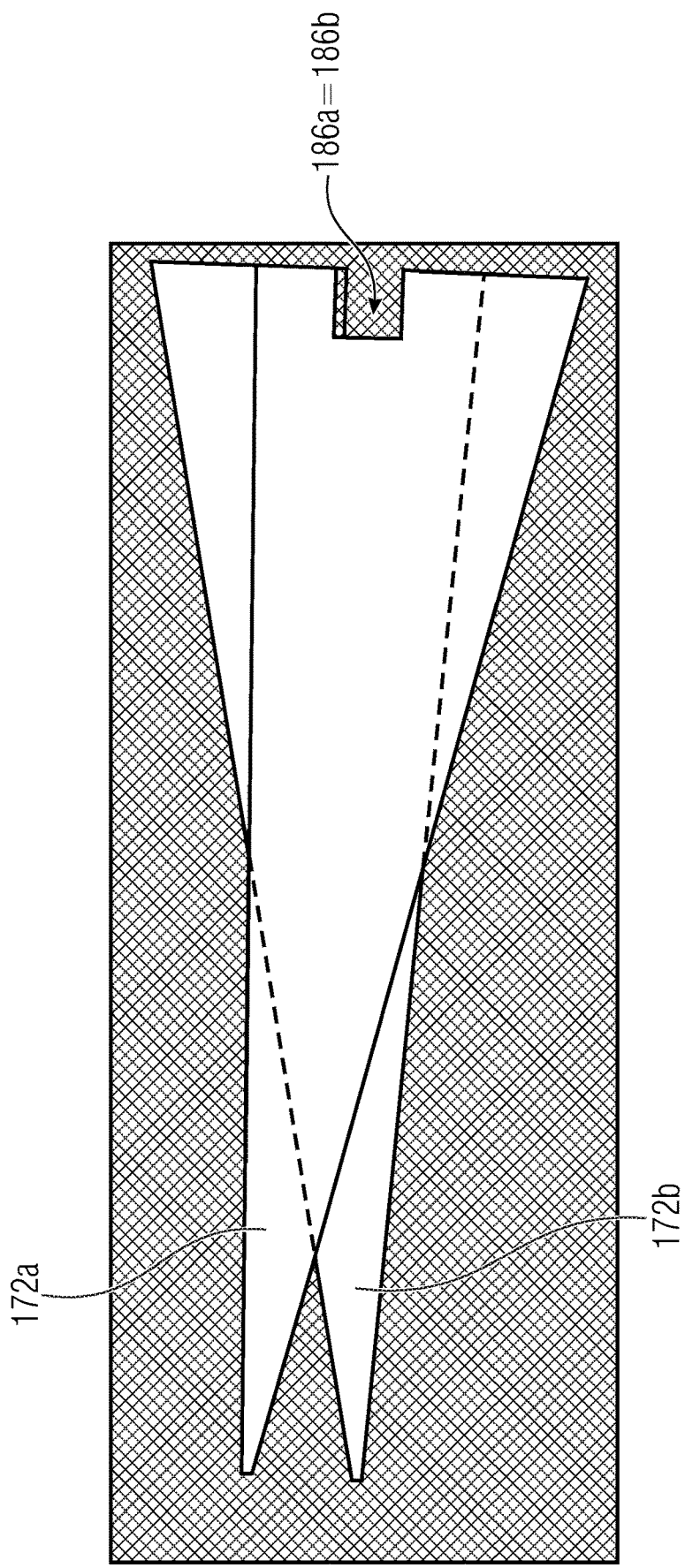

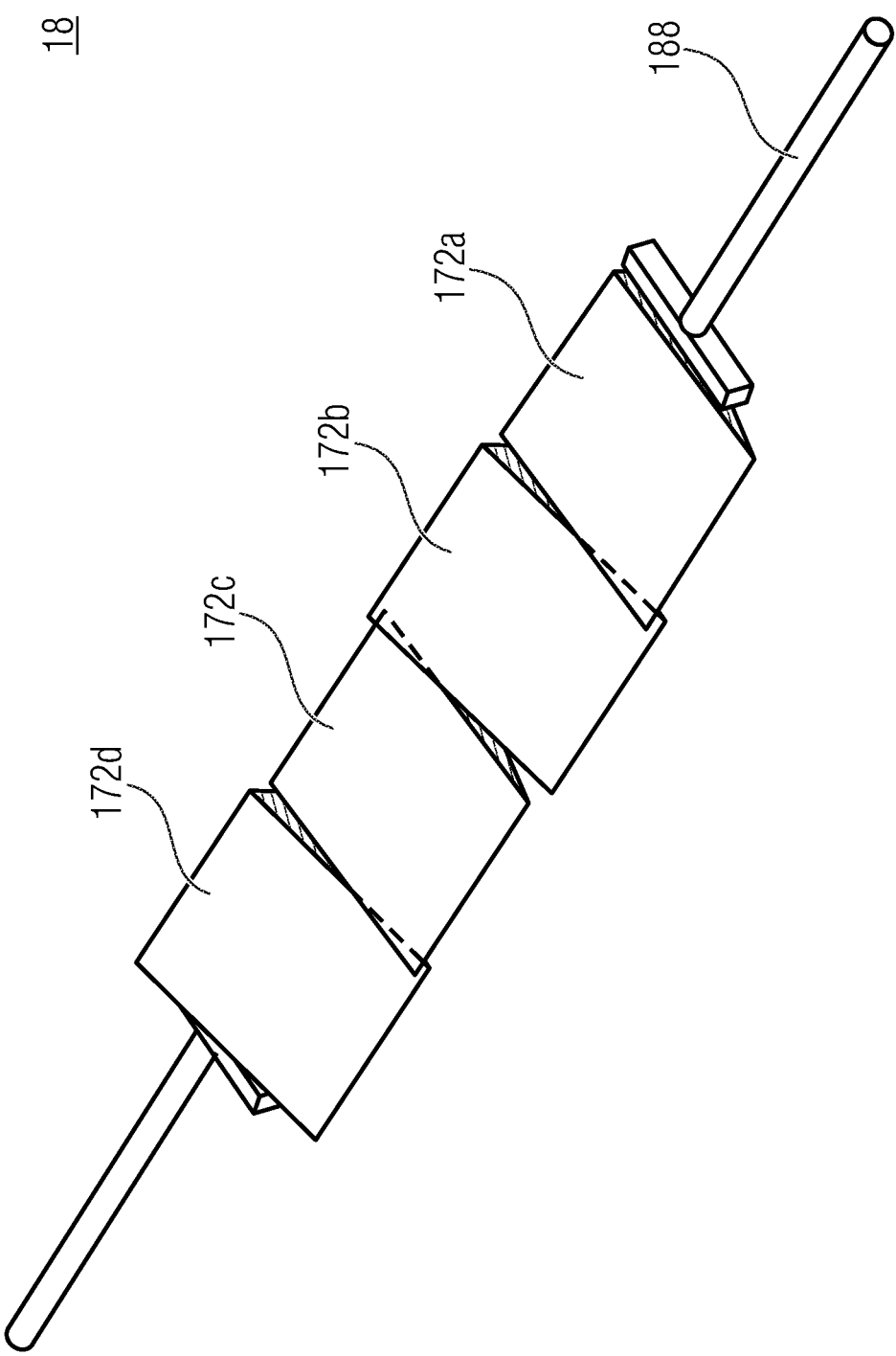

MULTI-APERTURE IMAGING DEVICE, IMAGING SYSTEM AND METHOD FOR CAPTURING AN OBJECT AREA

CROSS-REFERENCE TO RELATED APPLICATIONS

This application is a continuation of copending International Application No. PCT/EP2017/055329, filed 10 Mar. 2017, which claims priority from German Application No. 10 2016 204 148.7, filed 14 Mar. 2016, which are each incorporated herein in its entirety by this reference thereto.

BACKGROUND OF THE INVENTION

The present invention relates to a multi-aperture imaging device, to an imaging system having at least one multi-aperture imaging device and to a method for capturing an object area. Further, the present invention relates to stray light suppression in multi-aperture imaging devices having a linear channel arrangement.

Conventional cameras transmit the total field of view (object area) in one channel and are limited as regards to miniaturization. In smartphones, two cameras are used that are oriented in and opposite to the direction of the surface normal of the display. In known multi-aperture imaging systems, a contiguous partial object area is allocated to each channel, which is transformed into a contiguous partial image area.

Individual mirror facets of a beam-deflecting means are used for dividing the field of view and for controlling the viewing direction of the individual channels. The mirror facets have a lateral extension that is large enough for preventing wrong image areas to be transmitted, which are actually allocated to a neighboring channel. However, this consequently increases the distance of the channels and results, all in all, to a large extension of the camera along the direction of the channel arrangement.

Thus, a concept allowing miniaturized devices for capturing a total field of view while ensuring high image quality would be desirable.

SUMMARY

According to an embodiment, a multi-aperture imaging device may have: at least one image sensor; and an array of juxtaposed optical channels, wherein each optical channel has optics for projecting at least one partial area of an object area on an image sensor area of the image sensor; beam-deflecting means for deflecting an optical path of the optical channels in beam-deflecting areas of the beam-deflecting means; wherein the beam-deflecting means is formed as an array of facets arranged along a line-extension direction of the array of optical channels and wherein one facet is allocated to each optical channel and wherein each facet has at least one beam-deflecting area; wherein a stray light suppressing structure is arranged between a first beam-deflecting area of a first facet and a second beam-deflecting area of a juxtaposed second facet, which is configured to reduce transition of stray light between the first beam-deflecting area and the second beam-deflecting area.

Another embodiment may have an imaging system with an inventive multi-aperture imaging device as mentioned above.

According to another embodiment, a method for capturing an object area may have the steps of: providing an image sensor; projecting an object area with an array of juxtaposed optical channels, wherein each optical channel has optics for projecting at least one partial area of an object area on an image sensor area of the image sensor; deflecting an optical path of the optical channels in beam-deflecting areas of a beam-deflecting means that is formed as an array of facets arranged along a line-extension direction of the array of optical channels and wherein one facet is allocated to each optical channel and wherein each facet has a beam-deflecting area; reducing transition of stray light between a first beam-deflecting area of a first facet and a second beam-deflecting area of a second facet by arranging a stray light suppressing structure between the first beam-deflecting area and the second beam-deflecting area.

A core idea of the present invention is the finding that transition of stray light between optical channels at the beam-deflecting means can also be reduced in that stray light suppressing structures are arranged between two facets and between two adjacent beam-deflecting areas of adjacent facets, respectively, such that the sufficiently large lateral spacing, which can also be considered as safety distance, can be omitted. This allows, while maintaining high image quality, reduction of a lateral extension of the beam-deflecting means and hence miniaturization of the multi-aperture imaging device.

According to an embodiment, a multi-aperture imaging device comprises at least one image sensor and an array of juxtaposed optical channels, wherein each optical channel comprises optics for projecting at least one partial area of an object area on an image sensor area of the image sensor. The multi-aperture imaging device includes beam-deflecting means for deflecting an optical path of the optical channels in beam-deflecting areas of the beam-deflecting means. The beam-deflecting means is formed as an array of facets arranged along a line-extension direction of the array of optical channels. One facet is allocated to each optical channel. Each facet comprises a beam-deflecting area. A stray light suppressing structure is arranged between a first beam-deflecting area of a first facet and a second beam-deflecting area of a juxtaposed second facet, which is configured to reduce transition of stray light between the first beam-deflecting area and the second beam-deflecting area. Here, the reduction relates to a state that would be obtained when the beam-deflecting structure were not arranged.

According to a further embodiment, an imaging system includes a multi-aperture imaging device according to embodiments described herein. The imaging system can, for example, be an apparatus for capturing images, such as a smartphone, a tablet computer or a mobile music player.

According to a further embodiment, a method for capturing an object area comprises providing an image sensor, projecting an object area with an array of juxtaposed optical channels, wherein each optical channel comprises optics for projecting at least one partial area of an object area on an image sensor area of the image sensor. Further, the method includes deflecting an optical path of the optical channels in beam-deflecting areas of a beam-deflecting means that is formed as an array of facets arranged along a line-extension direction of the array of optical channels, and wherein one facet is allocated to each optical channel and wherein each facet comprises a beam-deflecting area. The method includes reducing transition of stray light between a first beam-deflecting area of a first facet and a second beam-deflecting area of a second facet by arranging a stray light suppressing structure between the first beam-deflecting area and the second beam-deflecting area.

BRIEF DESCRIPTION OF THE DRAWINGS

Embodiments of the present invention will be discussed below with reference to the accompanying drawings, in which:

FIG. 3a shows a schematic side-sectional view of a multi-aperture imaging device according to an embodiment further comprising, compared to the multi-aperture imaging device as illustrated in FIG. 2b, at least partly transparent covers;

FIG. 4a shows a schematic side-sectional view of a multi-aperture imaging device according to an embodiment further comprising, compared to the multi-aperture imaging device, ridges that are arranged between stray light suppressing structures;

FIG. 4b shows a schematic top view of a multi-aperture imaging device according to an embodiment comprising a ridge arranged between stray light suppressing structures;

FIG. 5 shows a schematic view of a concept for projecting a total object area or total field of view according to embodiments described herein;

FIG. 7b shows a schematic top view of a further imaging system according to an embodiment which can be considered as a modified variation of the imaging system of FIG. 7a;

FIG. 11a shows a schematic side sectional view of a device according to an embodiment in the first operating state having a translationally shiftable cover;

FIG. 11b shows a schematic side sectional view of the device of FIG. 11a in the second operating state;

FIG. 16 shows a schematic perspective view of a device according to an embodiment wherein the beam-deflecting means is connected to the multi-aperture imaging device by means of mounting elements;

FIGS. 18a-18c show detailed illustrations of a multi-aperture imaging device according to an embodiment;

FIGS. 18d-18f show configurations of the multi-aperture imaging device according to FIGS. 18a-18c for the case of optics of optical channels held by a common carrier according to an embodiment;

FIG. 20b shows a schematic structure of a multi-aperture imaging device for stereoscopically capturing a total field of view;

FIGS. 22b-22e show schematic side views of a beam-deflecting device according to an embodiment;

FIG. 23a shows a schematic view of a multi-aperture imaging device with an adjustment means for channel-individual adjustment of optical characteristics according to an embodiment;

FIGS. 26a-26f show an advantageous implementation of a beam-deflecting means of an imaging device according to an embodiment.

DETAILED DESCRIPTION OF THE INVENTION

Before embodiments of the present invention will be discussed in detail below with reference to the drawings, it should be noted that identical, functionally equal or equal elements, objects and/or structures in the different figures are provided with the same reference numbers, such that the descriptions of these elements illustrated in the different embodiments are inter-exchangeable or inter-applicable.

Some of the embodiments described below relate to capturing an object area. Other embodiments described below relate to capturing a field of view. The terms object area/total object area and field of view or total field of view are to be considered as inter-changeable below. This means that the terms object area, total object area, field of view or total field of view are interchangeable without changing the meaning of the statements herein. To the same extent, the terms partial field of view and partial object area are interchangeable without changing the meaning of the allocated description.

Figure 1:
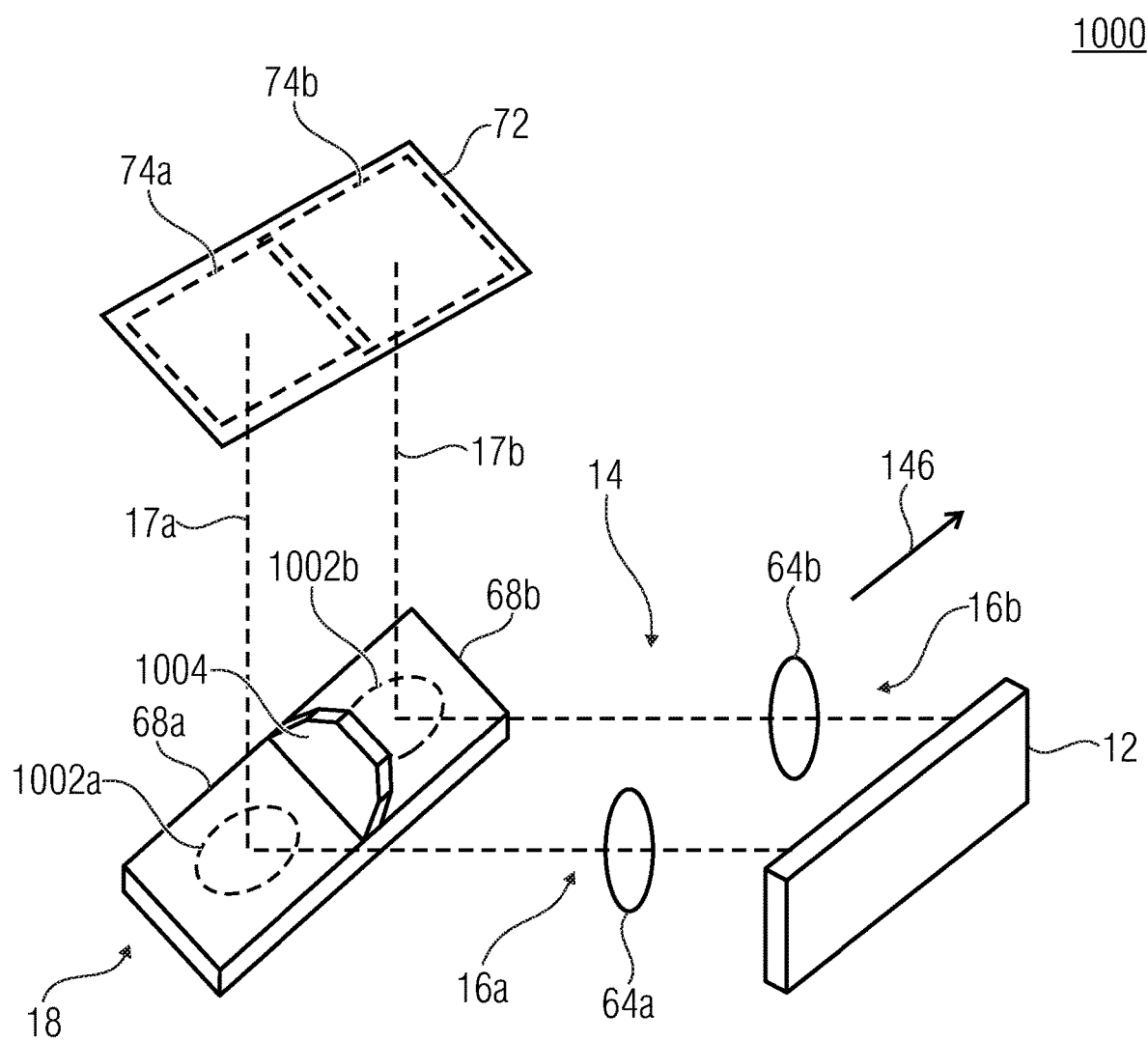
FIG. 1 shows a schematic top view of a multi-aperture imaging device according to an embodiment including a stray light suppressing structure.

FIG. 1 shows a schematic top view of a multi-aperture imaging device 1000 according to an embodiment. The multi-aperture imaging device 1000 can be a device that is configured to capture an object area (field of view) 27 in the form of several partial object areas (partial fields of view) 74a-b. The captured partial object areas 74a-b can be assembled to a total image by the device 1000 or a downstream computing device, such as a processor, a field programmable gate array (FPGA), a CPU (central processing unit), hardware specific for the method, such as an ASIC or the same. According to embodiments, the object area 72 is scanned by a plurality of partial object areas 74a-b. The plurality can be at least 2, at least 3, at least 5, at least 9 or higher.

The multi-aperture imaging device 1000 includes an image sensor 12 and an array 14 of juxtaposed optical channels 16a and 16b. Each optical channel 16a and 16b comprises optics 64a and 64b, respectively, for projecting at least one partial area 74a or 74b on an image sensor area of the image sensor 12. The multi-aperture imaging device 1000 includes a beam-deflecting means 18. The beam-deflecting means 18 is configured to deflect optical paths 17a and 17b of the optical channels 16a and 16b. For this, the beam-deflecting means comprises facets 68a and 68b. In other words, the beam-deflecting beams 18 is formed as an array of facets 68a-b. The facets 68a and 68b are arranged along a line-extension direction 146, wherein the line-extension direction 146 relates to a direction along which the optical channels 16a and 16b are arranged in the array 14, i.e., in front of the image sensor.

One facet 68a and 68b, respectively, is allocated to each optical channel 16a and 16b. As will be described below, several optical paths can be allocated to one facet 68a or 68b. The facet 68a is configured to deflect the optical path 17a of the optical channel 16a in a beam-deflecting area 1002a towards the partial area 74a. In the same way, the facet 68b is configured to deflect the optical path 17b of the optical channel 16b in a beam-deflecting area 1002b of the facet 68b towards the partial area 74b. This means that each facet 68a and 68b comprises a beam-deflecting area 1002a and 1002b. The beam-deflecting area 1002a or 1002b can be a surface area of the facet 68a and 68b, respectively, which is configured to deflect the respective optical path.

A stray light suppressing structure 1004 is arranged between the beam-deflecting areas 1002a and 1002b, which is configured to reduce or prevent transition of stray light between the first beam-deflecting area 1002a and the second beam-deflecting area 1002b. Advantageously, the stray light suppressing structure 1004 comprises an at least partly opaque material. It is further of advantage that the stray light suppressing structure 1004 comprises a topography that is elevated with respect to a topography of the first facet 68a and/or the second facet 68b. The topography can mean a surface profile considering elevations and/or curvatures of the facets 68a and 68b as well as the stray light suppressing structure 1004 with respect to adjacent structures. Simply put, the stray light suppressing structure 1004 can be elevated at least in parts between the facet 68a and/or the facet 68b.

According to an embodiment, the stray light suppressing structure 1004 is a partition wall that is arranged between the facets 68a and 68b. Scatterings in the optical paths 17a and/or 17b that would unintentionally enter the beam-deflecting area 1002a or 1002b of the adjacent optical channel 16a and 16b, respectively, when the stray light suppressing structure is absent, can be at least partly intercepted by the stray light suppressing structure 1004, such that image quality is merely effected to a limited extent or even not at all by stray light transition. This allows the reduction of distances between the beam-deflecting areas that would be used when the stray light suppressing structures 1004a or 1004b are absent in order to reduce stray light transition.

In other words, structures for reducing and/or preventing stray light can be arranged at the transitions of individual facets of the beam-deflecting means.

Figure 2A:
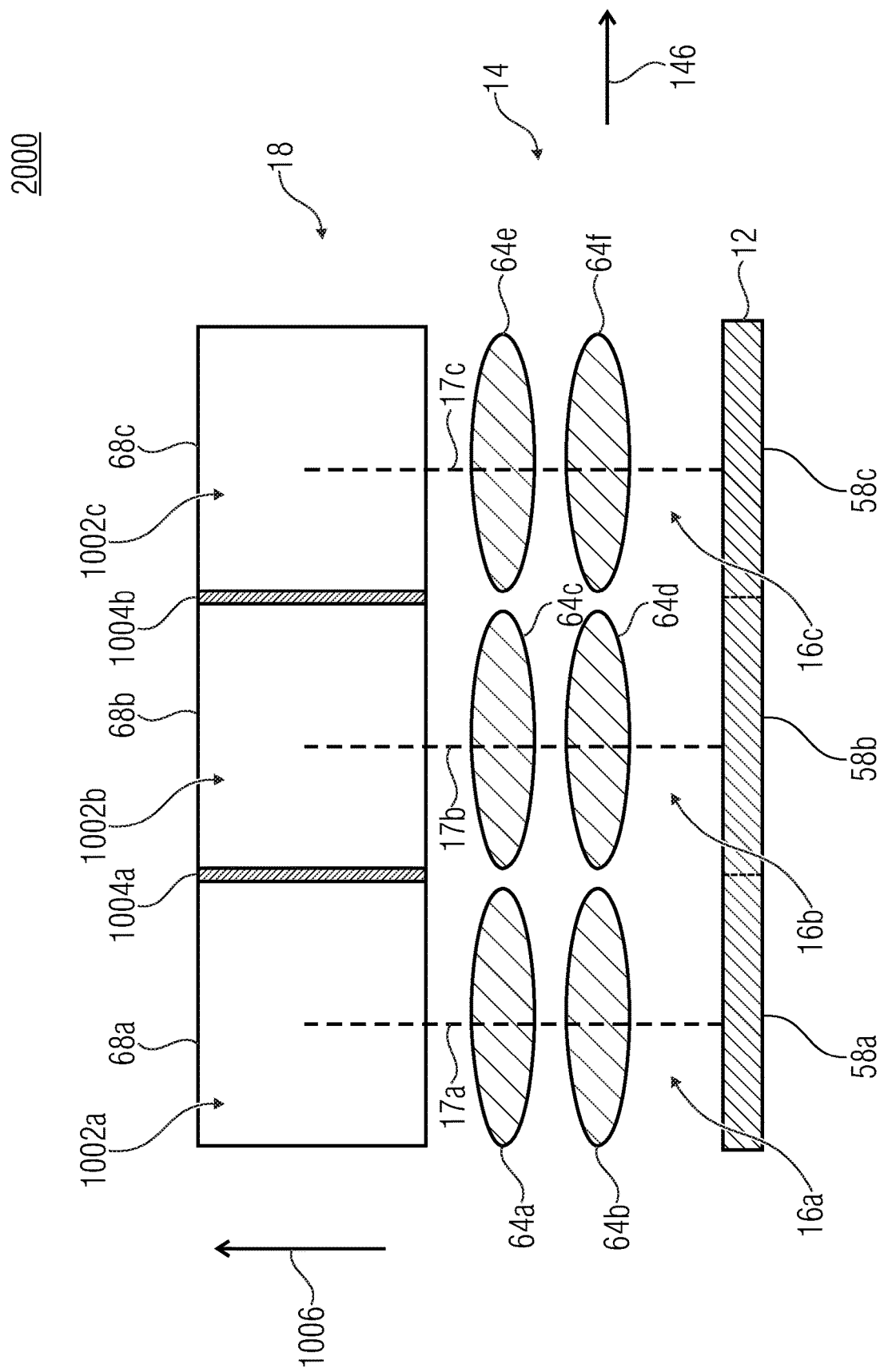
FIG. 2a shows a schematic top view of a multi-aperture imaging device according to a further embodiment comprising two optics per optical channel including stray light suppressing structures extending along the main side of the beam-deflecting means.

FIG. 2a shows a schematic top view of a multi-aperture imaging device 2000 including the image sensor 12, the array 14 and the beam-deflecting means 18. Each optical channel 16a-c comprises, for example, two optics (lenses) 64a and 64b, 64c and 64d or 64e and 64f in order to influence an optical path 17a-c of the respective optical channel 16a-c, and to direct the same to an image sensor area 58a-c. According to embodiments, an optical channel can have any number of lenses, such as one, two or more than two. The optical channels 16a-c can have a differing number of lenses. A stray light suppressing structure 1004a is arranged between the beam-deflecting area 1002a of the facet 68a and the beam-deflecting area 1002a of the facet 68b. A stray light suppressing structure 1004b is arranged between the beam-deflecting area 1002b and the beam-deflecting area 1002c of the facet 68c of the beam-deflecting means 18.

A main side of the beam-deflecting means 18 and the individual facets 68a-c can be projected on a plane that is spanned by the line-extension direction 146 and a direction 1006 that is arranged perpendicular to the line-extension direction 146. The spanned plane can, for example, be essentially perpendicular to the image sensor areas 58a-c. The line-extension direction 146 can be arranged parallel to an axial extension of the beam-deflecting means 18, while the direction 1006 can be referred to as lateral extension direction of the beam-deflecting means 18. The stray light suppressing structures 1004a and/or 1004b can be arranged along the entire extension of the beam-deflecting means 18 parallel to the direction 1006, i.e. to an extent of up to 1006, wherein also projections of the stray light suppressing structures beyond the beam-deflecting means 18 are possible. This allows suppression of stray light transitions between two adjacent beam-deflecting areas 1002a and 1002b, and 1002b and 1002c, respectively, across the entire extension of the beam-deflecting means 18 along the direction 1006.

Figure 2B:
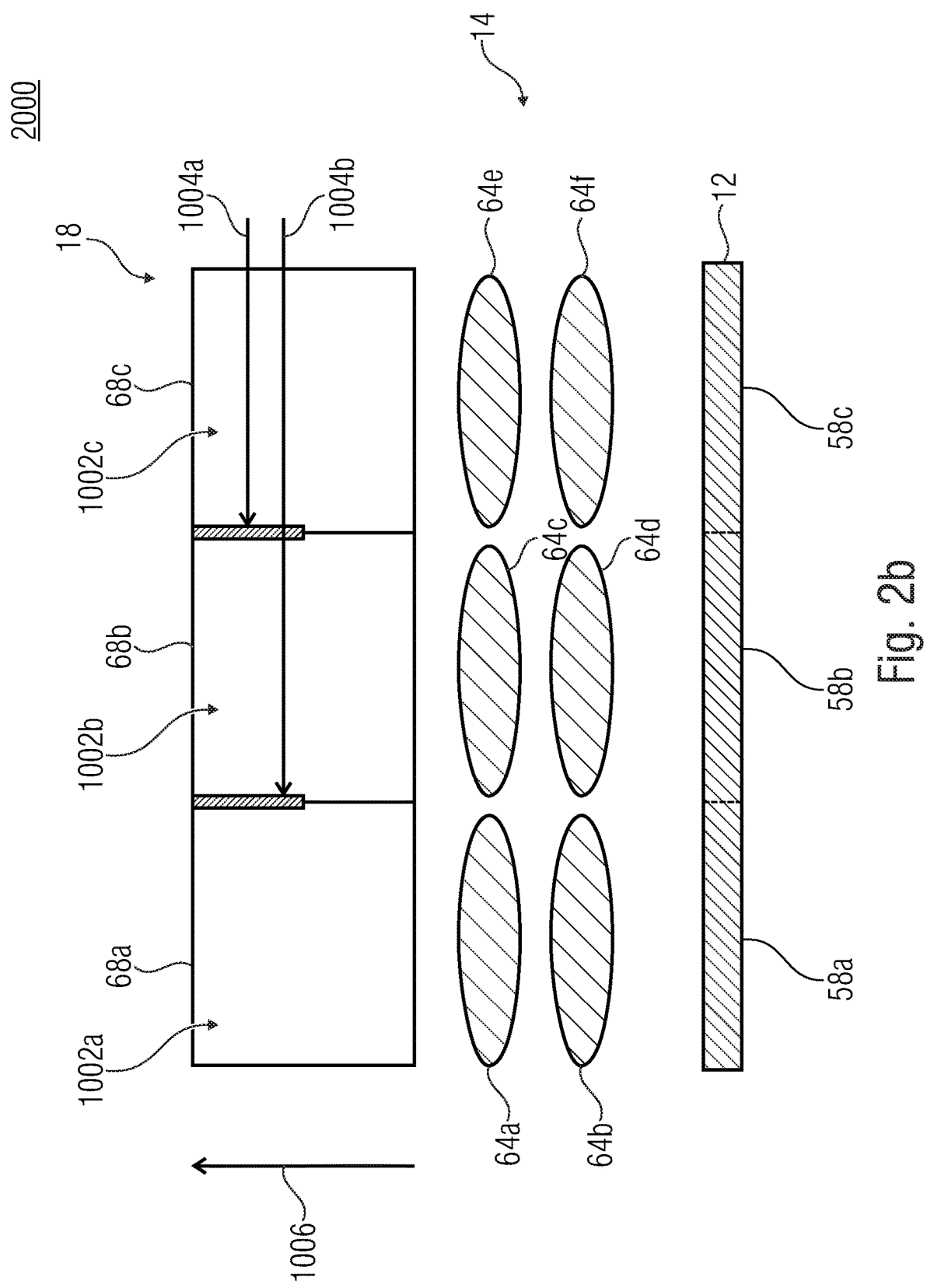
FIG. 2b shows a schematic top view of the multi-aperture imaging device of FIG. 2a including stray light suppressing structures extending to an extent of approximately 50% on the main side of the beam-deflecting means.

FIG. 2b shows a schematic top view of the multi-aperture imaging device of FIG. 2a, wherein the stray light suppressing structures 1004a and 1004b extend to an extent of approximately 50% on the main side of the beam-deflecting means 18 and along the direction 1006. The stray light suppressing structures 1004a and/or 1004b can be arranged, for example, starting on a side of the main side of the beam-deflecting means 18 facing away from the optics 64a-f towards the optics 64a-f and can extend across an area of approximately 50% along the direction 1006. According to further embodiments, the stray light suppressing structure extends to an extent of at least 10%, at least 20% or at least 30% along the direction 1006. According to further embodiments, the stray light suppressing structures 1004a and/or 1004b can be arranged spaced apart from lateral edges of the beam-deflecting means 18, i.e. can be essentially arranged in a central area of the beam-deflecting areas 1004a-c. According to an embodiment as described in the context of FIG. 2a, the extension of the stray light suppressing structure along the direction 1006 can also be at least 50%, at least 70%, at least 90%, or at least 95%. It is also possible that the stray light suppressing structure 1004a or 1004b extends along an arbitrary area along the direction 1006, wherein the stray light suppressing structure is elevated only in parts with respect to a topography of the adjacent facets 68a and 68b, and 68b and 68c, respectively, i.e. the elevation (topography) is approximately zero within areas, which also includes negative values.

The stray light suppressing structures between two juxtaposed facets 68a-c according to embodiments described herein may be formed of at least one opaque material. For this, a metal material, a plastic material and/or a semiconductor material can be provided. Here, the characteristic of the stray light suppression may relate to a useful wavelength range of the multi-aperture imaging device. In that way, for example, usage of semiconductor material for the stray light suppressing structures can be advantageous when the multi-aperture imaging device is configured to capture images in a visible wavelength range. In contrast, when capturing images in an infrared wavelength range, usage of metal material can be of advantage when semiconductor material becomes transparent within this wave range.

FIG. 3a shows a schematic side sectional view of a multi-aperture imaging device 3000 which further comprises, compared to the multi-aperture imaging device 2000 as illustrated in FIG. 2b, at least partly transparent covers 36a and 36b. The at least partly transparent covers 36a and 36b can, for example, be part of a housing in which the multi-aperture imaging device 3000 is arranged. The beam-deflecting means 18 can be configured to deflect optical paths of the optical channels in dependence on a relative position of the beam-deflecting means 18 with respect to the image sensor 12 through the transparent cover 36a or the transparent cover 36b. As will be described below in detail, depending on the position of the beam-deflecting means 18, a differing object area can be captured by the multi-aperture imaging device 3000. In this regard, the at least partly transparent cover 36a and 36b, respectively, allows protection of the multi-aperture imaging device 3000 from external influences, such as contamination or mechanical influences. In order to be movable between the first and second positions, the beam-deflecting means 18 can, for example, be movable via an axis of rotation 44.

The stray light suppressing structure 1004a is arranged between the beam-deflecting areas of the facets 68a and 68b. The stray light suppressing structure 1004a is, for example, merely arranged on a first main side 1008a of the beam-deflecting means 18. Thus, in the illustrated perspective, the lateral edge of the facet 68b can be seen. On an opposite second main side 1008b of the beam-deflecting means 18, a further stray light suppressing structure 1004c can be arranged between the beam-deflecting areas of the facets 68a and 68b, in order to be effective during a second subsequently described position of the beam-deflecting means 18. Thus, the main sides 1008a and 1008b can be reflective.

In the illustrated cross-section, the stray light suppressing structure 1004a can have a polygonal topography. This can also be considered such that the stray light suppressing structure 1004a has a cross-section in a polygonal shape. This means that the stray light suppressing structure 1004a can have any cross-section which can be assembled of any straight or bent segments arranged arbitrarily with respect to one another. A portion 1002a of the stray light suppressing structure 1004a can be arranged such that the same is arranged in the illustrated first position essentially parallel to a surface of the at least partly transparent cover 36a facing the beam-deflecting means 18. This allows simultaneously a high stray light suppression and a short distance between the at least partly transparent cover 36a and the stray light suppressing structure 1004a, such that an extension of the multi-aperture imaging device 3000 along a direction 1014 which can be arranged perpendicular to the line-extension direction and perpendicular to the direction 1006 described in FIG. 2b is low or even at a minimum. The extension of the multi-aperture imaging device 3000 in the direction 1014 can also be considered as installation height, wherein it is obvious that the term height, depending on the position of the multi-aperture imaging device 3000 in space, is also mutually exchangeable with other terms like length or width and is hence not to have any limiting effect in the context of embodiments described herein.

Figure 3B:
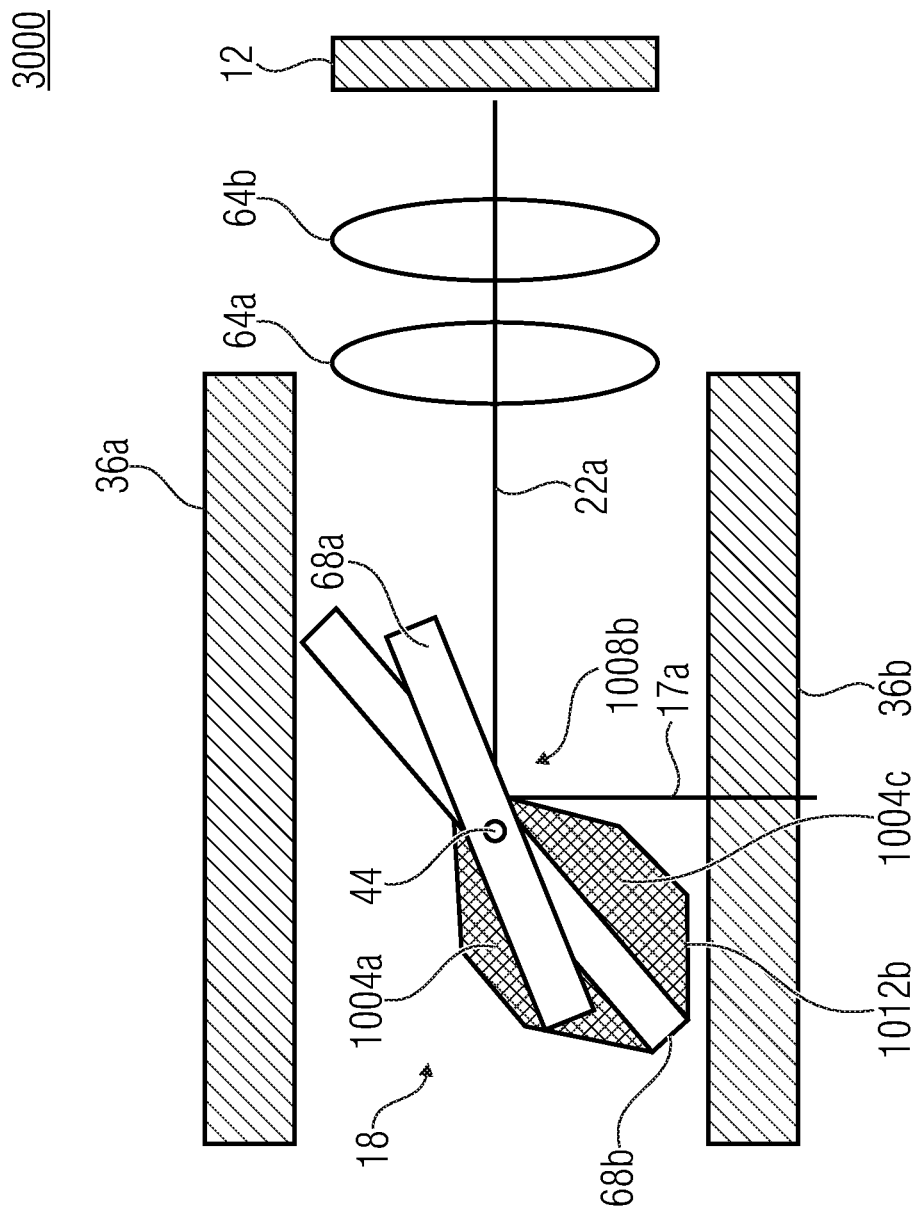
FIG. 3b shows a schematic side-sectional view of the multi-aperture imaging device of FIG. 3a wherein the beam-deflecting means has an altered position.

FIG. 3b shows a schematic side sectional view of the multi-aperture imaging device 3000, wherein the beam-deflecting means 18 is in the second position where the same deflects the optical paths of the optical channels through the at least partly transparent cover 36b. The stray light suppressing structure 1004c is arranged, for example, on the second main side 1008b opposite to the stray light suppressing structure 1004a. The stray light suppressing structure 1004c can have a portion 1012b that is arranged parallel to a surface of the at least partly transparent cover 36b facing the beam-deflecting means 18 when the beam-deflecting means 18 is in the second position.

Although the stray light suppressing structures 1004a and 1004c of the multi-aperture imaging device 3000 have been described such that the same are respectively arranged on a main side of the beam-deflecting means 18 on the same facet, according to further embodiments, the opposite stray light suppressing structures 1004a and 1004c can also be arranged on different facets. For example, the stray light suppressing structure 1004a can be arranged on the facet 68a and the stray light suppressing structure 1004c on the facet 68b, or vice versa. According to further embodiments, the stray light suppressing structures 1004a and 1004c can also be formed integrally and can, for example, project through a surface of the facet 68a or 68b. It is also possible that the beam-deflecting means 18 comprises areas between two facets through which a stray light suppressing structure projects towards both main sides of the beam-deflecting means 18.

Above, the portions 1012a and 1012b of the stray light suppressing structure 1004a and 1004b, respectively, have been described such that the same are parallel to the at least partly transparent covers 36a and 36b, respectively, when the beam-deflecting means 18 is in the respective position. It is possible to reduce the distance between the portion 1012a and the at least partly transparent cover 36a to 0, i.e. mechanical contact takes place. However, it is advantageous to maintain a distance between both components, the stray light suppressing structure 1004a and the at least partly transparent cover 36a, in order to prevent mechanical interaction, i.e. abutting or mutual application of forces. This means that, in the first position, the stray light suppressing structure 1004a is arranged spaced apart (contactless) from the at least partly transparent cover 36a and hence from the housing of the multi-aperture imaging device 3000. The same applies to the portion 1012b of the stray light suppressing structure 1004b with regard to the at least partly transparent cover 36b in the second position of the beam-deflecting means 18.

Although the multi-aperture imaging device 3000 has been described such that the facets 68a and 68b each have two reflective beam-deflecting areas on respectively one main side of the beam-deflecting means 18, this can also be considered such that opposite to the facet 68a a further facet is arranged comprising the beam-deflecting area arranged opposite to the beam-deflecting area of the facet 68a. Simply put, this means that a facet having two opposite beam-deflecting areas can also be considered as two opposite facets. While the beam-deflecting means has been described such that the same can be moved rotationally between the first position and the second position, according to further embodiments, the same can also be shifted translationally, i.e. parallel to the axis of rotation 34 and can comprise respectively differently oriented facets deflecting, depending on the position, the optical path in the first direction or in the second direction.

As will be described below in more detail, switchable diaphragms can be arranged on the at least partly transparent covers 36a and/or 36b, which are configured to prevent, at least at times, entry of light towards the image sensor in order to further increase the image quality.

In other words, the stray light suppressing structure 1004a and/or 1004b can be structured such that, in the first position of the beam-deflecting means, an edge, the portion 1012a, is oriented mostly parallel to the cover glass (at least partly transparent cover 36a) through which the optical path passes. In the second position of the beam-deflecting means, a second edge, the portion 1012b, can be arranged that is oriented almost parallel to the other cover glass, the at least partly transparent cover 36b. The further shaping of the stray light suppressing structure 1004a and/or 1004b can be configured such that maximum screening of the optical path within an imaging channel (optical channel) is obtained, but at the same time none of the cover glasses is touched when rotating the beam-deflecting means.

FIG. 4a shows a schematic side sectional view of a multi-aperture imaging device 4000 further comprising, compared to the multi-aperture imaging device 3000, ridges 1014a and 1014b that are arranged between stray light suppressing structures. With reference to FIG. 2a, for example, the stray light suppressing structures 1004a and 1004b can be connected by the ridge 1014a. The ridge can comprise a material allowing a certain mechanical stability between the adjacent stray light suppressing structures 1004a and 1004b. This can, for example, be a semiconductor material, a plastic material and/or a metal material. In one embodiment, the ridge 1014 can be integrally formed with the stray light suppressing structures arranged thereon. In one embodiment, the ridge 1014a is arranged on an edge of the stray light suppressing structures and/or the beam-deflecting means 18 pointing towards the optics 64a and 64b. This can also be considered such that in some embodiments the ridge is not arranged on other edges. When switching the beam-deflecting means from the first position to the second position around the axis of rotation, this enables that no additional installation height or distance between the at least partly transparent covers 36a and 36b is needed, i.e. no additional installation height is needed. This allows further that a facet of the beam-deflecting means 18 is surrounded by stray light suppressing structures in areas on three sides that might not relate to the side facing away from the optics.

The arrangement of a ridge allows simplified production of the multi-aperture imaging device 4000 and/or simplified assembly of the stray light suppressing structures on the beam-deflecting means 18.

In other words, the ridge can have a specific thickness in order to be mechanically stable. An exemplary thickness is, for example, in a range of at least 100 μm and at the most 10 mm, of at least 200 μm and at the most 1 mm or of at least 300 μm and at the most 500 μm, which provides sufficiently great stability, but does not result in unnecessary enlargement of the installation height of the device. The ridge is possibly arranged only on the side facing the optics since this does not result in any or only a slight enlargement of the installation height/thickness of the multi-aperture imaging device 3000. However, it is possible to arrange the ridge also on the side of the facet facing away from the optics, but this may result in a greater enlargement of the installation height/thickness, and also, vignetting (shading towards the image edge) of the imaging optical path can be obtained, which is undesirable. The beam-deflecting means can be changed as regards to its orientation such that the viewing direction of the camera is oriented at least towards the front and towards the back, which relates, for example, to the surface of an imaging system, for example a mobile phone.

The beam-deflecting means is configured to deflect the optical path 17 of optical channels between the object area and the image sensor 12 and the array including the optics 64a and 64b. As described in the context of FIG. 3a-b, the beam-deflecting means can have variable positions or orientations in order to deflect the optical path between variable object areas and the image sensor 12. Between the optics area and the beam-deflecting means 18, the optical path 17 passes through an exit area of the multi-aperture imaging device, for example the at least partly transparent cover 36a and 36b, respectively, or an opening in the housing.

In the first orientation or position of the beam-deflecting means 18, the ridge 1014a facing the lenses is arranged, with respect to the central optical path 17 of the imaging channel 16a, below optical centers of the lenses 64a and 64b as illustrated in FIG. 4a. According to further embodiments, tilting of the beam-deflecting means 18 can also be performed such that the ridge 1014a is below the lenses 64a and 64b. The term "below" relates, for example, to the fact that in the illustrated orientation the illustrated optical path 17 and the viewing direction of the optical channel 16a passes between the at least partially transparent cover 36a (exit side of the multi-aperture imaging device through which the optical path 17 passes) and the ridge 1014a. The term "below" is not to have any limiting effect as regards to the orientation in space, but is merely to serve illustration purposes. This allows that the ridge 1014a has no influence on the projection of the partial area of the object area since the same is arranged outside the optical path 17. Hence, the same is not seen by the multi-aperture imaging device 4000'. In a second orientation or position of the beam-deflecting means 18 as illustrated, for example in FIG. 3b, the ridge 1014b facing the lenses is arranged above the lenses 64a and 64b and is not seen. In this context, this can be considered such that in the second orientation the optical path 17 and the viewing direction of the optical channel 16a, respectively, passes between the at least partly transparent cover 36b (exit side of the multi-aperture imaging device 4000') and the ridge 1014b. The term "above" is in this context also to be considered only illustratively, without having a limiting effect with regards to the spatial orientation top/bottom/left/right.

Such an arrangement prevents that a ridge 1014a or 1014b arranged on the side facing away from the lenses, for example on the portion 1012 is seen or captured in any of the two positions or results in shadings in the image. Such an effect could be prevented when the thickness or installation height of the structure is increased by at least the ridge thickness, which would result, however, in an increased installation height of the multi-aperture imaging device 4000' which would be disadvantageous.

The beam-deflecting means can have reflective facets comprising mirroring areas both on the top and bottom. Cover glasses provided with apertures can be mounted above and below the beam-deflecting means.

FIG. 4b shows a schematic top view of a multi-aperture imaging device 4000' which can also be considered as modified multi-aperture imaging device of FIG. 2a. Compared to the multi-aperture imaging device 2000, the multi-aperture imaging device 4000' comprises a ridge 1014. If, for example, the stray light suppressing structures 1004a and 1004b are effective for both main sides of the beam-deflecting means 18, as described in the context of FIG. 4a, the arrangement of only one ridge can result in sufficient mechanical stability. The individual ridge can be arranged on one of the two main sides. Alternatively, the ridge 1014 can also be arranged on both main sides, for example in that the same is built around a main side edge of the beam-deflecting means 18. The ridge 1014 and the stray light suppressing structures 1004a-d can be structured integrally. For example, stray light suppressing structures arranged on one or two main sides of the beam-deflecting means can be connected to one another by means of the ridge 1014 and can be arranged on the beam-deflecting means 18 as a common component.

FIG. 5 shows a schematic top view of a concept for imaging a total object area or total field of view according to embodiments described herein. A multi-aperture imaging device 5000 includes, for example, four optical channels 16a-d each imaging a partial area of the total field of view. Channel-individual deflection of the optical path 17a in pairs can, for example, be obtained by facets 68a-b of the beam-deflecting means 18 that are differently inclined with respect to one another. The optical channels 16a-d can have inclined optical axes, such that the facets 68a and 68b can be shared by several channels. Tilting the facets can be performed along an angular component (orthogonally to a line-extension direction of the optical channel 16a-d) which can result in a simplification of the beam-deflecting means 18.

Figure 6A:
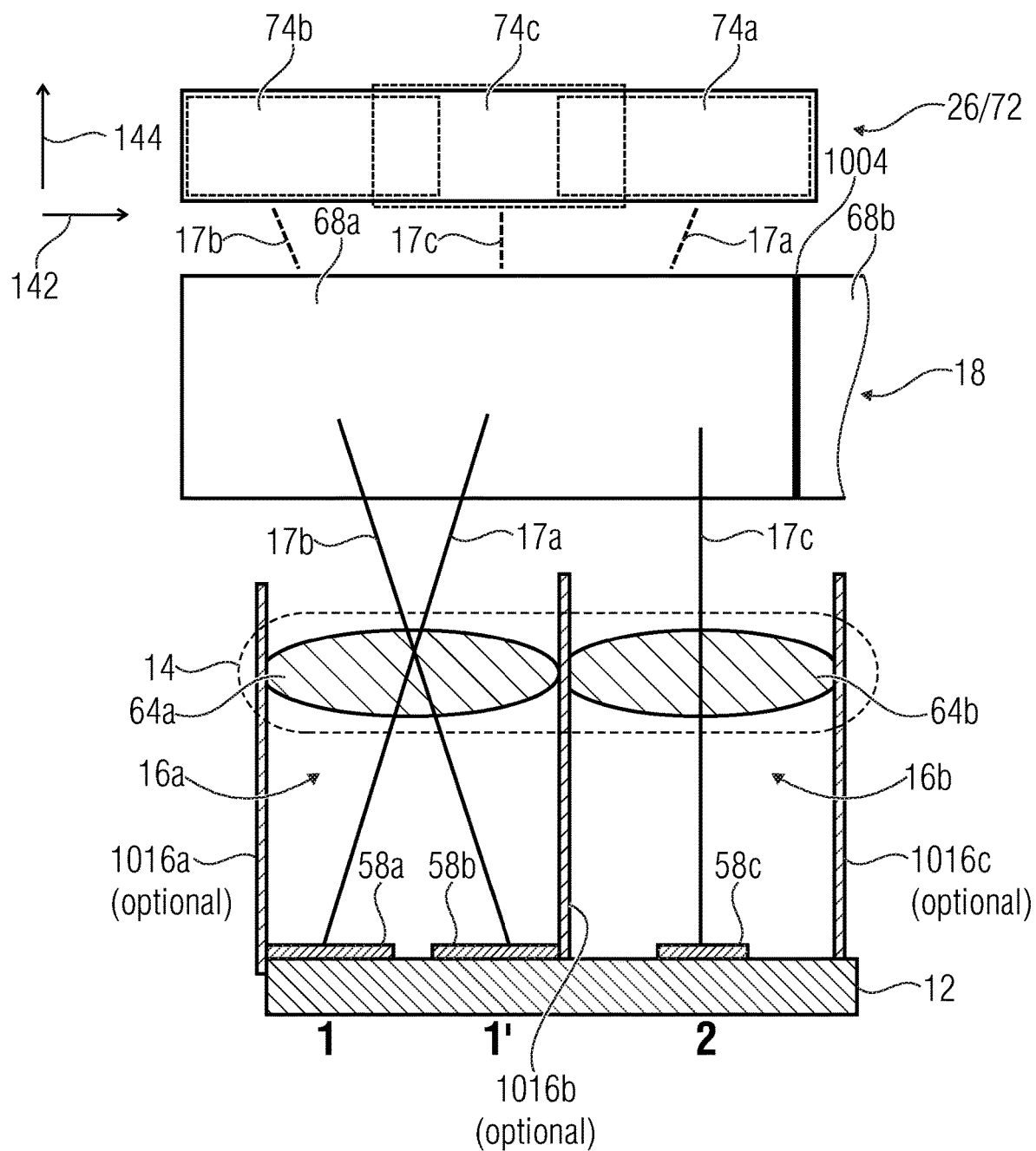
FIG. 6a shows a schematic top view of a section of a multi-aperture imaging device according to an embodiment.

FIG. 6a shows a schematic top view of a section of a multi-aperture imaging device 6000. The multi-aperture imaging device 6000 includes an image sensor 12 and an array 14 of juxtaposed optical channels 16a and 16b each including optics 64a and 64b, respectively. This means that each optical channel 16a and 16b comprises optics 64a and 64b, respectively, for projecting at least one partial area 74a-c of the object area 26 on an image sensor area 58a, 58b and 58c, respectively of the image sensor. In that way, optics 64a projects, for example, the partial area 74a on the image sensor area 58a, which is illustrated by the optical path 17a. Further, the optics 64a projects the partial area 74b on the image sensor area 58b which is illustrated by the optical path 17b. The partial areas 74a and 74b are disjoint in the object area 26, this means the same do not overlap and/or are completely different.

The limitation of the partial field of view of each optical channel 16a-b combined with the beam-deflecting means 18 can result in a reduction of an installation height (primary effect) of the multi-aperture imaging device 1000. This is obtained in that the installation height is realized perpendicular to the viewing direction of the multi-aperture imaging device. Additionally, simplification of the optics of each channel is obtained since fewer lenses can be arranged per channel, since for capturing a partial field of view a simpler correction of field aberrations is possible (secondary effect).

The optics 64b of the optical channel 16b is configured to project the partial area 74c on the image sensor area 58c as illustrated by the optical path 17c. The partial area 74c overlaps with the partial area 74a and/or 74b, such that by image processing of the partial images of the image sensor areas 58a, 58b and 58c, a total image of the object area 26 can be obtained. Alternatively, the optical channel 16b can also be configured comparably to the optical channel 16a; this means influencing two optical paths such that two disjoint partial areas of the object area are directed to two image sensor areas.

The multi-aperture imaging device 6000 comprises the optional beam-deflecting means 18 that is configured to deflect an optical path of the optical channels 16a and 16b such that the same are directed towards the object area 26. The optical paths 17a, 17b and 17c can run oblique to one another in a common plane between the image sensor areas 58a-c and the optional beam-deflecting means 18. This means the viewing directions of the optical channels and the optical paths, respectively, can differ and can be in a common plane. By deflection by the beam-deflecting means 18, a viewing direction along a second direction can be changed, such that by deflecting the optical paths a plurality of partial areas of the object area 26 distributed two-dimensionally to one another can be captured. According to further embodiments, further optical channels can be arranged beside the optical channels 16a and 16b. Alternatively or additionally, further partial areas of the object area are projected on further (not illustrated) image sensor areas of the image sensor 12 by the optics 64a, wherein the partial areas are each disjoint from one another. The further partial areas can be offset to the partial area 74a along the direction 142 and/or the direction 144. The beam-deflecting means 18 can deflect the optical paths 17a and 17b such that the respective partial areas in the object area are no longer disjoint from one another. Advantageously, however, the partial areas remain disjoint even after deflection of the optical paths.

Simply put, the optical paths 17a and 17b, oriented obliquely to one another, allow a lateral offset of the partial object areas 74a and 74b to one another. Implementation of the multi-aperture imaging device 1000 can now be performed such that the partial object areas 74a and 74b, as illustrated, are offset to one another along a first direction 142 in the object area 26. Alternatively or additionally, it is also possible that the partial object areas 74a and 74b are laterally offset to one another along a second direction 144 in the object area 26, wherein both offset directions can also be combined. Directions 142 and 144 can be, for example, parallel to image axes of an image to be captured or that has been captured. This means that partial areas 74a-c that are two-dimensionally offset to one another can also be obtained without beam-deflecting means 18.

While the image sensor 12 is illustrated such that the same includes image sensor areas 58a, 58b and 58c, multi-aperture imaging devices according to further embodiments comprise at least two, three or more image sensors, all in all providing a total amount of image sensor areas 58a, 58b and 58c. The total amount can be any number of image sensor areas, such as at least three, at least six or at least nine. Thus, an image sensor can include merely one or several image sensor areas 58a-c. The multi-aperture imaging device can include one or several image sensors.

In the areas between the image sensor areas 58a-c, non-light-sensitive integrated circuits, electronic components (resistors, capacitors) and/or electric connecting elements (bonding wires, vias) or the same can be arranged.

Optionally, the optical channels 16a and 16b can be at least partly insulated from at least partly opaque structures 1016a-c of adjacent optical channels and/or an environment of the optical channel in order to at least partly prevent entry of stray light into the optical channel 16a or 16b and to obtain a quality of a captured image.

In other words, a multi-aperture imaging device can include several imaging channels (optical channels), each transmitting a partial area of the object area, wherein the partial areas partly cover or overlap each other and at least one of the optical channels projects at least two non-contiguous object areas. This means that there is a gap in the image of this channel. A number or total number of the optical channels might transmit the total field of view completely.

Figure 6B:
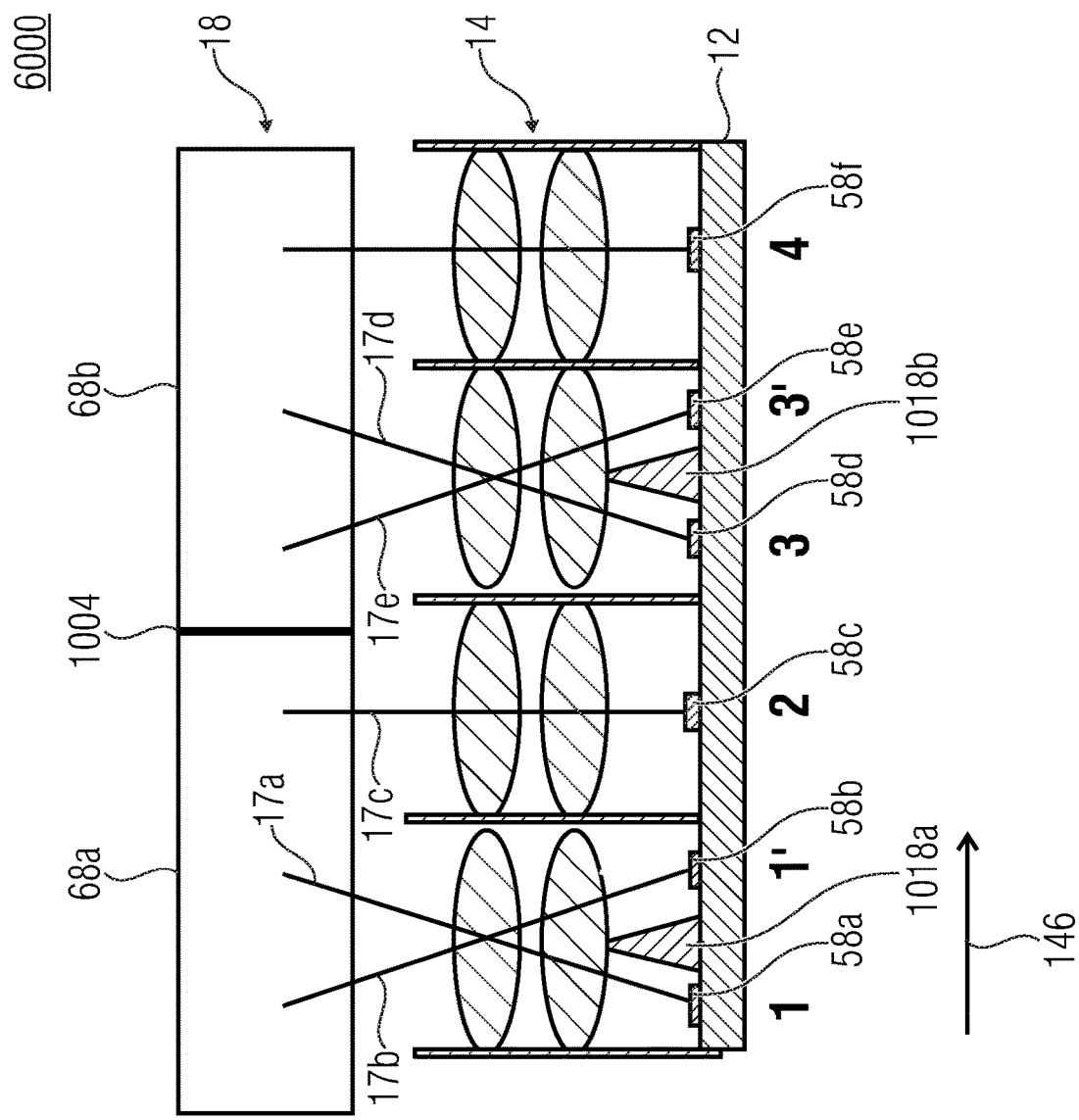
FIG. 6b shows a schematic top view of the multi-aperture imaging device according to FIG. 6a further comprising an at least partly opaque structure arranged between the image sensor areas and on the image sensor in the direction of the object area.

FIG. 6b shows a schematic top view of a multi-aperture imaging device 6000 further comprising an at least partly opaque structure 1018a which is arranged between the image sensor areas 58a and 58b on the image sensor in the direction of the object area. The at least partly opaque structure 1018a can include a semiconductor material, a glass, ceramic or glass ceramic material, a plastic material and/or a metal material and can be at least partly opaque in a wavelength range where images are captured by the multi-aperture imaging device 6000. In that way, for example in an infrared capturing, a plastic material or metal material can be advantageous compared to a semiconductor material when the semiconductor material is transparent for infrared radiation. Alternatively, for wavelengths in the visible range, a semiconductor material or plastic material can be advantageous compared to a metal material since the metal material can possibly cause higher production effort, higher weight and/or higher costs.

The at least partly opaque structure 1018a allows suppression of stray light between the image sensor areas 58a and 58b, i.e. crosstalk between the partial images of an optical channel is reduced. In a same or similar manner, the optical channel 16c comprises an at least partly opaque structure 1018b which can be formed in the same or similar manner as the at least partly opaque structure 1018a.

The at least partly opaque structures 1018a and 1018b can have a constant or a variable cross-section. The cross-section can be considered as dimension along a line-extension direction 146. The line-extension direction 146 can be a direction along which the optical channels in the array 14 are arranged and/or can run parallel to the image sensor 12. The at least partly opaque structures 1018a and 1018b are arranged on or adjacent to the image sensor 12. In the direction towards the array 14, the cross-section of the at least partly opaque structures 1018a and 1018b tapers. This allows a geometry of the at least partly opaque structures 1018a and 1018b that is adapted to the optical paths 17a and 17b and 17d and 17e, respectively. Thus, the at least partly opaque structures 1018a and 1018b are arranged between the image sensor areas of the image sensor 12 and allow improved channel separation between the optical channels 16a-d and between the image sensor areas. In the areas behind the at least partly opaque structures 1004a and 1004b between the image sensor areas 58a-c, non-light-sensitive integrated circuits, electronic components (resistors, capacitors) and/or electric connecting elements (bonding wires, vias) or the same can be arranged.

Figure 6C:
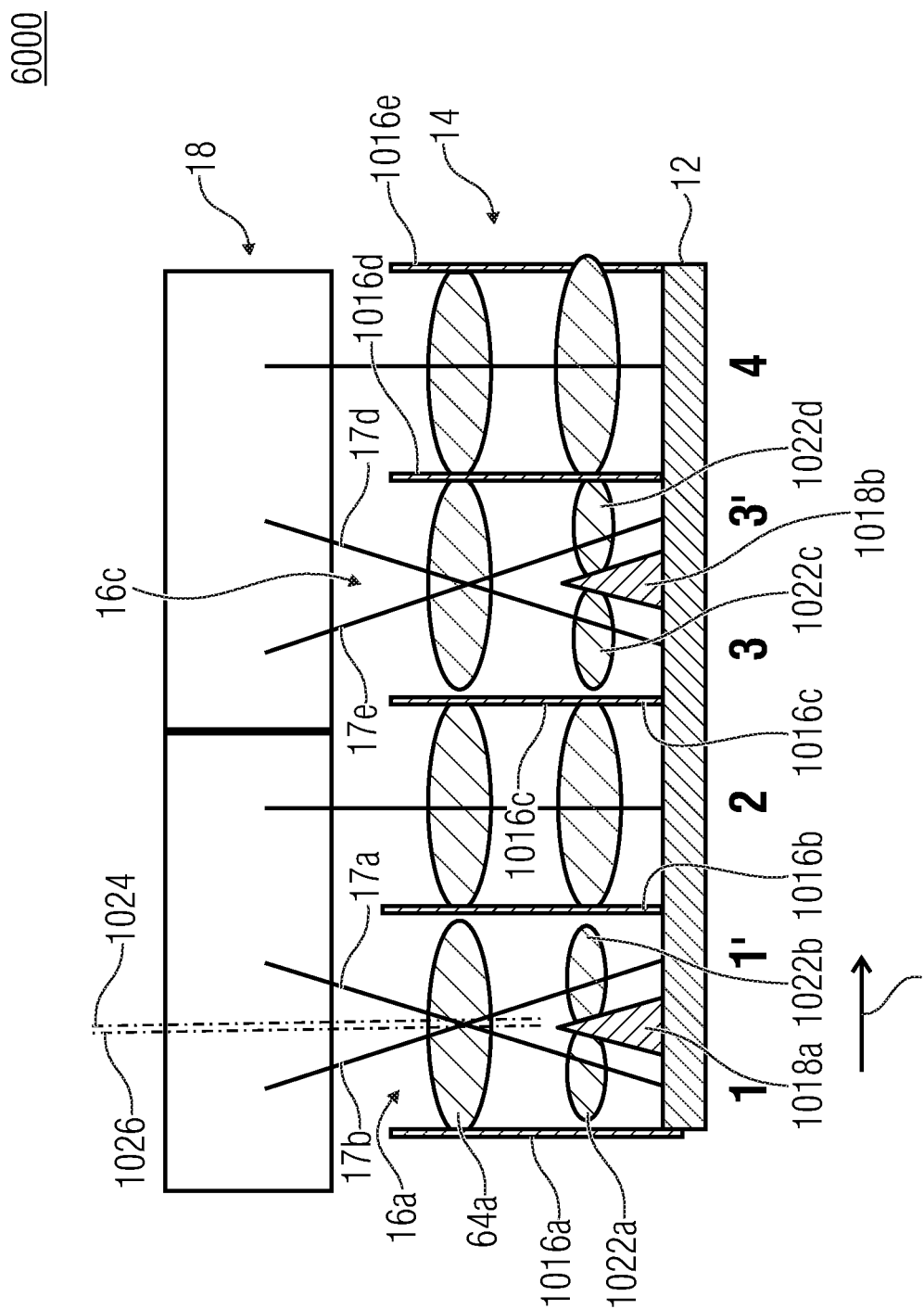
FIG. 6c shows a schematic top view of the multi-aperture imaging device of FIG. 6a wherein the optical channels comprise partial area optics.

FIG. 6c shows a schematic top view of the multi-aperture imaging device 6000 where the optical channels 16a and 16c comprise partial area optics 1022a-1022d. The partial area optics 1022a-d can, for example, be lenses, refractive or diffractive elements, each allocated exclusively to one partial area. Thus, for example the partial area optics 1022a is configured to influence the optical path 17a and to not influence the optical path 17b. The optical path 17a can be used for projecting, for example, the partial area 74a as described in the context of FIG. 1. The partial area optics 1022b can be configured to influence the optical path 17b that projects, for example, the partial area 74b. The partial area optics 1022b is configured to not influence the optical path 17a. Alternatively, the optical channel 16a can comprise merely one of the partial area optics 1022a or 1022b and/or further partial area optics merely allocated to the optical path 17a or 17b. The partial area optics 1022a and/or 1022b can, for example, be mechanically fixed to the at least partly opaque structure 1018a. Alternatively or additionally, the partial area optics 1022a can be mechanically fixed to the structure 1018a or 1016a. In the same way, the partial area optics 1022b can be mechanically fixed to the structure 1018b and/or 1016b. According to an alternative embodiment, partial area optics 1022a and/or 1022b can be mechanically connected to the optics 64*a* and suspended via the same with respect to the image sensor. According to a further embodiment, the optics 64*a* can be mechanically connected to the partial area optics 1022*a* and/or 1022*b* and be suspended via the same with respect to the image sensor 12.

The partial area optics 1022*a* can, for example, be produced as roof prism. The partial area optics 1022*a* and 1022*b* can, for example, also be two parts of a roof prism which is divided into two parts and/or mirror-symmetrical. The roof prism can, for example, be mirror-symmetrical to the plane 1024.

The partial area optics 1022*c* and 1022*d* can each also be exclusively allocated to one partial area and influence a projection of the same on a respective image sensor area. If an optical channel 16*a* or 16*c* comprises two partial area optics 1022*a* and 1022*b* and 1022*c* and 1022*d*, respectively, the two partial area optics can be structured identically. The partial area optics 1022*a* and 1022*b* can, for example, be arranged mirror-symmetrically around a symmetry plane 1024.

The symmetry plane 1024 can be arranged in space such that the same includes an optical axis 1026 of the optics 64*a* shared by the partial area optics 1022*a* and 1022*b* and running perpendicular to the line-extension direction 146 of the array 14. Although the symmetry plane 1024 and the axis 1026 are not shown congruently to one another in FIG. 7*c*, the plane 1024 and the axis 1026 are congruent, since the plane 1024 includes the axis 1026. The non-congruent illustration merely serves for a better illustration. According to an embodiment, the optics 64*a* is configured such that an imaging function of the optics 64*a* is rotationally symmetrical with respect to a main viewing direction of the optics 64*a* or mirror-symmetrical with respect to the symmetry plane 1024. This allows the optical paths 17*a* and 17*b* to be symmetrically influenced by the optics 64*a*.

The mirror-symmetrical arrangement or implementation of the partial area optics 1022*a* and 1022*b* allows symmetrical influencing of the optical paths 17*a* and 17*b* such that the optics 64*a* can also be configured symmetrically. This allows, for example, symmetrical deflection or influencing the optical paths towards symmetrically distributed partial object areas. The multi-aperture imaging device 7000 can also be configured such that the optics 64*a* is not mirror-symmetrical, for example when irregular distribution of the partial areas within the object area is intended. According to alternative embodiments, the partial area optics 1022*a* and 1022*b* can also be asymmetrical with regard to the plane 1024, for example when unsymmetrical or asymmetrical distortion of the two optical paths 17*a* and 17*b* is intended.

In other words, the separating structures 1018*a* and 1018*b* taper between the partial areas in the direction towards the object. The separating structures (at least partly opaque structures) 1018*a* and 1018*b* can be configured symmetrically to the optical axis 1026. Lenses can be arranged, for example the partial area optics 1022*a* and 1022*b* that are each used only by one partial area. These lenses can be identical and/or can be arranged mirror-symmetrically to the optical axis 1026 with regard to their optical characteristic. Further, rotational symmetry might not be implemented.

The partial area optics 1022*a-d* can be configured in several layers, i.e. in several planes and can hence each consist of more than only one lens, a refractive or diffractive surface. Optics 16*a* and 16*c* can also be configured in a multilayered manner and can hence consist of more than only one lens, a refractive or diffractive surface.

Figure 7A:
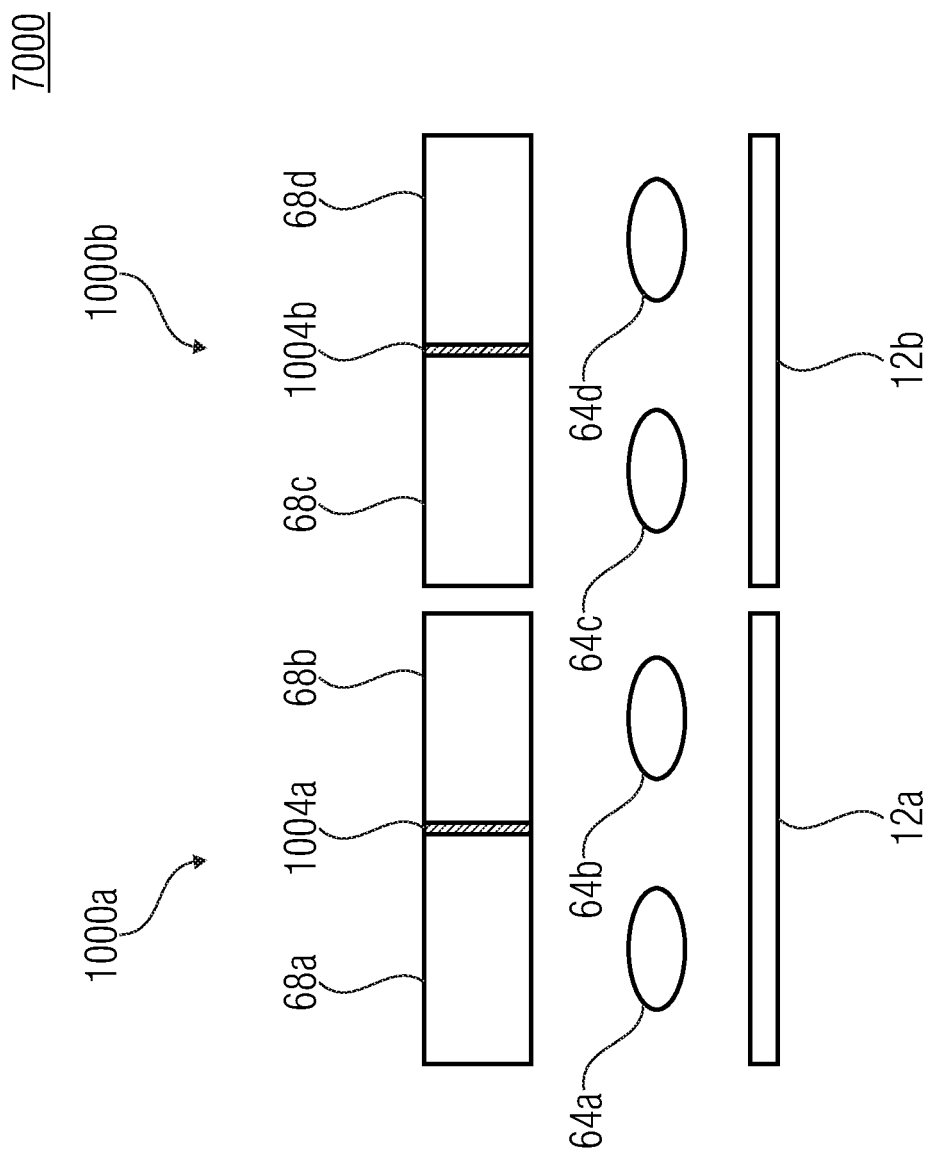
FIG. 7a shows a schematic top view of an imaging system according to an embodiment.

FIG. 7*a* shows a schematic top view of an imaging system 7000 comprising a first multi-aperture imaging device 1000*a* and a second multi-aperture imaging device 1000*b*. Alternatively or additionally, the imaging system 7000 can comprise a different multi-aperture imaging device described herein, such as the multi-aperture imaging device 2000, 3000, 4000, 5000 or 6000. The multi-aperture imaging system can be implemented, for example, as mobile phone, smartphone, tablet or monitor.

The multi-aperture imaging devices 1000*a* and 1000*b* can each be referred to as module. Each of the modules can be configured and arranged to capture the total field of view completely or almost completely such that the imaging system 7000 is implemented to capture the total field of view stereoscopically by modules 1000*a* and 1000*b*. This means the imaging system 7000 comprises, for example a stereo structure. According to further embodiments, an imaging system comprises further additional modules, such as triple structures, quadruple structures or higher order structures result.

FIG. 7*b* shows a schematic top view of an imaging system 7000', which can be considered as a modified variation of the imaging system 7000. The modules 1000*a* and 1000*b* can comprise a common image sensor 12. Alternatively or additionally, the modules 1000*a* and 1000*b* can comprise a common beam-deflecting means 18. Alternatively or additionally, the modules 1000*a* and 1000*b* can comprise a common array 14 of juxtaposed optical channels 16. According to further embodiments, the imaging system can also comprise other common components. This can, for example, be a common focusing means including at least one actuator for commonly adjusting a focus of the first and second multi-aperture imaging devices. Alternatively or additionally, it can be an optical image stabilizer having a joint effect for at least one optical path of the first multi-aperture imaging device and for at least one optical path of the second multi-aperture imaging device for image stabilization along a first image axis and a second image axis by generating a translational relative movement between the image sensor and the array or the beam-deflecting means of the first or second multi-aperture imaging devices. Alternatively or additionally, it can be an optical image stabilizer having a joint effect for the at least one optical path of the first multi-aperture imaging device and for the at least one optical path of the second multi-aperture imaging device, wherein the optical image stabilizer is configured to generate, for image stabilization along a first image axis, a translational relative movement between the image sensor and the array and, for image stabilization along a second image axis, a rotational movement of the beam-deflecting means of the first multi-aperture imaging device or the beam-deflecting means of the second multi-aperture imaging device. These components will be discussed in more detail below. In other words, the modules can be contiguous and can result in a single common module.

In the following, reference is made to devices including at least one multi-aperture imaging device. The devices can be imaging systems that are configured to image the object area by means of the at least multi-aperture imaging device. The multi-aperture imaging device as described below, can, for example, the multi-aperture imaging device 1000, 2000, 3000, 4000, 5000 or 6000.

Figure 8A:
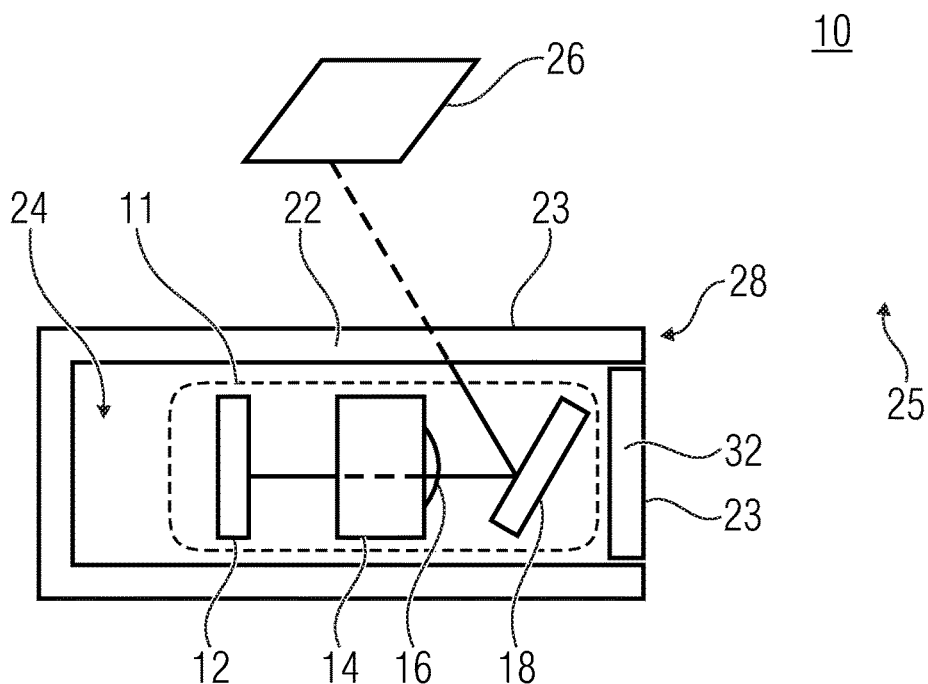
FIG. 8a shows a schematic side-sectional view of a device according to an embodiment in a first operating state.

FIG. 8*a* shows a schematic side sectional view of a device 10 according to an embodiment in a first operating state. The device 10 can be a mobile or immobile device, such as a mobile phone, a smartphone, a mobile computer such as a tablet computer and/or a mobile music player.

The device 10 includes a multi-aperture imaging device 11, such as the multi-aperture imaging device 1000, 2000, 3000, 4000, 4000', 5000 and/or 6000 comprising an image sensor 12, an array 14 of juxtaposed optical channels 16 and beam-deflecting means 18. The beam-deflecting means 18 is configured to deflect an optical path 17 of the optical channels 16 and will be discussed in detail below. The device 10 includes a housing 22 with external surfaces 23 enclosing a housing volume 24. This means the housing volume 24 can include an inner volume of the housing 22 and the volume of the housing 22. Thus, the housing volume includes also a volume claimed by the housing walls and is hence enclosed by the external surfaces 23 of the housing. The housing 22 can be formed in a transparent or opaque manner and can include, for example, plastic materials and/or metal materials. The beam-deflecting means 18 has a first position inside the housing volume 24. Holes or openings in the sides of the housing, such as for acoustical channels of microphones or for electrical contacts of the device 10, can be neglected for determining the housing volume 24. The housing 22 and/or members arranged within the housing 22 can block the optical path 17 of the optical channels 16 after deflection by the beam-deflecting means 18, such that a field of view 26 arranged outside the housing 22 that is to be captured by the multi-aperture imaging device 11 cannot be captured at all or only to a limited extent. The members can, for example, be an accumulator, printed circuit boards, non-transparent areas of the housing 22 or the same. In other words, instead of a conventional camera objective, a different, possibly non-optical, device can be arranged on a housing.

The housing 22 can comprise an opening 28 through which the housing volume 24 is connected to an external volume 25 of the housing 22. At times, the opening 28 can be completely or partly closed by a cover 32. The first operating state of the device 10 can be an inactive operating state of the multi-aperture imaging device 11 where the optical channels 16 are directed, for example, on the inner side of the housing 22 or are not deflected at all.

In other words, the installation height of the structure of the multi-aperture imaging device is at least partly determined by the diameter of optics of the optical channels 16 (lenses). In a (possibly optimum) case, the extension of the mirrors (beam-deflecting means) in this thickness direction is equal to the extension of the lenses in this direction. Here, however, the optical path of the optical channel 16 is restricted by the mirror 18. This results in a reduction of image brightness, wherein this reduction depends on the field angle. The present embodiments solve this problem by moving parts of or the total multi-channel camera structure, such that, in the operating state of the camera, parts of the structure project beyond the housing, e.g., of a smartphone compared to the non-usage state of the camera. The movement of the parts, such as the beam-deflecting means, can be rotational (folding out or folding open), translational (extending) or a mixed form. The additional movements of parts and the total system, respectively, allow a minimum structural shape in the non-usage mode of the camera, similar to known objectives of compact cameras, and a greater structural shape in the usage mode of the camera optimized for realizing the technical function.

Figure 8B:
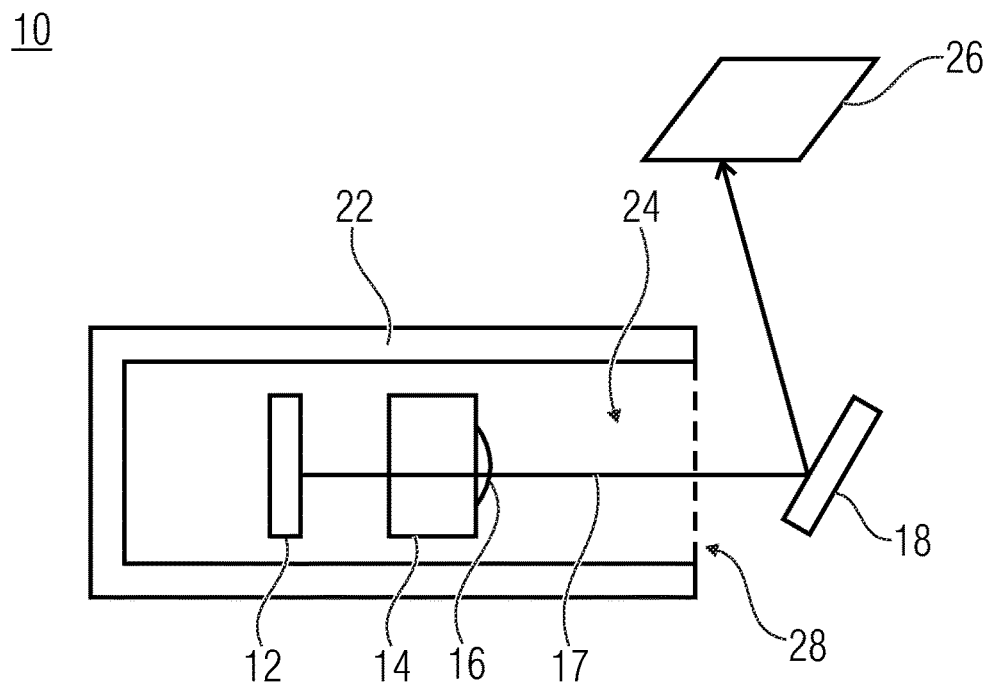
FIG. 8b shows a schematic side-sectional view of the device of FIG. 8a in a second operating state.

FIG. 8b shows a schematic side sectional view of the device 10 in a second operating state. In the second operating state, the beam-deflecting means 18 has a second position outside the housing volume 24. This enables the beam-deflecting means 18 to deflect the optical paths 17 of the optical channels 16 outside the housing volume 24 and the field of view 26 so that the same can be captured outside the housing 22 by the multi-aperture imaging device 11. The cover 32 can be moved away from the position shown in FIG. 1a, such that the beam-deflecting means 18 can be moved out of the housing volume 24 through the opening 28 of the housing 22. The beam-deflecting means 18 can be moved translationally and/or rotationally between the first position and the second position. It is advantageous that the members inside the housing 22 and/or the housing 22 itself do not block the deflected optical path 17 of the optical channels 16.

The multi-aperture imaging device 11 can be arranged in a camera housing which is arranged again at least partly inside the housing 22. The camera housing can be formed, for example, at least partly by a travel carriage as described in the context of FIG. 12. This differs from a concept where a single-channel camera is oriented in different directions by means of a folding mechanism in that in the present case rotation or tilting of the image sensor and/or the imaging optics can be prevented.

A total field of view can be captured by means of the device 10 such that, starting from the first position, the beam-deflecting means is moved into the second position, where the beam-deflecting means is placed at least partly outside of a housing volume. When the beam-deflecting means is in the second position, the total field of view can be captured by the array of juxtaposed optical channels of the multi-aperture imaging device whose optical paths are deflected by the beam-deflecting means.

Figure 9A:
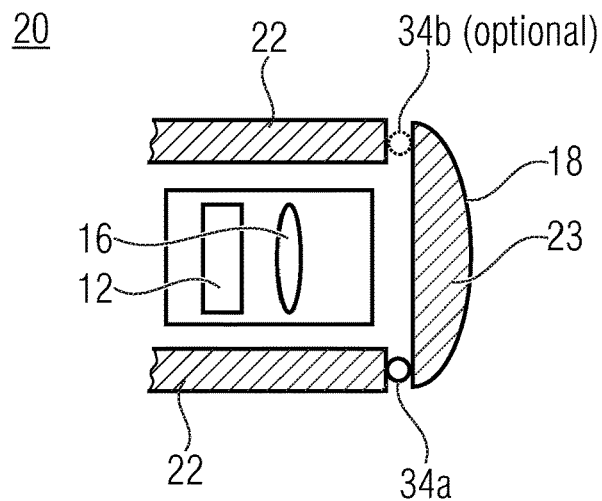
FIG. 9a shows a schematic side-sectional view of a device according to a further embodiment comprising a cover.

FIG. 9a shows a schematic side sectional view of a device 20 according to a further embodiment in a first operating state. The device 20 comprises the cover 23 which is pivoted on the housing 22, for example via a connecting element 34a and/or via an optional connecting element 34b. The connecting element 34a and/or 34b can be configured to allow tilting and hence rotational movement between the cover 23 of the beam-deflecting means 18 with respect to the housing 22 and can be formed, for example, as hinge or roller bearing.

The beam-deflecting means 18 can form a cover of the housing or can be part thereof. One of the beam-deflecting surfaces of the beam-deflecting means 18 can be an outer edge of the housing. The beam-deflecting means 18 comprising a first position and closes the housing 22 partly or completely. The beam-deflecting means 18 can comprise, for example, a reflective area for deflecting the optical path 17 and can comprise contact areas that are configured to form a mechanical contact with the housing 22 in the first position. Simply put, the camera might not or only hardly be visible when not in use.

Figure 9B:
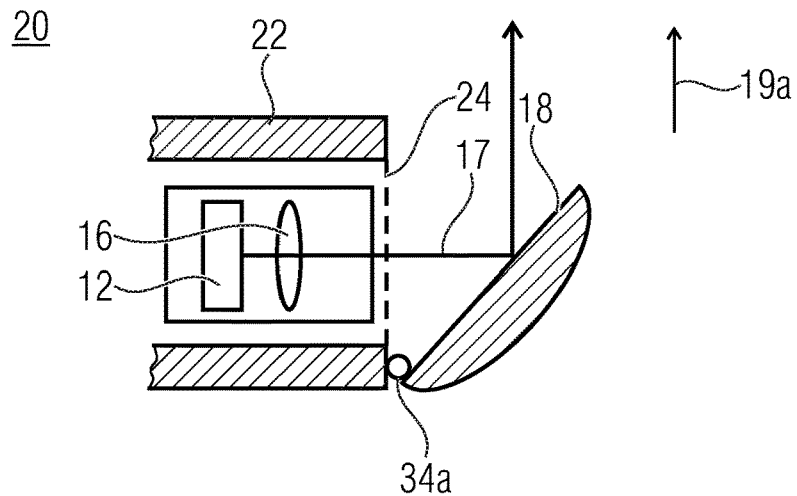
FIG. 9b shows a schematic side-sectional view of the device of FIG. 9a in a second operating state.

FIG. 9b shows a schematic side sectional view of the device 20 in a second operating state. In the second operating state, the beam-deflecting means 18 can be moved rotationally with respect to the housing 22, i.e., folded out, such that the housing volume 24 is opened. The rotational tilting allows an inclined or tilted orientation of the beam-deflecting means 18 with respect to a course of the optical path 17 of the optical channel 16 between the image sensor 12 and the beam-deflecting means 18, such that the optical path 17 is deflected in a first direction 19a at the beam-deflecting means 18.

Figure 9C:
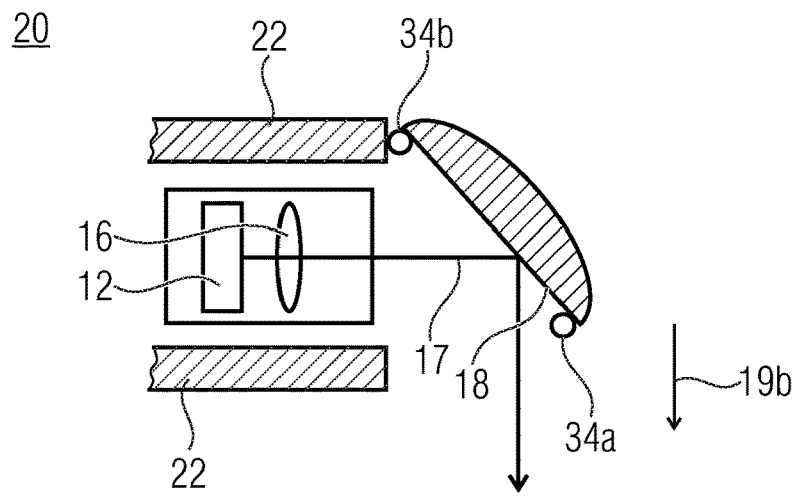
FIG. 9c shows a schematic side-sectional view of the device of FIG. 9a in a third position.

FIG. 9c shows a schematic side sectional view of the device 20 in a third position. The device 20 can be in the second operating state. Compared to the second position as illustrated in FIG. 9b, the beam-deflecting means 18 can deflect the optical path 17 of the optical channels 16 in a different direction 19b, such that a different field of view or a field of view positioned at a different location can be captured. For example, this can be a first side and an opposite side such as front side and rear side, left and right or top and bottom of the device 20 and/or a user into which the optical path 17 is deflected. The connecting elements 34a and 34b can be connected, for example, with a frame structure and the beam-deflecting means 18, such that the beam-deflecting means 18 can alternatively comprise the second or third position. By a switchable viewing direction of the multi-aperture imaging device, conventional solutions in particular in smartphones using two cameras with viewing direction to the front and back can be replaced by one structure.

Figure 10A:
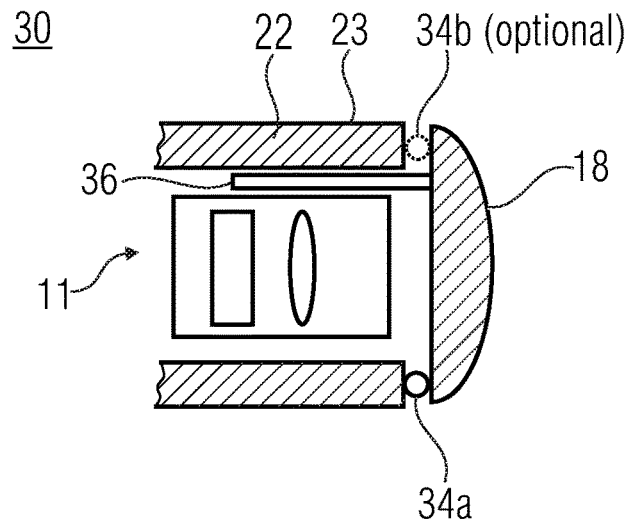
FIG. 10a shows a schematic side sectional view of a device according to a further embodiment in the first operating state comprising an at least partly transparent cover.

FIG. 10a shows a schematic side sectional view of a device 30 according to a further embodiment in the first operating state. Compared to the apparatus 20 as described in FIGS. 3a-3b, the device 30 comprises an at least partly transparent cover 36 arranged between an outer edge 23 of the housing 22 and the multi-aperture imaging device 11. The at least partly transparent cover is connected to the beam-deflecting means 18 and configured to move based on a movement of the beam-deflecting means 18. The at least partly transparent cover 36 can, for example, comprise polymer and/or glass materials.

In other words, devices can be provided which allow encapsulation of the optics for protection from decontamination with the option of changing the encapsulated volume (moveable cover glasses).

Figure 10B:
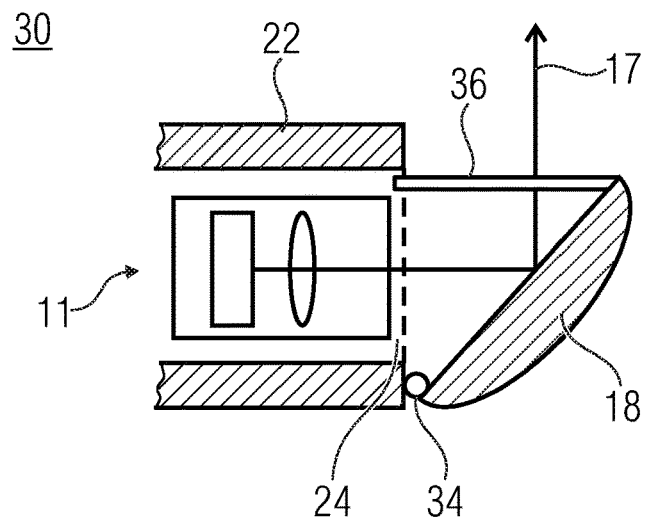
FIG. 10b shows a schematic side sectional view of the device of FIG. 10a in the second operating state.

FIG. 10b shows a schematic side sectional view of the device 30 in the second operating state. Compared to the device 20 in FIG. 9b, the at least partly transparent cover is moved at least partly out of the housing volume 24. This can be performed by a rotational movement of the beam-deflecting means around the connecting element 34. The beam-deflecting means 18 is configured to deflect the optical path 17 of the optical channels 16 such that the optical channels run through the at least partly transparent cover. The cover 36 is configured to reduce or prevent entry of particles, dirt and/or moisture into the housing volume 24. Here, the cover 36 can be formed in a transparent and/or partly opaque manner for the optical paths 17. The cover 36 can, for example, be opaque for specific wavelength ranges of electromagnetic radiation. It is an advantage of the cover 36 that due to the reduced amount of particles, dirt and/or moisture, long operating life of the device and/or a continuously high image quality can be obtained since contamination of optics of the optical channels is low.

Figure 10C:
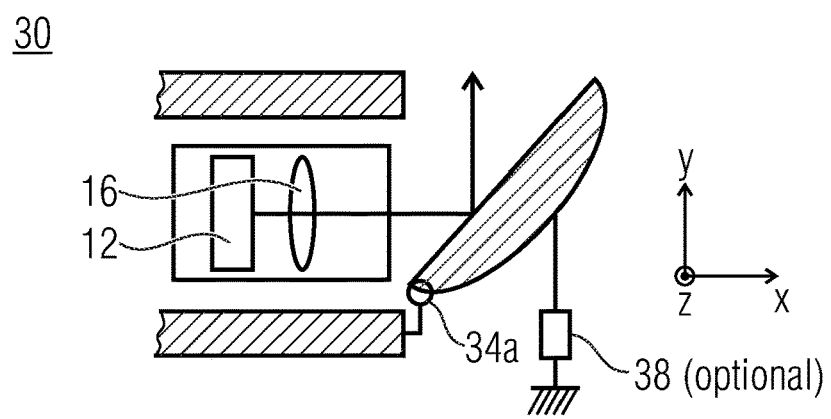
FIG. 10c shows a schematic side sectional view of the device of FIG. 10a where a beam-deflecting means is additionally moveable in a translational manner.

FIG. 10c shows a schematic side sectional view of the device 30 where the beam-deflecting means 18 is translationally movable with an optional actuator 38 along a direction y perpendicular to a direction x of the optical path 17 between the image sensor 12 and the optical channels 16 and perpendicular to a direction z perpendicular to a line-extension direction of the array of optical channels 16. The beam-deflecting means 18 can also be moved translationally around the connecting element 34 based on the rotational movement, for example around a guide, a level or the same. The folding up (rotational movement) can be performed manually or by using an actuator. The optional actuator 38 can be arranged on the beam-deflecting means 18. Alternatively, the actuator 38 can be arranged between the housing 22 and the beam-deflecting means 18. The actuator 38 can be arranged, for example, between the housing 22 and the connecting element 34a and/or between the connecting element 34a and the beam-deflecting means 18. It is an advantage that due to the translational movement of the beam-deflecting means along the x direction of the housing, shading of the field of view to be captured by the housing 22 can be reduced.

FIG. 11a shows a schematic side sectional view of a device 40 according to an embodiment in the first operating state, in the first position the beam-deflecting means 18 is arranged inside the housing volume of the housing 22 and is configured to be moved, based on a translational movement 42, from the first position to the second position which is schematically illustrated in FIG. 11b. As illustrated in FIG. 11a, the housing can comprise the cover 32 which closes the housing 22 and an opening therein, respectively, in the first operating state. The beam-deflecting means 18 can be oriented in the first operating state such that the same has a minimum extension perpendicular to a direction x which is defined by the optical path inside the housing 22.

FIG. 11b shows a schematic side sectional view of the device 40 in the second operating state. The beam-deflecting means is moved out of the housing volume 24 based on the translational movement 42, for example, along the x direction. For this, the beam-deflecting means 18 can be moved through the opening 28. The beam-deflecting means 18 can be rotationally moveable around an axis of rotation 44. During the translational movement between the first operating state and the second operating state, the beam-deflecting means 18 can perform a rotational movement around the axis of rotation 44. An angular orientation of the beam-deflecting means can be amended compared to the first operating state of FIG. 11a, such that the area of the beam-deflecting means used by the optical path of the multi-aperture imaging device increases in comparison to the first operating state. A rotational movement 46 around the axis of rotation 44 allows a variable inclination of the beam-deflecting means 18 with respect to the optical path 17 between the optical channels 16 and the beam-deflecting means 18 and hence a variable direction in which the optical path 17 of the optical channel 16 is deflected. The optical channels 16 can comprise optics 64a-b.

In addition to the beam-deflecting means 18, optics 64a-b of the optical channels 16 and/or the image sensor 12 can be arranged outside the housing volume 24 in the second operating state. The optics 64a-b of the optical channels 16 and/or the image sensor 12, for example, can be moved together with the beam-deflecting means 18. This allows a short to minimum distance between the optics 64a-b of the optical channels and the beam-deflecting means 18, in particular in the second operating state. The short distance enables a small surface area of the beam-deflecting means 18. An increasing distance would entail a greater area of the beam-deflecting means 18 for completely deflecting the scattering optical path of the optical channels 16. Due to the short or minimum distance, the beam-deflecting means 18 can also have a small area, which is advantageous, since a smaller member has to be moved and by a rotational movement, a thickness of the device does have to be increased only slightly or not at all with respect to a state where the beam-deflecting means 18 is not arranged. The small size has also an advantageous effect on installation space requirements, for example in the first operating state.

In other words, multi-aperture cameras with linear channel arrangement comprise several optical channels that are juxtaposed and each transmit parts of the total field of view. Advantageously, a mirror is mounted in front of the imaging lenses which can be used for beam deflection and contributes to reducing the installation height. In combination with a mirror that is adapted channel by channel, such as a facet mirror, wherein the facets are planar or curved in an arbitrary manner or provided with a freeform area, it is advantageously possible that the imaging optics of the optical channels are essentially structured identically, whereas the viewing direction of the channels is predetermined by the individual facets of the mirror array. A surface of the beam-deflecting means is at least mirrored at the reflecting facets allocated to the optical channels. It is also possible that the imaging optics of the channels are implemented differently, such that different viewing directions result by the angle of the mirror facet and the implementation of the respective optical channel. It is further possible that several channels use the same area of the beam-deflecting means and hence the number of facets is smaller than the number of channels. Here, the deflecting mirror can be pivoted, wherein the axis of rotation runs, for example, parallel to the extension direction of the channels. The deflecting mirror can be reflective on both sides, wherein metallic or dielectric layers (sequences) can be used. The rotation of the mirror can be analog or stable along one/several directions. Based on the rotational movement, the beam-deflecting means can be movable between at least a first position and a second position, wherein the optical paths are deflected in differing directions in each position. In a similar way as described for the positions of the beam-deflecting means 18 in FIGS. 9a-9c, the beam-deflecting means can also be moved around an axis of rotation. In addition to the translational movement of the housing cover 32 and the beam-deflecting means 18, parts and all additional components of the multi-aperture imaging device, respectively, can be co-moved in a translational manner in the same direction, wherein the same or also different travel ranges are possible.

Figure 12A:
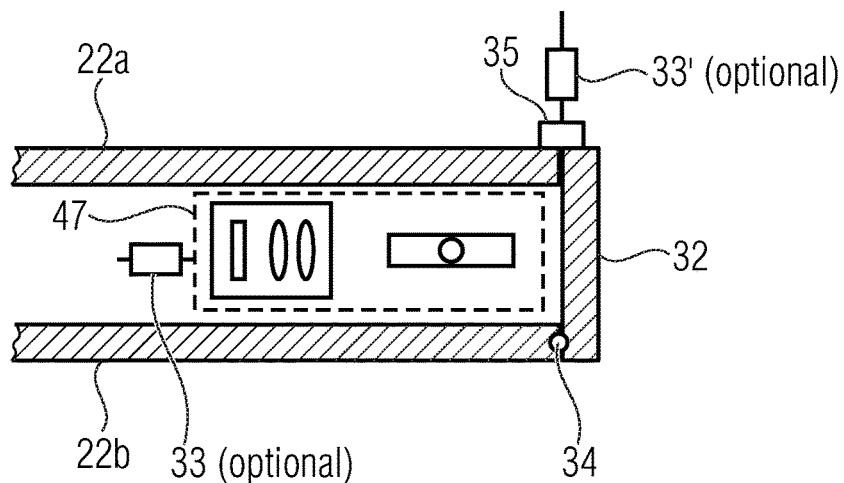
FIG. 12a shows a schematic side sectional view of a device according to an embodiment where the cover is arranged in a rotationally moveable manner.

FIG. 12a shows a schematic side sectional view of the device 50 where the cover 32 is arranged rotationally moveable via a moving element 34 on a housing side 22b of the housing 22. The beam-deflecting means 18 can be mechanically connected to a travel carriage 47. The travel carriage 47 can be considered as mechanical transport means for moving at least the beam-deflecting means 18. The device 50 can include an actuator 33 that is configured to translationally move the travel carriage 47. The actuator can include any drive, such as step motor, piezoelectric drive or a voice coil drive. As an alternative or in addition to the actuator 33, the device 50 can include an actuator 33' that is configured to release a mechanical lock 35 which locks the cover 32 and the housing on, at least, one housing side 22a. The beam-deflecting means or travel carriage 47 can be driven out of the housing by means of a spring force when the lock 33' is released. This means the lock 35 can be configured to maintain the beam-deflecting means 18 in the first position. The travel carriage 47 can also be arranged in the device 40. This means the travel carriage 47 can also be used for translational movement of the cover 32.

Figure 12B:
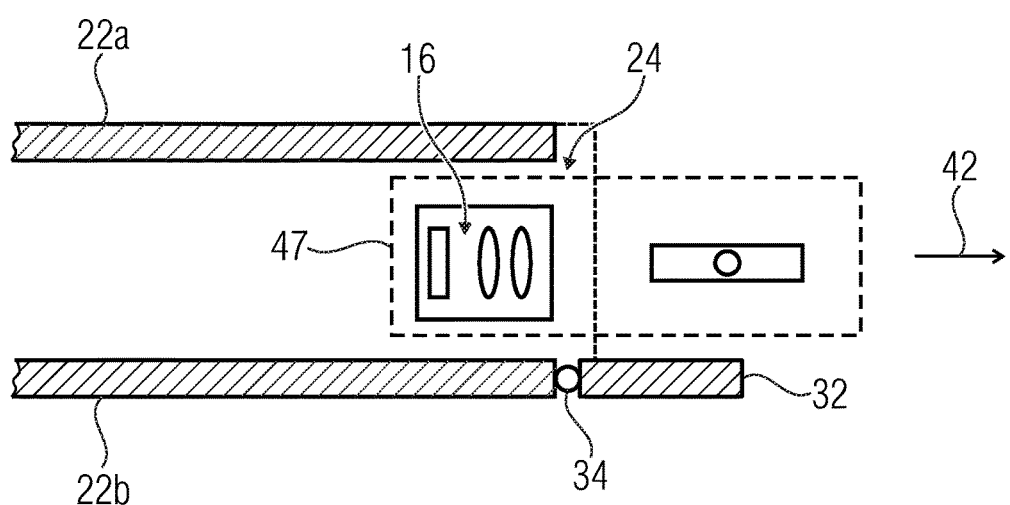
FIG. 12b shows a schematic side sectional view of the device of FIG. 12a where a travel carriage is translationally moveable.

FIG. 12b shows a schematic side sectional view of the device 50 where the travel carriage 47 is moved along the translational direction of movement 42, such that the beam-deflecting means 18 is moved out of the housing volume 24. The image sensor 12 and/or optics of the optical channels 16 can also be mechanically connected to the travel carriage 47 and can be moved together with the beam-deflecting means 18 to the same extent. Alternatively, the image sensor 12 and/or the optics of the optical channels 16 can be moveable to a smaller extent than the beam-deflecting means 18, such that a distance between the image sensor 12, the optics and/or beam-deflecting means 18 increases during extension. Alternatively or additionally, the image sensor 12 and/or the optics of the optical channels can be located stationary with respect to the housing, such that merely the beam-deflecting means 18 is moved by means of the travel carriage 47. An increasing distance between the image sensor 12, the optics and/or beam-deflecting means 18 during an extension allows a lower distance of the components in the first operating state, such that the multi-aperture imaging device can be accommodated in the housing 22 with less installation space requirements.

Figure 12C:
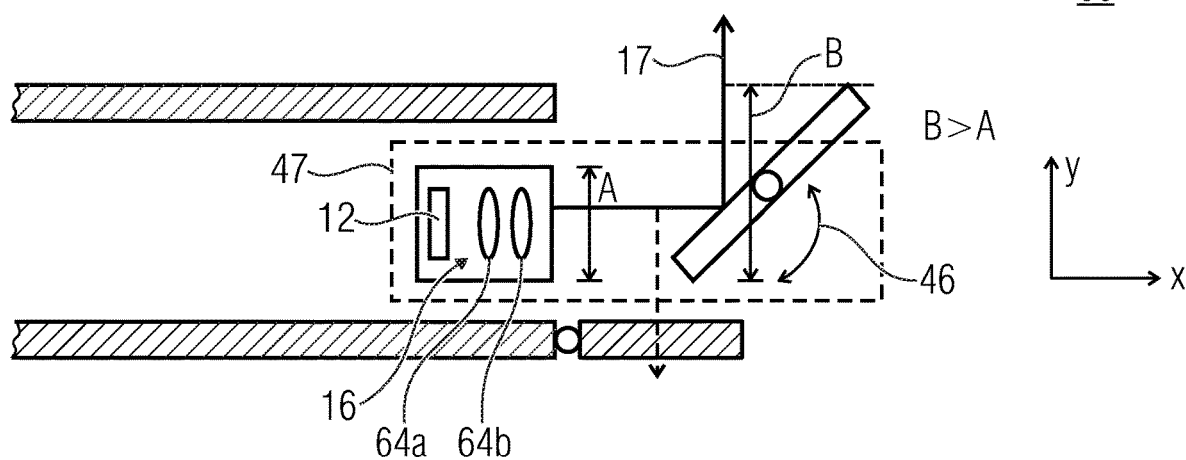
FIG. 12c shows a schematic side sectional view of the device of FIG. 12a in the second operating state.

FIG. 12c shows a schematic side sectional view of the device 50 in the second operating state. The beam-deflecting means can be pivoted for performing the rotational movement 46 as described, for example, for the device 40. As described in the context of FIG. 11b, the angular orientation of the beam-deflecting means 18 can be amended compared to the first operating state of FIG. 12a or the state in FIG. 12b, such that the area of the beam-deflecting means used by the optical path of the multi-aperture imaging device increases compared to the first operating state. The side of the beam-deflecting means 18 facing the optical channels 16 and the image sensor 12, respectively, can have a dimension B perpendicular to the translational direction of movement 42, for example along the y direction that is greater than a dimension A of the image sensor 12 and the optical channels 16, respectively, along this direction. The dimension B is, for example, perpendicular to a line-extension direction of the array and parallel to a surface of an image sensor on which the optical channels impinge. This can have the effect that a high amount of light can be deflected by the beam-deflecting means 18 and a brightness of an image to be captured is high. In a position shown in FIG. 12a, the extension or dimension B is smaller than in the position shown in FIG. 12c or a position where the beam-deflecting means 18 directs the optical path in another viewing direction.

Figure 13A:
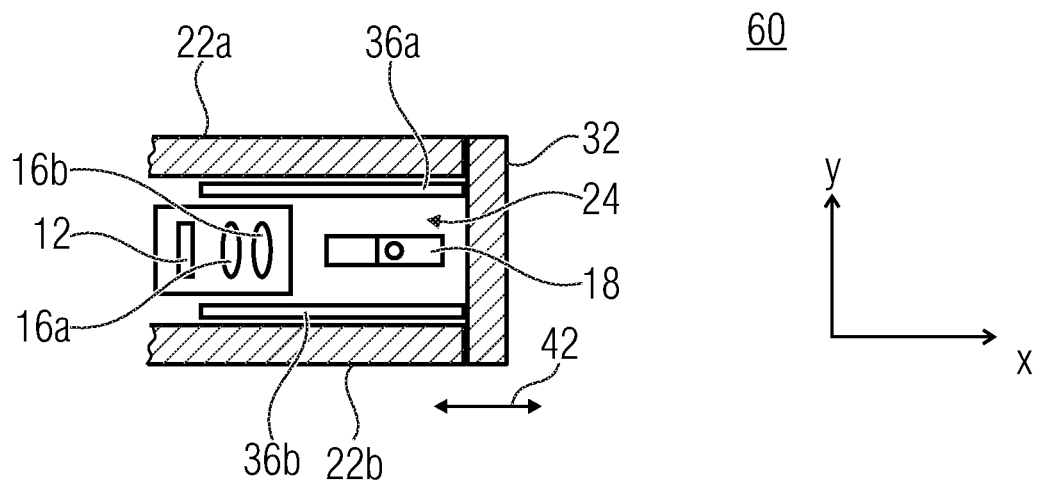
FIG. 13a shows a schematic side sectional view of a device according to an embodiment in the first operating state comprising at least partly transparent covers compared to the device of FIG. 12.

FIG. 13a shows a schematic side sectional view of a device 60 according to an embodiment in the first operating state. The beam-deflecting means 18 is in the first position. Compared to the device 40 and the device as described in FIGS. 4a and 4b, the device 50 comprises at least partly transparent covers 36a and 36b that are connected to the cover 32 and can be moved with the same along the translational direction of movement 42. The at least partly transparent covers 36a and 36b can each be arranged on different sides of the beam-deflecting means 18 between the same and the housing 22. In the first operating state, the covers 36a and 36b can be arranged partly or completely inside the housing volume 24. The covers 36a and 36b can be arranged, for example, on the travel carriage 47 illustrated in FIG. 12a-c or can be transparent areas of the travel carriage 47.

Figure 13B:
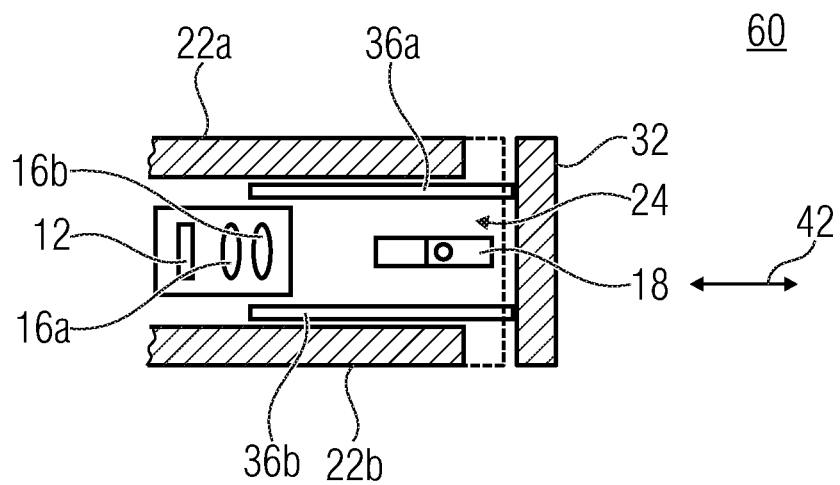
FIG. 13b shows a schematic side sectional view of the device of FIG. 13a wherein the beam-deflecting means comprises an intermediate position between a first position and a second position.

FIG. 13b shows a schematic side sectional view of the device 60 where the beam-deflecting means 18 is in an intermediate position between the first position and the second position. The intermediate position of the beam-deflecting means can be obtained, for example, during retraction or extension of the beam-deflecting means 18 into the housing volume 24 and out of the housing volume 24, respectively. The beam-deflecting means 18 is partly moved out of the housing volume 24.

Figure 13C:
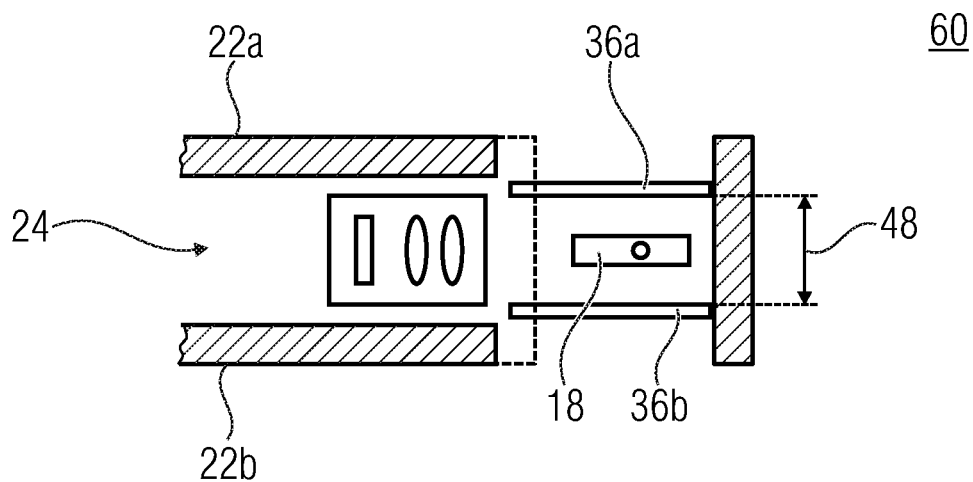
FIG. 13c shows a schematic side sectional view of the device of FIG. 13a where the beam-deflecting means is completely extended out of a housing volume.

FIG. 13c shows a schematic side sectional view of the device 60 where the beam-deflecting means 18 is in the second position, i.e., the beam-deflecting means 18 is, for example, completely extended out of the housing volume 24. The at least partly transparent covers 26a and 36b have a distance 48 to one another that is smaller than a comparative distance between lateral faces of the housing 22a and 22b.

Figure 13D:
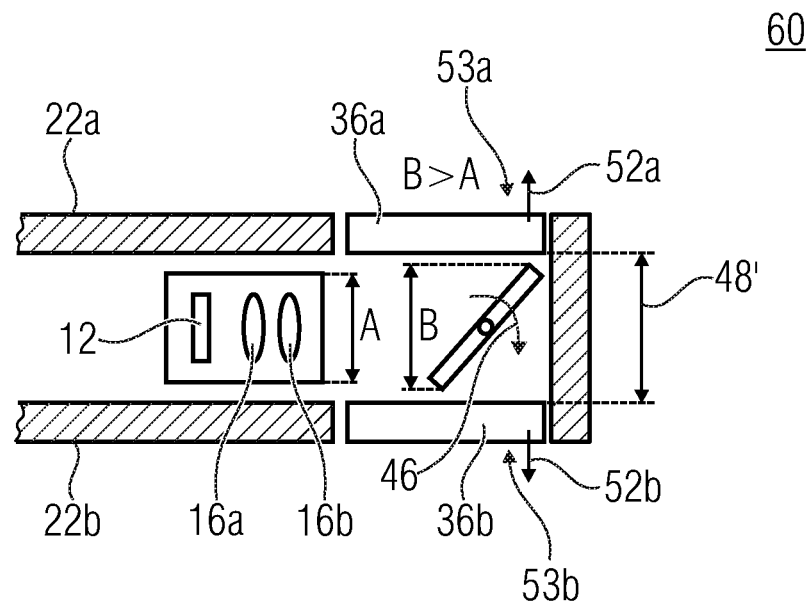
FIG. 13d shows a schematic side sectional view of the device of FIG. 13a where a distance between the at least partly transparent covers is enlarged compared to FIG. 13a-c.

FIG. 13d shows a schematic side sectional view of the device 60 where a distance of the at least partly transparent covers 36a and 36b is enlarged compared to FIGS. 13a-13c. The at least partly transparent covers 36a and/or 36b can be moveable along a translational direction of movement 52a and 52b, respectively, e.g. along a positive or negative y direction facing away from the respective other at least partly transparent cover 36a and 36b, respectively. The state of the at least partly transparent covers 36a and 36b illustrated in FIG. 13a-c can be considered as retracted or folded-in state. The state illustrated in FIG. 13d can be considered as extended or folded out state, where a distance 48' between the at least partly transparent covers 36a and 36b is changed and enlarged, respectively, with respect to the distance 48. The distance 48' can, for example, be greater than or equal to the distance between the comparable sides of the housing 22. The beam-deflecting means 18 is configured to deflect the optical paths of the optical channels such that the same run through the at least partly transparent covers 36a and/or 36b. As described in the context of FIG. 11b, FIG. 12a and FIG. 12b, the angular orientation of the beam-deflecting means 18 can be amended compared to the first operating state of FIG. 13a or the state in FIG. 13b or 13c, such that the area of the beam-deflecting means used by the optical path of the multi-aperture imaging device increases compared to the first operating state. Alternatively or additionally, the enlarged distance 48' can allow an increased extent of the rotational movement 46. With the rotational movement 46, the beam-deflecting means 18 can be switchable between at least a first and a further position, wherein each position can be allocated to a viewing direction of the multi-aperture imaging device. A rotation of the mirror can be analog or stable along one/several directions. The rotational movement 46 for changing a viewing direction of the multi-aperture imaging device can be combined with a rotational movement of the beam-deflecting means 18 for optical image stabilization, which is described in the context of FIG. 19. The covers 36a and/or 36b can encapsulate the other components of the multi-aperture imaging device.

The oppositely arranged covers 36a and/or 36b and transparent areas thereof, respectively, can comprise a switchable diaphragm, such that the switchable diaphragm is introduced, for example, above and/or below or along any direction of the beam-deflecting means. The diaphragm can be switched depending on the operating state and viewing direction of the camera. For example, a viewing direction of the multi-aperture imaging device which is not used can be at least partly closed by the diaphragm for reducing entry of stray light. The diaphragms can be, for example, mechanically moved or can be electrochromic. The areas influenced by the diaphragm can additionally be provided with a switchable diaphragm which covers the optical structure for the case of non-usage. The diaphragm can be electrically controllable and can include an electrochromic layer (sequence). The diaphragm can include a mechanically moved part. The movement can be performed by using pneumatic, hydraulic, piezoelectric actuators, DC motors, step motors, thermal actuators, electrostatic actuators, electrostrictive and/or magnetostrictive actuators or drives. In a state of the multi-aperture imaging device where the viewing direction penetrates a diaphragm, the diaphragm can be switched such as to let the optical paths of the optical channels pass. This means that the multi-aperture imaging device can have a first operating state and a second operating state. The beam-deflecting means can deflect the optical path of the optical channels in the first operating state such that the same passes through a first transparent area of the cover 36a. In the second operating state, the optical path of the optical channels can be deflected such that the same passes through a second transparent area of the cover 36b. A first diaphragm 53a can be configured to optically close the first transparent area in the second operating state at least partly. A second diaphragm 53b can be configured to optically close the second transparent area at least partly in the first operating state at times. In that way, entry of stray light from a direction which is not the current viewing direction of the multi-aperture imaging device can be reduced, which has an advantageous effect on the image quality. The first and/or second diaphragm 53a-b can be effective for at least one, for at least two or for all of the optical channels. For example, at least one, at least two or all optical channels of the multi-aperture imaging device can pass through the first diaphragm when the optical path of the optical channel is directed through the first transparent area and can pass through the second diaphragm when the optical path of the optical channels is directed through the second transparent area.

It should be noted that it is possible to combine a mechanism for folding out the beam-deflecting means according to FIGS. 2 and 3 with a mechanism for translational movement, i.e., mixed forms can occur. Folding out the housing and/or extending the beam-deflecting means can be performed such that possibly the imaging module, i.e., the optical channels, optics thereof and/or the image sensor are moved out of the housing volume. An angular change of the beam-deflecting means can enable an extension of the multi-aperture imaging device in thickness direction to be large and/or that the beam-deflecting means can unimpededly deflect the optical path towards the "front" and "back". Cover glasses, such as the covers 36 can also be fixed with respect to the folded out or extended elements. The cover glasses can have any planar or non-planar surface.

Figure 14:
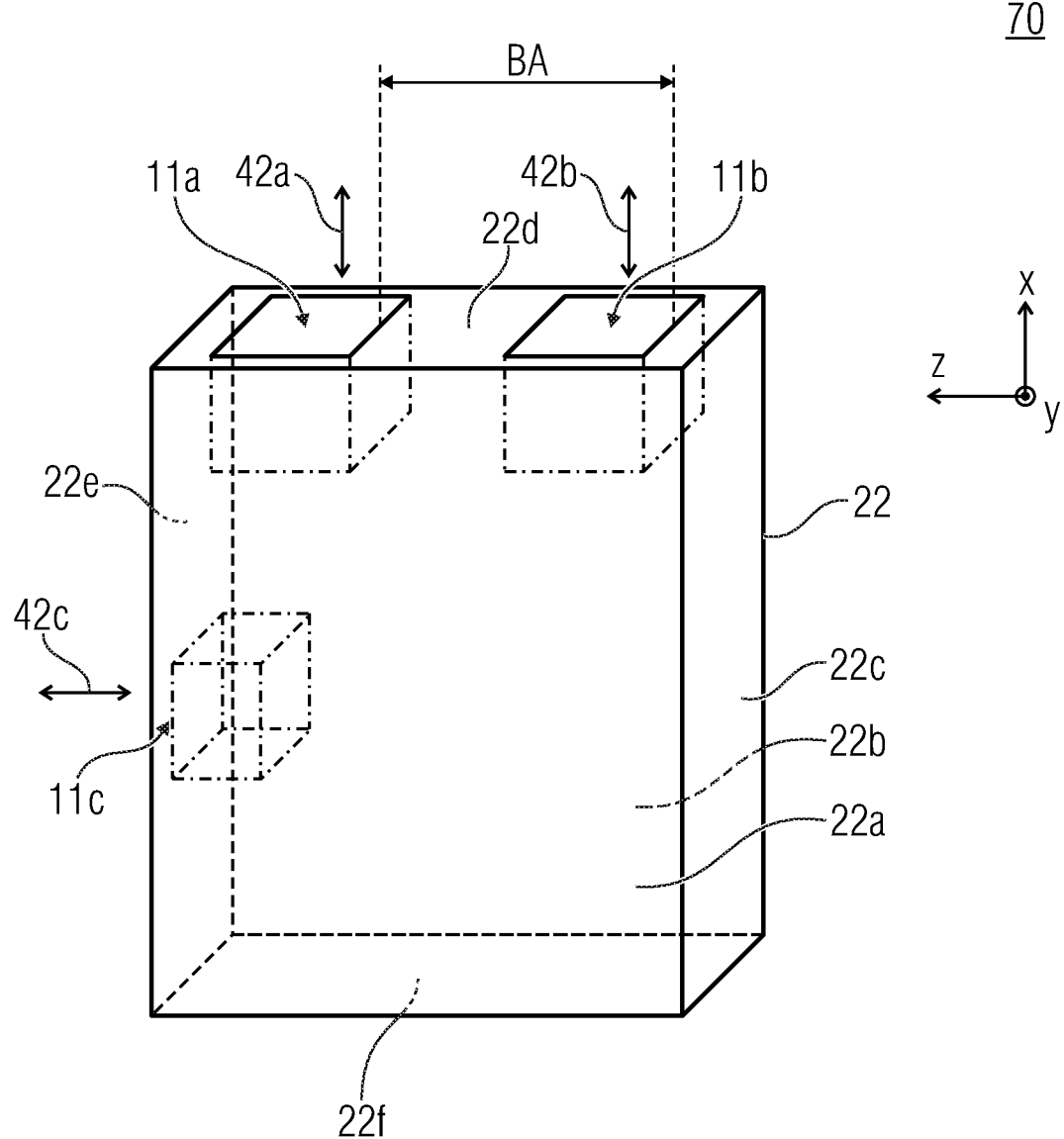
FIG. 14 shows a schematic perspective view of a device according to an embodiment comprising three multi-aperture imaging devices.

FIG. 14 shows a schematic perspective view of a device 70 according to an embodiment having the three multi-aperture imaging devices 11a-c. The multi-aperture imaging devices 11a-c can be translationally movable along a respective translational movement direction 42a-c. The multi-aperture imaging devices 11a-c can be arranged in secondary sides 22c-f of the housing 22. The housing can be formed in a flat manner, this means a first extension of the housing 22 along a first housing direction, for example an x direction, and a second extension of the housing 22 along a second housing direction, for example a z direction can have at least a three-fold dimension, at least a five-fold or at least a seven-fold dimension compared to a third extension of the housing 22 along a third housing direction, such as a y direction. A main side 22a and/or 22b of the housing 22 can have the first and second dimension and can be arranged, for example, in parallel to an x/z plane in space. The secondary sides 22c-f can connect the main sides 22a and 22b and can be arranged between the same, respectively.

The multi-aperture imaging devices 11a and 11b can be arranged in or on the same side 22d in the housing 22 and can have, for example, a base distance BA to one another, such as for the purpose of stereoscopy. More than two modules would also be possible. In this way, the total field of view can be captured, for example, stereoscopically or higher by usage of the multi-aperture imaging device 11c and at least one further multi-aperture imaging device 11a and/or 11b. The multi-aperture imaging devices 11a, 11b and/or 11c can be individually moveable. Alternatively, two or more of the modules can also be movable together as total system.

As will be described in detail below, the device 70 can be configured to capture a total field of view at least stereoscopically. The total field of view is arranged, for example, on one of the main sides 22a or 22b, but can also be arranged on a secondary side 22c-f. For example, the multi-aperture imaging devices 11a-c can each capture the total field of view. While the multi-aperture imaging devices 11a-c are illustrated in a manner spatially spaced apart from one another, the multi-aperture imaging devices 11a, 11b and/or 11c can also be arranged spatially adjacent or combined. The arrays of the imaging devices 11a and 11b, possibly arranged in a single line, can, for example, be arranged beside one another or parallel to one another as described, for example, in the context of FIG. 20b. The arrays can form lines with respect to one another, wherein each multi-aperture imaging device 11a and 11b comprises a single-line array. The imaging devices 11a and 11b can comprise a common beam-deflecting means and/or a common carrier of optics of the optical channels and/or a common image sensor.

Figure 15:
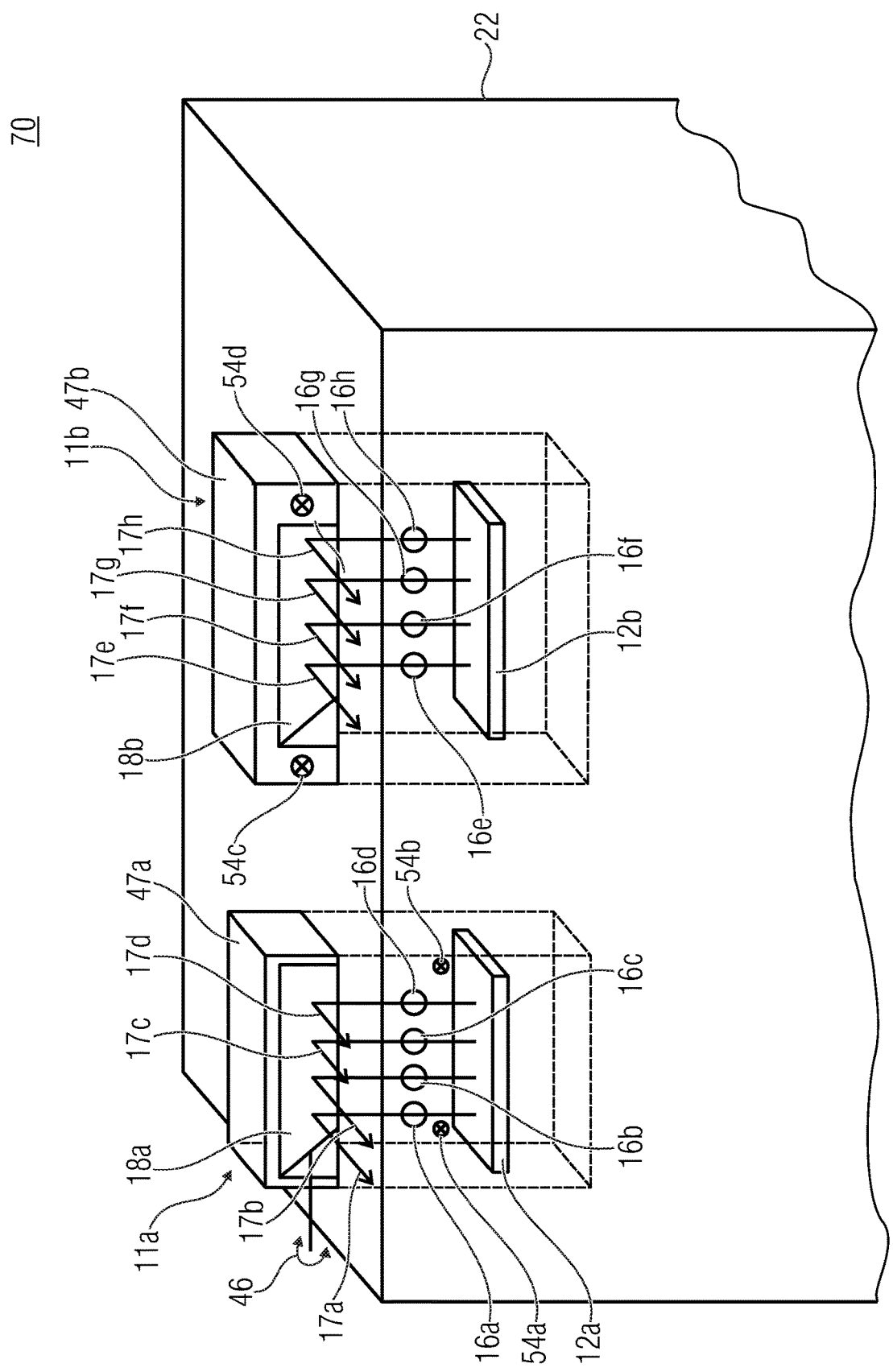
FIG. 15 shows an enlarged perspective view of a section of the device of FIG. 14.

FIG. 15 shows an enlarged perspective view of a section of the device 70 and the multi-aperture imaging devices 11a and 11b. The device 70 is in the second operating state. The multi-aperture imaging device 11a and/or 11b projects, for example, beyond the original housing side. The beam-deflecting means 18a and 18b are moved at least partly and based on the translational directions of movement 42a and 42b outside the housing volume. Alternatively, in the second operating state, merely part of the beam-deflecting means of the multi-aperture imaging devices 11a-c can be moved out of the housing volume of the housing 22.

The multi-aperture imaging devices 11a-b comprise, for example, four optical channels 16a-d and 16e-h each. The beam-deflecting means 18a and 18b are each configured to deflect the optical paths 17a-d and 17e-h, respectively, of the optical channels 16a-d and 16e-h, respectively. As will be described in detail below, other multi-aperture imaging devices can have a differing number of optical channels. The multi-aperture imaging devices 11a-b can have the same or a differing number of optical channels.

The multi-aperture imaging devices 11a and 11b each comprise illumination means 54a and 54b and 54c and 54d, respectively. The illumination means 54a-d are configured to illuminate the total field of view to be captured at least partly and, for example, can each be configured to illuminate a center of the total field of view (object area) to be captured. According to an embodiment, at least one of the illumination means 54a or 54b and 54c or 54d, respectively, can be arranged such that the same illuminates the total field of view along a central viewing direction of the optical channels 16a-d and 16e-h, respectively. The total field of view can comprise differing partial fields of view that are each captured by at least one optical channel 16a-d and 16e-h, respectively. A central viewing direction of optical channels 16a-d or 16e-h can, for example, be a geometrical average of the viewing directions or a median value of the viewing directions.

The illumination means 54a-b and 54c-d can be operated as a flash light of the respective multi-aperture imaging device 11a or 11b and can include any light source. Advantageously, the light source can be configured, for example, as a light emitting diode (LED) since the same have low insulation space requirements and low energy requirements. According to further embodiments, a multi-aperture imaging device can include no, one or more than two illumination means 54a-d, wherein the number of illumination means 54a-d of a multi-aperture imaging device can differ from other multi-aperture imaging devices of a device or can be the same. At least one of the illumination means 54a-d can be configured to illuminate several object areas. In that way, light can, for example, be selectively emitted by the illumination means in one or several directions. The illumination means can emit light along at least two viewing directions of the multi-aperture imaging device. For this, the illumination means can comprise at least two light sources. The light sources can emit light in opposite sides of the device. For example, one light source each can be mounted on a top and bottom, front and rear and/or left and right side of the travel carriage 47, where only the light source(s) of that side are used that opposes the object area to be captured according to the selected orientation and hence the operating state of the beam-deflecting means 18 and emits light in its direction. The above mentioned front, rear top and bottom as well as the terms left or right merely serve for illustration purposes and are not to be understood in a limiting sense, since the same are mutually exchangeable with each orientation in space. This means, for example, that light sources 54i can be arranged on the front and rear of the travel carriage 47b and depending on the position of the beam-deflecting means 18b respective light sources can be used. The other opposite light sources can remain unused.

For example, the illumination means 54a and 54b are arranged between the beam-deflecting means 18a and the image sensor 12a of the multi-aperture imaging device 11a. The beam-deflecting means 18 can be configured to deflect illumination radiation, for example flashlight, emitted by the illumination means 54a and/54b. The illumination means 54a-b can be arranged in the first operating state and in the second operating state of the device 70 inside the housing volume. The illumination radiation can be at least partly part of the optical paths 17a-d. As illustrated, for example, for the multi-aperture imaging device 11b, an illumination means 54c and/or 54d can be arranged laterally beside the beam-deflecting means on the travel carriage 47b. The illumination means 54c and 54d can be moved with the translational movement 42b into the housing 22 or out of the housing 22. While the illumination means is described in the context of the device 70, also other devices or multi-aperture imaging devices described herein can comprise an illumination means.

The illumination means 54c and 54d can be mechanically connected to the travel carriage 47a and can thus be arranged within the volume 42 in the first operating state and hence be arranged in a manner invisible for a user. Alternatively and/or additionally, the illumination means 54a and 54b can be arranged in a stationary manner inside the housing 22. A movement of the travel carriage 47b can effect a movement of the illumination means 54c and 54d.

Together with the beam-deflecting means 18a and 18b, respectively, optics 16a-d or 16e-f and possibly the image sensor 12a and 12b, respectively, can be moved out of the housing volume by the movement of the travel carriage 47a and 47b, respectively.

In other words, LEDs for realizing additional illumination (flash light) can be mounted on the moveable parts. Here, the LEDs can be arranged such that the same radiate in the central direction of the channels and the beam-deflecting means can provide further areas that are used for deflecting the radiation, respectively.

FIG. 16 shows a schematic perspective view of device 90 according to an embodiment comprising the second operating state. The beam-deflecting means 18 can be connected to the multi-aperture imaging device by means of mounting elements 56a and 56b. The mounting element 56a and 56b can be part of a travel carriage.

Figure 17A:
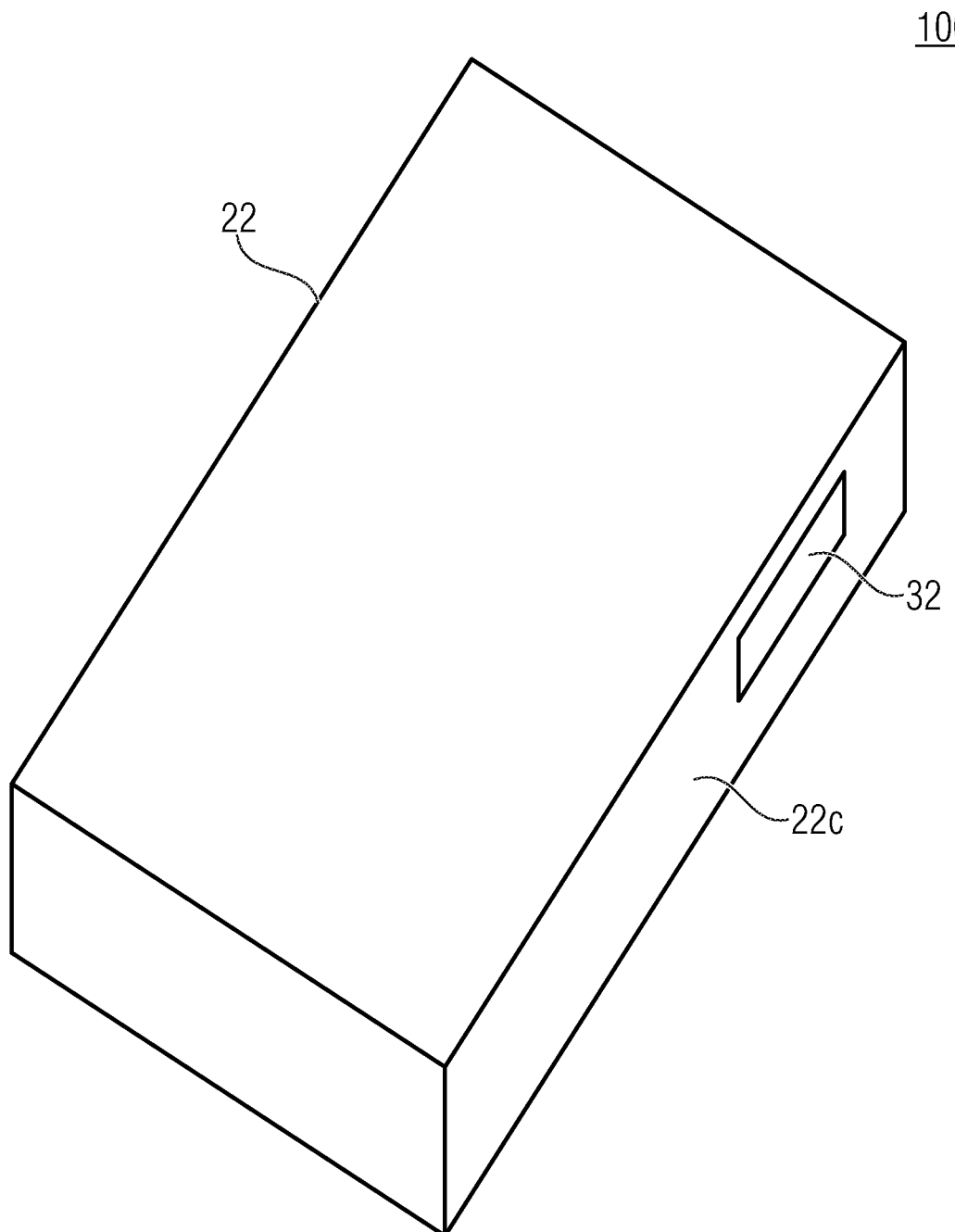
FIG. 17a shows a schematic perspective view of a device according to an embodiment in the first operating state with an exemplary shape of a cover.

FIG. 17a shows a schematic perspective view of device 100 according to an embodiment in the first operating state.

The cover 32 can form one plane with a housing main side and/or a housing secondary side, for example the housing plane side 22c. No gap or merely a small gap approximately less than or equal to 1 mm, less than or equal to 0.5 mm or less than or equal to 0.1 mm can be arranged between the cover 32 and the housing side 22c, such that a transition between the cover 32 and the housing side 22c is not or only hardly noticeable. Simply put, the cover 32 might not be visible.

Figure 17B:
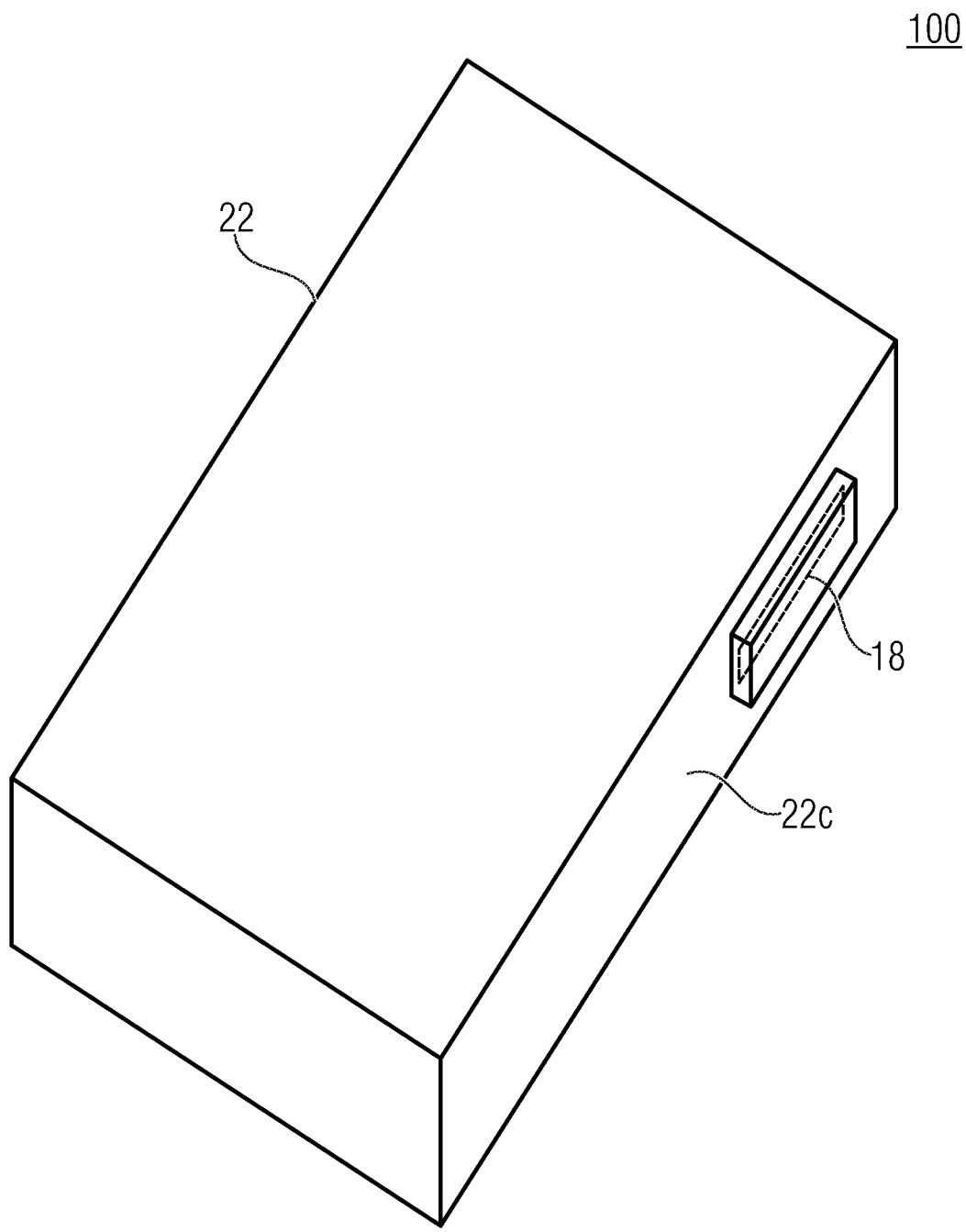
FIG. 17b shows a schematic view of the device of FIG. 17a in the second operating state according to an embodiment.

FIG. 17b shows a schematic view of the device 100 in the second operating state. The beam-deflecting means 18 comprises the second position outside the housing volume. Seen from outside, the extended multi-aperture imaging device can be enclosed by the inactive housing frame on all sides and/or can have an appearance like a button. The device 100 can, for example, be configured to release a mechanical lock during mechanical pressure on the cover 32 according to FIG. 17a, such that the beam-deflecting means can be moved out of the housing 22, for example based on a spring force. The mechanical pressure can be generated, for example, by an actuator and/or by a user, such as by finger pressure. The beam-deflecting means can be moved from the second position again to the first position by means of the actuator or by means of the mechanical pressure and can activate a lock there. The actuator can, for example, be the actuator 33 or 33'. In other words, the movement can also be performed manually, such that the user retracts or extends and folds in or out, respectively, the parts or the total system on his own accord. The movement can, in particular, be a combination of manual operation and effect of spring force. In that way, the user folds or shifts parts and the total system, respectively, manually into the housing of the device, such as a smartphone, for switching off the camera, thereby compressing a spring and a locking mechanism maintains this position. When switching on the camera, for example by means of suitable software on the smartphone, the switchable locking mechanism is released by a suitable controllable mechanism, such as an electrical relay, and the spring force of the spring effects the extension and folding out, respectively, of parts of the camera and the total system, respectively. Further, the cover forming part of the housing, the extendable and/or tiltable part and/or a further mechanism based thereon can be implemented such that (finger) pressure on this cover releases the lock, the parts or the total system expand or fold out, respectively, and possibly the image capturing software on the device starts. The co-moving cover, which can form part of the housing on the lateral faces, can be enclosed on all sides by the inactive housing, visible from the outside, or can interrupt the lateral faces across the total height (=thickness direction of the housing).

Figure 17C:
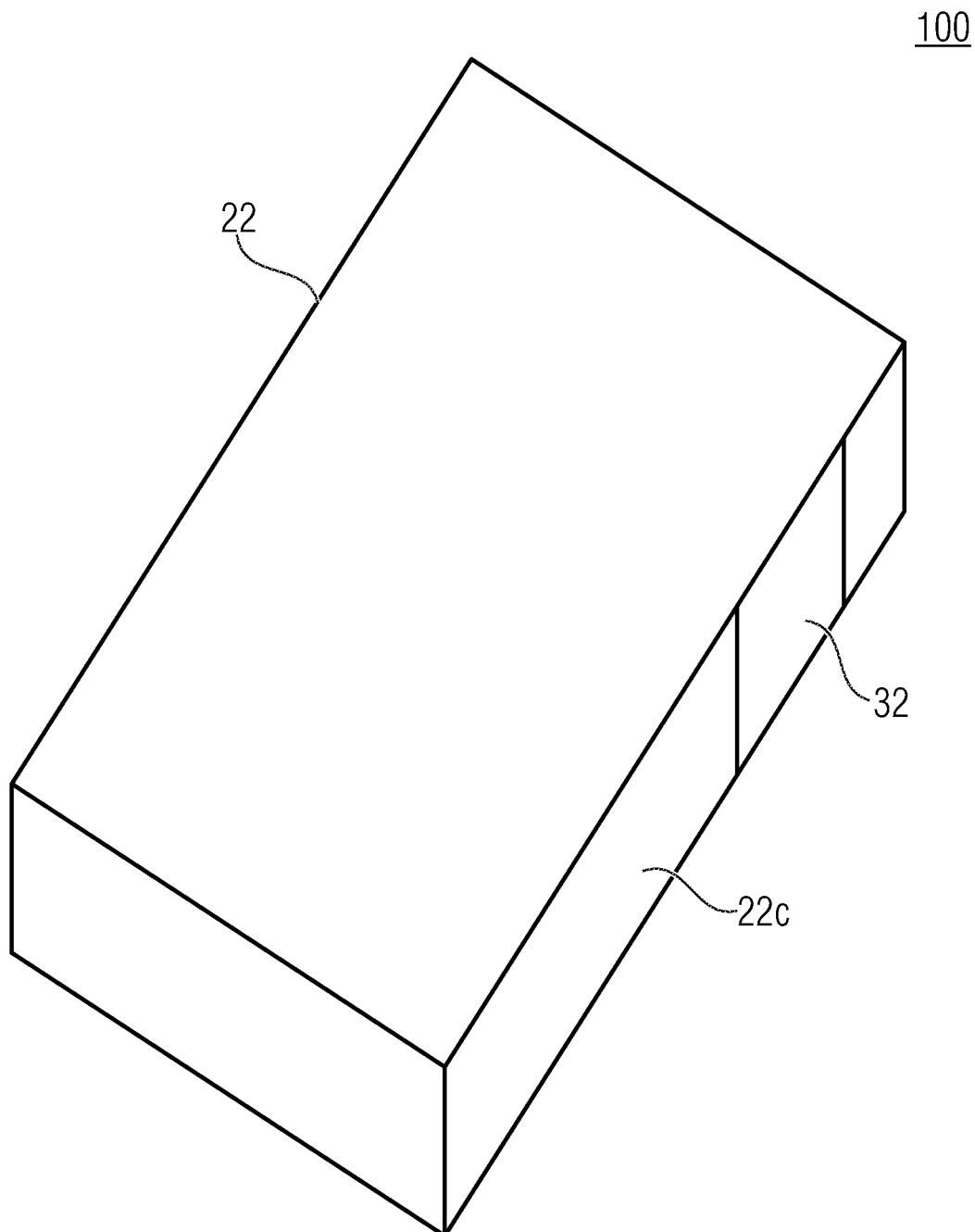
FIG. 17c shows a schematic illustration of an alternative to FIG. 17a according to an embodiment.

FIG. 17c shows a schematic illustration of an alternative to FIG. 17a where the cover 32 is formed such that a continuous gap is formed in the secondary side 22c between main sides of the housing 22. This enables that merely two instead of four gaps illustrated in FIG. 17a can be perceived in the housing 22. The extendable or foldable cover 32 and/or further covers can be formed as part(s) of the housing 22 on one or several lateral faces of the flat housing.

In the following, reference is made to some possible embodiments of the multi-aperture imaging device as it can be used according to embodiments.

Figure 18A:
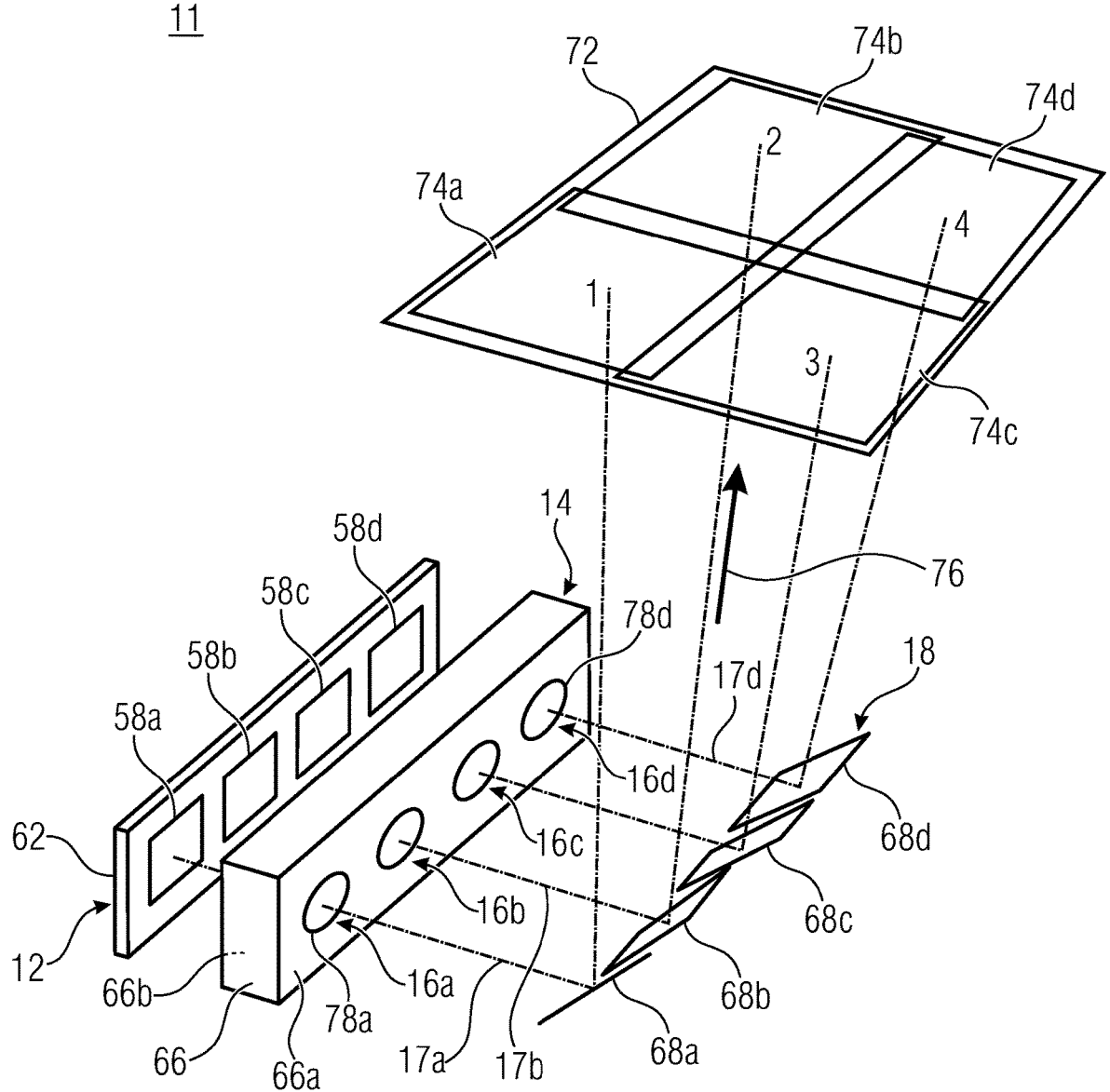
Figure 18B:
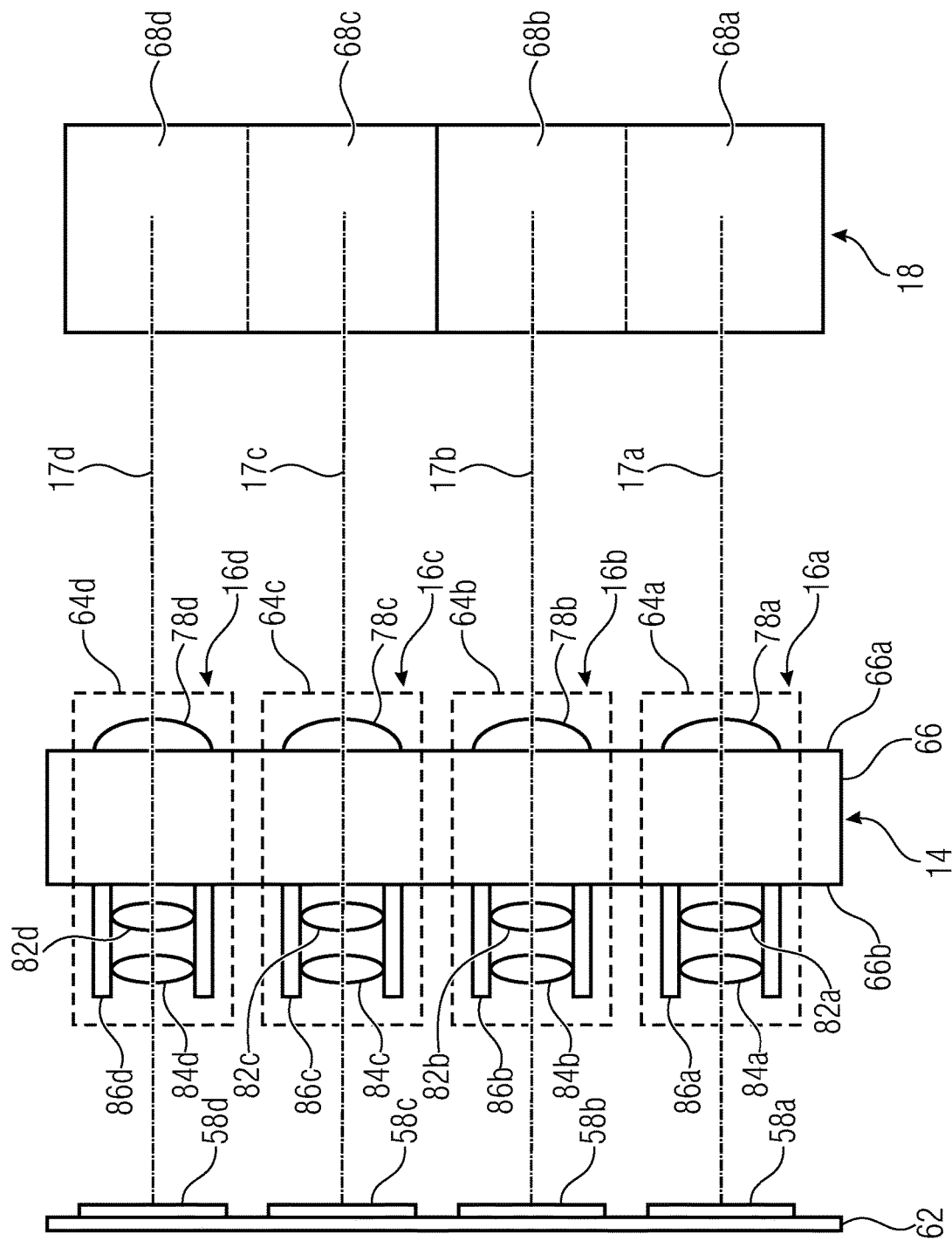

FIGS. 18a-18c show a multi-aperture imaging device 11 according to an embodiment of the present invention. The multi-aperture imaging device 11 of FIGS. 18a-18c includes a single-line array 14 of juxtaposed optical channels 16a-d. Each optical channel 16a-d includes optics 64a-d for projecting a respective partial field of view 74a-d of a total field of view 72 of the device 11 on a respectively allocated image sensor area 58a-d of an image sensor 12. The image sensor areas 58a-d can, for example, each be formed of one chip including a respective pixel array, wherein the chips can be mounted on a common substrate and a common printed circuit board 62, respectively, as indicated in FIGS. 18a-18c. Alternatively, it would also be possible that the image sensor areas 58a-d are each formed of part of a common pixel array continuously extending across the image sensor areas 58a-d, wherein the common pixel array is formed, for example, on a single chip. For example, merely the pixel values of the common pixel array are read out in the image sensor areas 58a-d. Different mixtures of these alternatives are also possible, such as the presence of one chip for two or more channels and a further chip for again other channels or the same. In the case of several chips of the image sensor 12, the same can be mounted, for example, on one or several printed circuit boards, such as e.g., all together or in groups or the same.

In the embodiment of FIGS. 18a-18c, four optical channels 16a-d are arranged in a single line beside one another in line-extension direction of the array 14, but the number four is merely exemplary and could also be any other number greater than one. Above that, the array 14 can also comprise further lines extending along the line-extension direction.

Optical axes and optical paths 17a-d, respectively, of the optical channels 16a-d run parallel to one another between the image sensor areas 58a-d and the optics 64a-d. For this, the image sensor areas 58a-d are arranged, for example, in a common plane and also the optical centers of optics 64a-d. Both planes are parallel to one another, i.e., parallel to the common plane of the image sensor areas 58a-d. Additionally, in a projection perpendicular onto the plane of the image sensor areas 58a-d, optical centers of the optics 64a-d coincide with centers of the image sensor areas 58a-d. In other words, in these parallel planes, optics 64a-d on the one hand and image sensor areas 58a-d are arranged with the same repeat distance in line-extension direction.

An image-side distance between image sensor areas 58a-d and the allocated optics 64a-d is adjusted such that the projections on the image sensor areas 58a-d are set to a desired object distance. The distance is, for example, in a range equal to or greater than the focal length of optics 64a-d or, for example, in a range between one time and two times the focal length of the optics 64a-d, both inclusive. The image-side distance along the optical axes 17a-d between image sensor area 58a-d and optics 64a-d can also be adjusted, such as manually by a user or automatically via autofocus control.

Without additional measures, the partial fields of view 74a-d of the optical channels 16a-d overlap essentially completely due to the parallelism of the optical paths and optical axes 17-d, respectively. For covering a greater total field of view 72 and so that the partial fields of view 74a-d merely overlap partly in space, the beam-deflecting means 18 is provided. The beam-deflecting means 18 deflects the optical paths 17a-d and optical axes, respectively, with a channel-individual deviation into a total field of view direction 76. The total field of view direction 76 runs, for example, parallel to a plane that is perpendicular to the line-extension direction of the array 14 and parallel to the course of the optical axes 17a-d prior to and without beam deflection, respectively. For example, the total field of view direction 76 results from the optical axes 17a-f by rotation around the line-extension direction by an angle that is >0° and <180° and is, for example, between 80 and 100° and can, for example, be 90°. Thus, the total field of view of the device 11 corresponding to the total coverage of the partial fields of view 74a-d is not in the direction of an extension of the series connection of the image sensor 12 and the array 14 in the direction of the optical axes 17a-d, but due to the beam deflection, the total field of view is on the side of the image sensor 12 and array 14 in a direction in which the installation height of the device 11 is measured, i.e., the lateral direction perpendicular to the line-extension direction. Additionally, the beam-deflecting means 18 deflects each optical path and the optical path of each optical channel 16a-d, respectively, with a channel-individual deviation from the deflection resulting in the direction 76 mentioned above. For this, the beam-deflecting means 18 comprises a reflecting facet 68a-d for each channel 16a-d. The same are slightly inclined with respect to one another. The mutual tilting of the facets 68a-d is selected such that, during beam deflection by the beam-deflecting means 18, the partial fields of view 74a-d are provided with a slight divergence such that the partial fields of view 74a-d overlap merely partly. Here, as indicated exemplarily in FIG. 18a, the individual deflection can also be designed such that the partial fields of view 74a-d cover the total field of view 72 in a two-dimensional manner, i.e., are arranged in a two-dimensionally distributed manner in the total field of view 72.

It should be noted that many of the details described so far concerning the device 11 have merely been selected exemplarily. This already concerned, for example, the above-mentioned number of optical channels. The beam-deflecting means 18 can also be formed differently than described above. For example, the beam-deflecting means 18 is not necessarily reflective. The same can also be implemented differently than in the form of a facet mirror, such as in the form of transparent prism wedges. In that case, for example, the average beam deflection could be 0°, i.e., the direction 76 could, for example, be parallel to the optical paths 17a-d prior to or without beam deflection or, in other words, the device 11 could still "look straight ahead" despite beam-deflecting means 18. The channel-individual deflection by the beam-deflecting means 18 would again have the effect that the partial fields of view 74a-d merely slightly overlap, such as in pairs with an overlap <10% with regard to the spatial angular ranges of the partial fields of view 74a-d.

Also, the optical paths and optical axes, respectively, could deviate from the described parallelism and the parallelism of the optical paths of the optical channels could still so distinct that the partial fields of view that are covered by the individual channels 16a-N and projected on the respective image sensor areas 58a-d, respectively, would mostly overlap without further measures, namely beam deflection, such that in order to cover a greater total field of view by the multi-aperture imaging device 11, the beam-deflecting means 18 would provide the optical paths with an additional divergence such that the partial fields of view of N optical channels 16a-N overlap less. The beam-deflecting means 18 has, for example, the effect that the total field of view has an aperture angle that is greater than 1.5 times the aperture angle of the individual partials fields of view of the optical channels 16a-N. With some sort of pre-divergence of the optical paths 17a-d, it would also be possible that, for example, not all facet inclinations differ but that some groups of channels have, for example, the facets with the same inclination. The latter could then be formed integrally and continuously merging, respectively, as virtually one facet that is allocated to this group of channels adjacent in line-extension direction. The divergence of the optical axes of these channels could then originate from the divergence of these optical axes, as it is obtained by lateral offset between optical centers of the optics and image sensors areas of the channels or prism structures or decentered lens sections. The pre-divergence could be limited, for example, to one plane. Prior to or without beam deflection, respectively, the optical axes could run, for example, in a common plane but divergent within the same, and the facets effect merely an additional divergence in the other transversal plane, i.e., the same are all parallel to the line-extension direction and inclined with respect to one another only varying from the above-mentioned common plane of the optical axes, wherein here again several facets can have the same inclination or can be allocated together to a group of channels, whose optical axes differ, for example, already in the above mentioned common plane of the optical axes in pairs prior to and without beam deflection, respectively.

When omitting the beam-deflecting means or implementing the beam-deflecting means as planar mirror or the same, the total divergence could be accomplished by the lateral offset between optical centers of the optics on the one hand and centers of the image sensor areas on the other hand or by prism structures or decentered lens sections.

The above-mentioned possibly existing pre-divergence can, for example, be obtained in that the optical centers of the optics are on a straight line along the line-extension direction, while the centers of the image sensor areas are arranged deviating from the projection of the optical centers along the normal of the plane of the image sensor areas on points on a straight line in the image sensor plane, such as on points deviating from the points on the above mentioned straight line in the image sensor plane in a channel-individual manner along the line-extension direction and/or along the direction perpendicular to both the line-extension direction and the image sensor normal. Alternatively, pre-divergence can be obtained in that the centers of the image sensors are on a straight line along the line-extension direction, while the centers of the optics are arranged deviating from the projection of the optical centers of the image sensors along the normal of the plane of the optical centers of the optics on points on a straight line in the optics center plane, such as on points deviating from the points on the above-mentioned straight line in the optics center plane in a channel-individual manner along the line-extension direction and/or along the direction perpendicular to both the line-extension direction and the normal of the optics center plane. It is of advantage when the above mentioned channel individual deviation from the respective projection merely runs in line-extension direction, i.e., merely the optical axes in a common plane are provided with a pre-divergence. Both optical centers and image sensor area centers are then on a straight line parallel to the line-extension direction but with different gaps in-between. A lateral offset between lenses and image sensors in perpendicular lateral direction to the line-extension direction would, in comparison, result in an enlargement of the installation height. A pure in-plane offset in line-extension direction does not change the installation height but possibly less facets result and/or the facets have only a tilting in one angular orientation which simplifies the structure.

This is illustrated in FIGS. 18d and 18e exemplarily for the case of the optics held on a common carrier, where the adjacent channels 16a and 16b on the one hand and the adjacent channels 16c and 16d on the other hand comprise optical axes 17a and 17b and 17c and 17d, respectively, running in the common plane and squinting with respect to one another, i.e. provided with the pre-divergence. The facets 68a and 68b can be formed by one facet and the facets 68c and 68d can be formed by another facet as shown by dotted lines between the respective pairs of facets, and the only two facets are merely inclined in one direction and both parallel to the line-extension direction. It is also possible that individual facets merely comprise one tilting in a spatial direction.

Further, it could be provided that some optical channels are allocated to the same partial field of view, such as for the purpose of superresolution for increasing the resolution by which the respective partial field of view is scanned by these channels. The optical channels within such a group would then run parallel, for example, prior to beam deflection and would be deflected on a partial field of view by one facet. Advantageously, pixel images of the image sensor of a channel of a group would lie in intermediate positions between images of the pixels of the image sensor of a different channel of this group.

Even without super-resolution purposes, but merely for stereoscopic purposes, an implementation would be possible where a group of immediately adjacent channels completely cover the total field of view in line-extension direction with their partial fields of view, and that a further group of immediately adjacent channels also completely cover the total field of view and the optical paths of both channel groups pass through the substrate and a carrier 66, respectively. This means that the multi-aperture imaging device can comprise a first plurality of optical channels that are configured to capture a total field of view, possibly completely. A second plurality of optical channels of the multi-aperture imaging device can be configured to also capture the total field of view possibly completely. In this way, the total field of view can be captured at least stereoscopically by the first plurality of optical channels and by the second plurality of optical channels. The first plurality of optical channels and the second plurality of optical channels can impinge on a common image sensor, can use a common array (array optics) and/or can be deflected by a common beam-deflecting means. In contrary to an array of individual cameras, a contiguous array camera is formed which can be controlled together as one device, for example with regard to focus and/or image stabilization, which is advantageous since all channels are influenced simultaneously and by using the same actuators. Additionally, from the monolithic structure, advantages result with regard to the mechanical stability of the total array in particular during temperature changes. This is advantageous for the assembly of the total image from the partial images of the individual channels as well as for obtaining three-dimensional object data during the usage in stereo, triple, quadruple, etc., systems with multiple scanning of the total field of view by different pluralities of channels 16.

The following discussion deals with the optics 64a-d whose lens planes are also parallel to the common plane of the image sensor areas 58a-f. As described below, lenses of the optics 64a-d of the optical channels 16a-d are mounted on a main side 66a of the substrate 66 via one or several lens holders and are mechanically connected to one another via the substrate 66. In particular, the optical paths 17a-d of the plurality of optical channels 16a-d run through the substrate 66. Thus, the substrate 66 is formed at least partly of transparent material and is plate-shaped or has, for example, the shape of a parallelepiped or another convex body having a planar main side 66a and an opposite main side 66b that is also planar. The main sides may be positioned perpendicular to the optical paths 17a-d. As described below, according to embodiments, deviations from the pure parallelepiped shape can occur, which are based on an integral formation of lenses of the optics 66 with the substrate.

The flat carrier substrate 66 in the embodiment of FIG. 11a-c is, for example, a substrate of glass or polymer. For example, the carrier substrate 66 can include a glass plate. The material of the substrate 66 can be selected according to aspects of high optical transparence and low temperature coefficient or further mechanical characteristics such as hardness, elasticity or torsion module.

The substrate 66 can be formed as simple planar part of the optical path without any additional lenses being mounted directly on the same. Additionally, diaphragms, such as aperture or stray light diaphragms or/and filter layers such as IR block filters, can be mounted on the substrate surfaces or can consist of several layers of different substrates on the surfaces of which diaphragms and filter layers can be mounted, which can differ again from channel to channel, for example as regards to their spectral absorption.

The substrate 66 can consist of a material having different characteristics in different areas of the electromagnetic spectrum that can be captured by the image sensor, in particular non-constant absorption.

In the embodiment of FIG. 18a-c, each optics 64a-d comprises three lenses. However, the number of lenses is freely selectable. The number could be 1, 2 or any other arbitrary number. The lenses could be convex, could comprise merely one optically projecting functional area, such as a spherical, aspherical or freeform area, or two opposing ones, for example, to result in a convex or concave lens shape. Also, several optically effective lens areas are possible, such as by structuring a lens of several materials.

In the embodiment of FIGS. 18a-18c, a first lens 78a-d of each optical channel 16a-d or optics is formed on the main side 66a. The lenses 78a-d have been produced, for example, by molding on the main side 66a of the substrate 66 and consist, for example, of polymer, such as UV curable polymer. The molding takes place, for example by a molding tool and the annealing can, for example, take place via temperature and/or via UV radiation.

In the embodiment of FIGS. 18a-18c, each optics 64a-d has a further second and third lens 82a-d and 84a-d, respectively. Exemplarily, these lenses are mutually fixed via axially running tube-shaped lens holders 86a-d inside the respective lens holder and are fixed to the main side 66b via the latter, such as by means of adhering or another joining technology. Openings 88a-d of the lens holders 86a-d are provided, for example with a circular cross-section in the cylindrical inside of which the lenses 88a-d and 84a-d, respectively, are mounted. Thus, for each optics 64a-d, the lenses are co-axial on the respective optical axis of the optical paths 17a-d. The lens holders 86a-d can also have a cross-section varying across their length and along the respective optical axis, respectively. Here, the cross-section can have an increasingly rectangular or square character with decreasing distance to the image sensor 12. The outer shape of the lens holders can thus also differ from the shape of the openings. The material of the lens holders can be light-absorbing. According to the squinting optics described above in the context of FIGS. 11d and 11e, the lens holders can also be configured in a non-rotationally symmetric and/or non-coaxial manner.

Mounting via the above-mentioned lens holders takes, for example, place such that lens vertices of the lenses held by the same are spaced apart from the substrate 66.

As already mentioned above, it is possible that the substrate 66 is planar on both sides and hence has no refractive power effect. However, it would also be possible that the substrate 66 comprises mechanical substrates, such as recesses or projections allowing an easy form-fit and/or force-fit alignment of members to be connected, e.g. connecting individual lenses or housing parts. In the embodiment of FIGS. 18a-18c, for example, the substrate 66 could have structures easing the mounting or easing the orientation on the main side 6b at positions where the respective end of the tube of the lens holder 86a-d of the respective optics 64a-d is mounted. These structures can, for example be a circular recess or a recess having a different shape corresponding to the shape of the side of the respective lens holder facing the substrate which the side of the respective lens holder 84a-d can engage. It should again be emphasized that other opening cross-sections and hence correspondingly possibly other lens apertures than circular ones are possible.

Thus, the embodiment of FIGS. 18a-18c does not have a conventional structure of camera modules comprising individual lenses, and for holding the individual lenses, a non-transparent housing carrier completely enclosing the same. Rather, the above embodiment uses a transparent body 66 as substrate carrier. The same extends across several adjacent optical channels 16a-d in order to be penetrated by their projecting optical path. The same does not interfere with the projection but does also not increase the installation height.

Figure 18F:
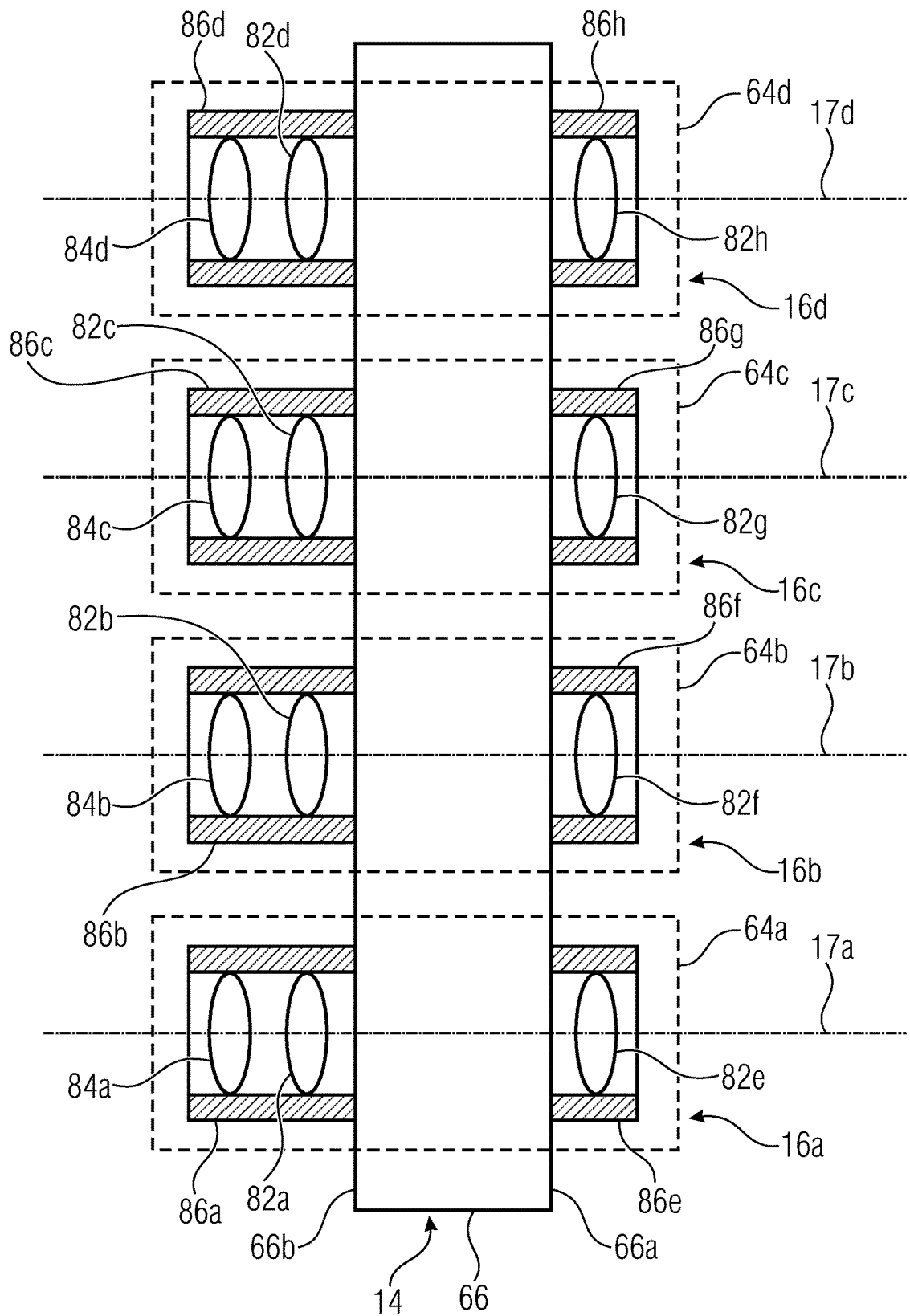

However, different options for varying the embodiment of FIGS. 18a-18c should be noted. For example, the substrate 66 does not necessarily extend across all channels 16a-d of the multi-aperture imaging device 11. Contrary to what is described above, it would be possible that each optics 64a-d comprises lenses held by lens holders on both sides 66a and 66b, as illustrated in FIG. 18f.

Also, the existence of merely the lenses 82e-h on the main side 66a, i.e. without the lenses 82a-d and/or 84a-d on the other side 66b would be possible, as well as the provision of the lenses 82a-d and/or 84a-d on the other side 66a, i.e. the side of the substrate 66 facing away from the image sensor 12 and not the side facing the same, i.e. 66a. Also, the number of lenses in the lens carriers 86a-h can be freely selected. Thus, merely one lens or more than two lenses could exist in one such carrier 86a-h. As shown in FIG. 18f, it could be possible that lenses are mounted on both sides 66a and 66b via respective lens carriers 86a-d and 86e-h, respectively, on the respective side 66a and 66b, respectively.

Figure 19:
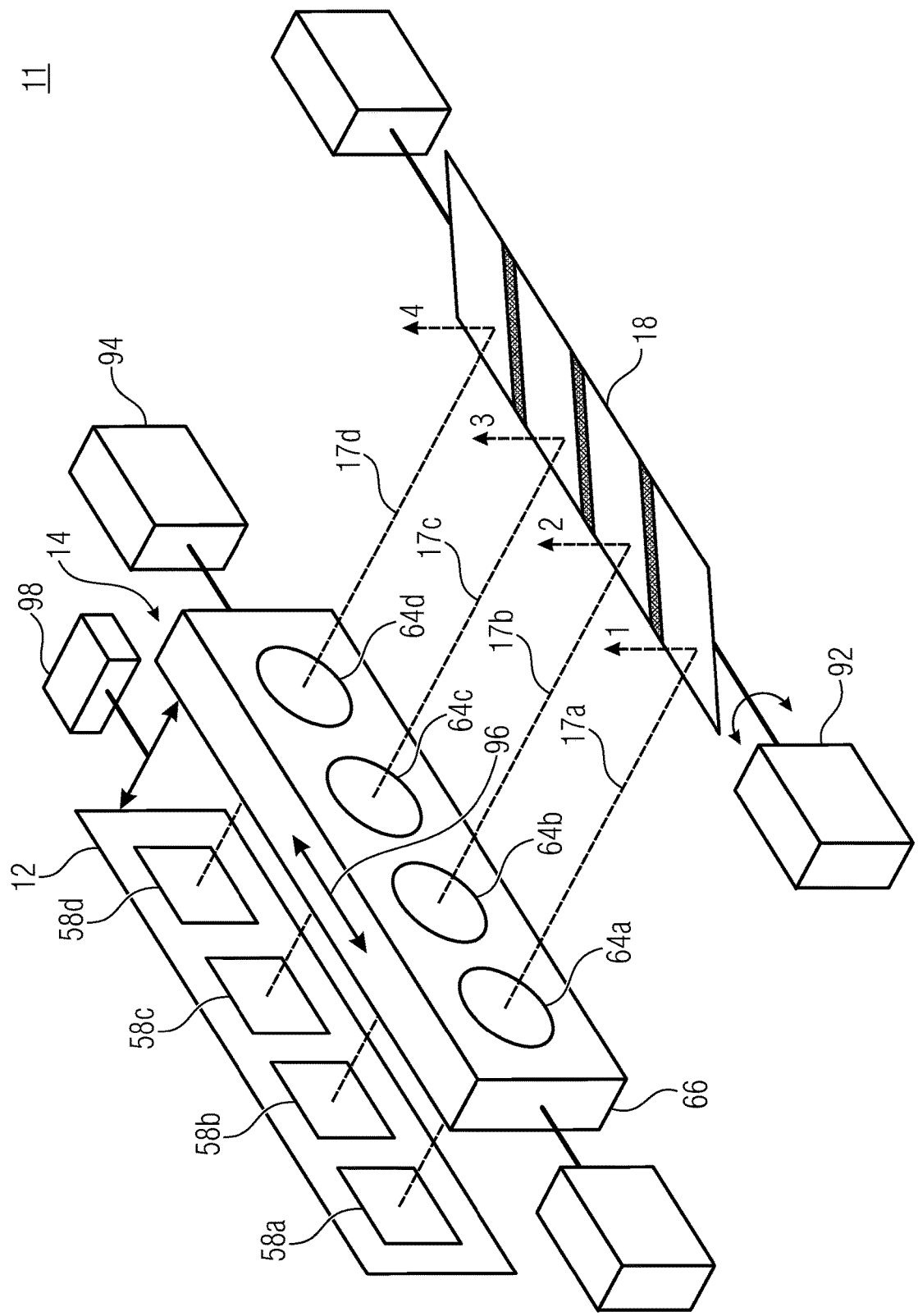
FIG. 19 shows the multi-aperture imaging device according to FIG. 18a-c which is supplemented, according to an embodiment, by additional means for realizing relative movements for optical image stabilization and for adapting the focusing.

FIG. 19 shows exemplarily that the multi-aperture imaging device 11 of FIGS. 18a-18c could be supplemented by one or several of the additional means described below.

For example, FIG. 19 shows that means 92 could exist for rotating the beam-deflecting means 18 around the axis of rotation 44 which is parallel to the line-extension direction of the array 14. The axis of rotation 44 is, for example, within the plane of the optical paths 17a-d or remote from the same by less than a quarter of the diameter of the optics 64a-d. Alternatively, it would also be possible that the axis of rotation is further apart, such as less than one optics diameter or less than four optics diameters. The means 92 can, for example, be provided to rotate the beam-deflecting means 18 with short response time in a merely small angular range, such as within a range of less than 1° or less than 10° or less than 20° in order to compensate shaking of the multi-aperture imaging device 11, for example by a user. In this case, the means 92 would be controlled by an image stabilization control.

Alternatively or additionally, means 92 could be configured to change the direction of the total field of view defined by the total coverage of the partial field of view 74a-d (FIG. 18a) with greater angular adjustments. Here, it would further be possible to obtain deflections by rotation of the beam-deflecting means 18 where the total field of view is arranged in the opposite direction relative to the device 11, for example by forming the beam-deflecting means 18 as mirror array reflective on both sides.

Again, alternatively or additionally, a device 11 can comprise means 94 for translationally moving the optics 64a-d by means of the substrate 66 and the substrate 66 itself, and hence the optics 64a-d, respectively, along the line-extension direction. The means 94 could, for example, also be controlled by the above-mentioned image stabilization control in order to obtain, by a movement 96 along the line-extension direction, image stabilization transversal to the image stabilization effected by the rotation of the mirror deflecting device 18.

Further, additionally or alternatively, the device 11 can comprise means 98 for changing the image-side distance between image sensor 12 and optics 64a-d and between image sensor 12 and carrier 66, respectively, for obtaining adjustment of depth of field. The means 98 can be controlled by manual user control or by autofocus control and focusing means of the device 11, respectively.

Thus, the means 94 serves as a suspension of the substrate 66 and may be, as indicated in FIG. 19, arranged laterally beside the substrate 66 along the line-extension direction in order to not increase the installation height. It also applies to means 92 and 98 that the same may be arranged in the plane of the optical paths for not increasing the installation height. The means 98 can also be connected to the beam-deflecting means 18 and can move the same simultaneously or almost simultaneously such that when changing the image-side distance between image sensor 12 and optics 64a-d, a distance between optics 64a-d and beam-deflecting means 18 remains essentially constant or constant. The means 92, 94 and/or 98 can be implemented based on pneumatic, hydraulic, piezoelectric actuators, DC motors, step motors, thermal actuators, electrostatic actuators, electrostrictive and/or magnetostrictive actuators or drives.

It should be noted that the optics 64a-d cannot only be held mutually in constant relative position, such as via the already mentioned transparent substrate, but also relative to the beam-deflecting means, such as via a suitable frame advantageously not increasing the installation height and thus advantageously running in the plane of the components 12, 14 and 18 and in the plane of the optical paths, respectively. The consistency of the relative position could be limited to the distance between optics and beam-deflecting means along the optical axes, such that the means 98 moves, for example, the optics 64a-d together with the beam-deflecting means translationally along the optical axes. The optics/beam-deflecting distance could be set to a minimum distance, such that the optical path of the channels is not laterally limited by the segments of the beam-deflecting means 18, which reduces the installation height, since otherwise the segments 68a-d would have to be dimensioned for the greatest optics/beam-deflecting means distance as regards to the lateral extension in order to not restrict the optical path. Additionally, the consistency of the relative position of the above-mentioned frames could hold the optics and beam-deflecting means in a rigid manner to one another along the x axis, such that the means 94 would move the optics 64a-d together with the beam-deflecting means translationally along the line-extension direction.

The above-described beam-deflecting means 18 for deflecting the optical path of the optical channels allows, together with the actuator 92 for generating the rotational movement of the beam-deflecting means 18 of an optical image stabilization control of the multi-aperture imaging device 11, image and total field of view stabilization, respectively, in two dimensions, namely by the translational movement of the substrate 66, image stabilization along a first image axis running essentially parallel to the line-extension direction, and by generating the rotational movement of the beam-deflecting means 18, image stabilization along a second image axis running essentially parallel to the optical axes prior to and without beam-deflecting, respectively, or, when the deflected optical axes are considered, perpendicular to the optical axes and the line-extension direction. Additionally, the described arrangements can effect translation movement of the beam-deflecting means and array 14 fixed in the stated frame perpendicular to the line-extension direction, such as by the described actuator 98, which can be used for realizing focus adjustment and hence autofocus function.

As an alternative to or in addition to the rotational movement for obtaining image stabilization along the second image axis, also, a translational relative movement between the image sensor 12 and the array 14 can be implemented. This relative movement can be provided, for example, by the means 94 and/or the means 98.

For completeness sake, it should be noted with respect to the above statements that the device when capturing via the image sensor areas captures one image of a scene per channel which are projected by the channels on the image sensor areas, and that the device can optionally have a processor that assembles or joins the images to a total image corresponding to the scene in a total field view and/or provides additional data, such as 3D image data and depth information of the object scene for generating depth maps and for software realization, such as refocusing (determining the image sharpness regions after the actual capturing), all-in-focus images, virtual green screen (separation of foreground and background), etc. The latter tasks could also be performed by the processor or externally. The processor, however, could also represent a component external to the multi-aperture imaging device.

Figure 20A:
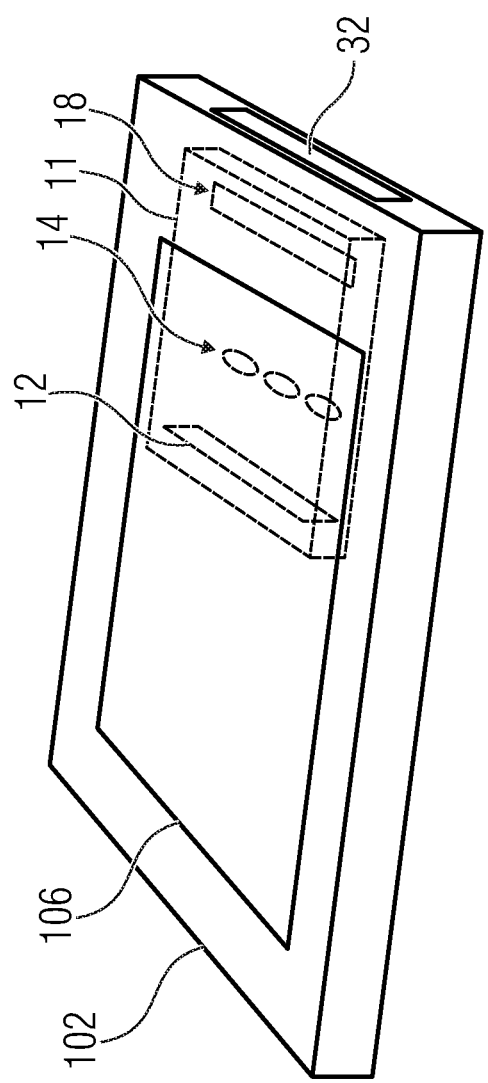
FIG. 20a shows a schematic view of a multi-aperture imaging device arranged in a flat housing according to an embodiment.

FIG. 20a illustrates that devices 11 of the above-described alternatives can be installed, for example in a flat housing of a portable device 130, such as a mobile phone, a smartphone or media player or the same, wherein then, for example, the planes of the image sensor 12 and the image sensor areas, respectively and the lens planes of the optics of the optical channels 16 are oriented perpendicular to the flat extension direction of the flat housing and parallel to the thickness direction, respectively. In that way, for example, the beam-deflecting means 18 would have the effect that the total field of view of the multi-aperture imaging device 11 is in front of a front side 102 of the flat housing which also comprises, for example, a monitor. Alternatively, a deflection would also be possible such that the field of view is in front of a rear side of the flat housing opposing the front side 102. The housing 22 of the device 130 and the device itself, respectively, can be flat, since, due to the illustrated position of the device 11 in the housing, the installation height of the device 11, which is parallel to the thickness of the housing, can be kept low. Switchability could also be provided in that a window is provided on the side opposing the side 102 and, for example, the beam-deflecting means is moved between two positions, wherein the latter is implemented, for example, as mirror mirroring on the front and rear and rotated from the one to the other position, or as a facet mirror having a set of facets for the one position and another set of facets for the other position, wherein the sets of facets are beside one another in line-extension direction and switching between the position takes place by translationally moving the beam-deflecting means back and forth along the line-extension direction. Installation of the device 11 into a different, possibly non-portable device, such as a car, would also be possible.

Several modules 11 whose partial field of view of their channels cover the same field of view completely and optionally even congruently can be installed in the device 130 with a base distance BA (cf. FIG. 14) to one another along a line-extension direction which is the same for both modules, such as for the purpose of stereoscopy. More than two modules would also be possible. The line-extension directions of the modules 11 could also be non-collinear and merely parallel to one another. However, it should be noted again that, as mentioned above, also a device 11 and a module, respectively, could be provided with channels such that the same completely cover the same total field of view in groups. The modules can be arranged in one/several line(s)/row(s) or any position of the device. When several modules are arranged, the same can be formed in the same manner or differently. A first module can be configured, for example, to perform stereoscopic capturing of the total field of view. A second module can be configured to perform simple capturing, stereoscopic capturing or higher order capturing.

It should be noted that in alternative embodiments the beam-deflecting means could also be omitted in comparison to the above-described embodiments. When merely partial mutual overlapping of the partial field of use is desired, this could be obtained, for example, via mutual lateral offsets between the center of the image sensor area and the optical center of the optics of the respective channel. Obviously, the actuators according to FIG. 19 could still be used, wherein, as a substitute for the means 92, for example, the actuator 94 is additionally able for translationally moving the optics and the carrier 66, respectively.

Again, in other words, the above embodiments show a multi-aperture imaging device with single-line array of juxtaposed optical channels where somewhere in the optical path of the multi-aperture imaging device a substrate, for example of glass or polymer, extending across the channel extends for improving the stability. Additionally, the substrate can include lenses on the front and/or rear side. The lenses can be made of the material of the substrate (such as produced by hot stamping) or molded thereon. Further lenses, which are not on the substrate and are individually mounted, can be in front of and behind the substrate. Several substrates can exist in one structure, both along as well as perpendicular to the line-extension direction. Here, it would also be possible to connect several substrates with lenses along the optical paths in series, i.e. to keep the same in a predetermined positional relation to one another in a different way, such as via a frame without necessitating any joining action. In that way, twice as many main sides would be available for providing or mounting lenses, as carrier substrates are used, such as a substrate 66 which can be loaded with lenses according to the above examples, here exemplarily according to FIG. 18b, and the substrate which can also be loaded with lenses according to the above embodiments, i.e. among others with lenses that are mounted on the main sides 66a and/or 66b via lens holders, but here exemplarily illustrated integrally produced, for example by injection molding or the same, such that lenses are formed on both sides 66a and 66b, although also molded lenses of different materials than the material of the parallelepiped-shaped substrate 66 would be possible as well as lenses on only one of the sides 66a or 66b. Both substrates are transparent and are penetrated by the optical paths, through the main sides 66a and 66b. Thus, the above embodiments can be implemented in the form of a multi-aperture imaging device with single-line channel arrangement, wherein each channel transmits a partial field of view of a total field of view and the partial fields of view partly overlap. A structure having several such multi-aperture imaging devices for stereo, triple, quadruple, etc. structures for 3D image capturing is possible. Here, the plurality of modules can be implemented as one contiguous line. The contiguous line could use identical actuators and a common beam-deflecting element. One or several mechanically enforcing substrates possibly existing within the optical path can extend across the total line which can form a stereo, triple, quadruple structure. Methods of superresolution can be used, wherein several channels project the same partial image areas. The optical axes can also already run in a divergent manner without beam-deflecting means, such that fewer facets are used on the beam-deflecting unit. Then, advantageously, the facets have only one angular component. The image sensor can be integral, can comprise only one contiguous pixel matrix or several interrupted ones. The image sensor can be composed of many partial sensors that are, for example, juxtaposed on a printed circuit board. An autofocus drive of a focusing means can be implemented such that the beam-deflecting element is moved synchronously with the optics or is stationary. When no pre-divergence exists, embodiments provide for the optical paths running essentially or completely parallel between the image sensor 12 and the beam-deflecting means 18.

FIG. 20b shows a schematic structure including a first multi-aperture imaging device 11a and a second multi-aperture imaging device 11b as it can be arranged, for example in the device 130. The two multi-aperture imaging devices 11a and 11b can form a common multi-aperture imaging device 11 and can comprise a common image sensor 12 and/or a common array 14. The single-line arrays 14a and 14b form, for example, a common line in the common array 14. The image sensors 12a and 12b can form the common image sensor 12 and can be mounted, for example, on a common substrate and on a common circuit carrier, such as a common printed circuit board or a common flexboard. Alternatively, the image sensors 12a and 12b can also include differing substrates. Different combinations of these alternatives are also possible, such as multi-aperture imaging devices including a common image sensor, a common array and/or a common beam-deflecting means 18 as well as further multi-aperture imaging devices comprising separate components. It is an advantage of a common image sensor, a common single-line array and/or a common beam-deflecting means that a movement of a respective component can be obtained with high precision by controlling a small amount of actuators and synchronization between actuators can be reduced or prevented. Further, high thermal stability can be obtained. Alternatively or additionally, further multi-aperture imaging devices can also comprise a common array, a common image sensor and/or a common beam-deflecting means. The structure of the multi-aperture imaging device 11 can be used, for example for stereoscopic capturing of a total or partial field of view when optical channels of different partial multi-aperture imaging devices 11a and 11b are directed on the same partial field of view. Comparably, further partial multi-aperture imaging devices can be integrated in the common multi-aperture imaging devices, such that capturing of a higher order than stereo is possible.

Figure 21:
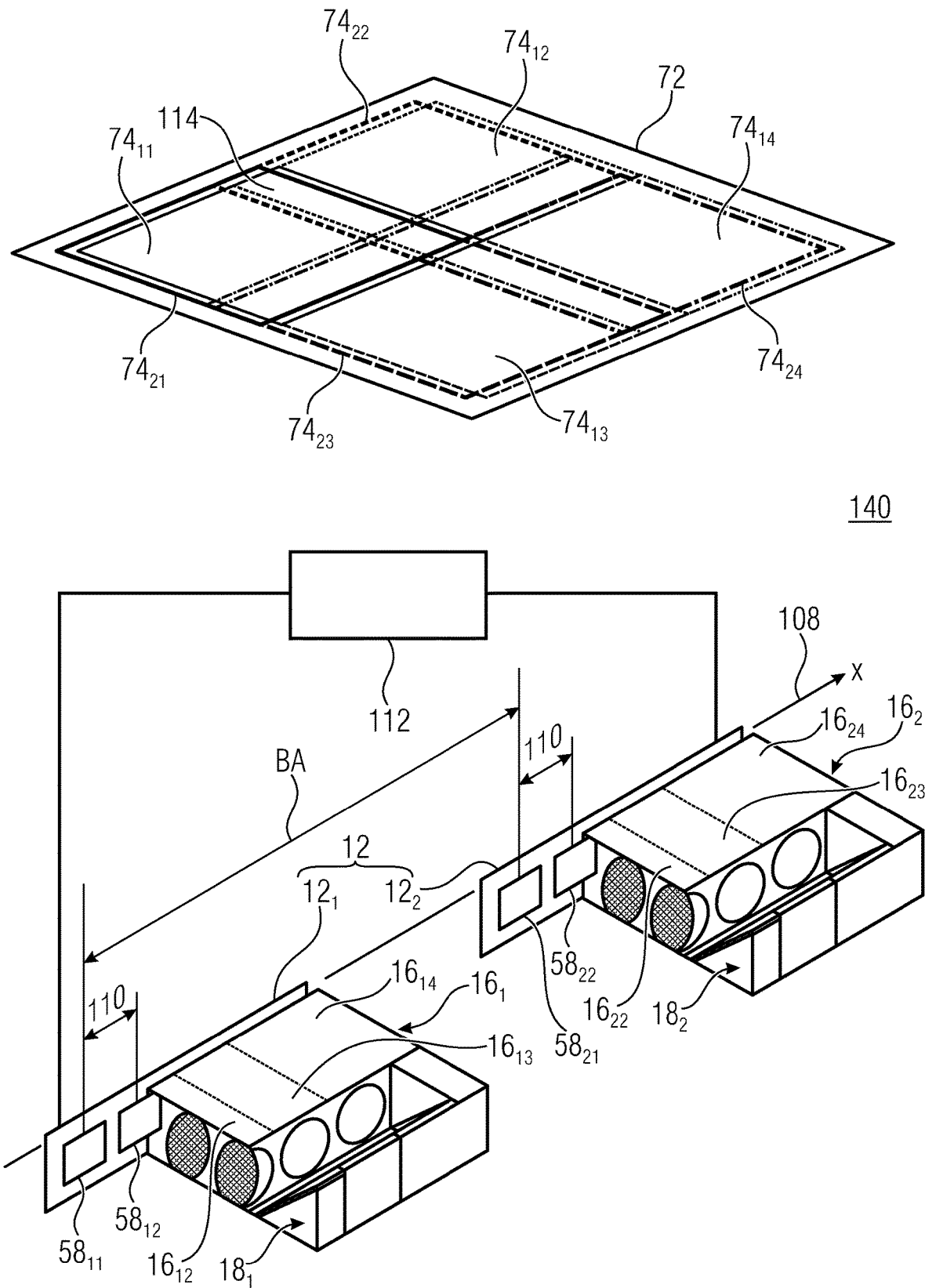
FIG. 21 shows a schematic view of a 3-D multi-aperture imaging device according to an embodiment.

FIG. 21 shows a 3D multi-aperture imaging device 140 as it can be used according to embodiments described herein. The same has an image sensor which can be divided into two components $12_1$ and $12_2$, respectively, as indicated in FIG. 21, a component $12_1$ for the "right" optical channels $16_1$ and the other component $12_2$ for the "left" channels $16_2$. The right and left optical channels $16_1$ and $16_2$ are structured identically in the example of FIG. 21, but arranged laterally offset from one another by the base distance BA in order to obtain as much depth information as possible with regard to the scene within the field of view of the device 140. For example, the 3D multi-aperture imaging device can be formed by two or more multi-aperture imaging devices 11. Thus, the elements provided with a reference number having an index 1 at the first position from the left belong to the first component 1 or a first module for the right channels, module 1, of the device 140 and the elements with a reference number having an index 2 at the first position from the left belong thus to the second component 2 or a second module for the left channels, module 2, of the device 140. Although the number of modules in FIG. 21 is 2, the device could also have more that are arranged with a respective base distance to one another.

In the exemplary case of FIG. 21, each plurality $16_1$ and $16_2$ of optical channels comprises four juxtaposed optical channels. The individual "right" channels are differentiated by the second subscript index. The channels are indexed from right to left, i.e. the optical channel $16_{11}$ not illustrated in FIG. 21 due to a partial omission for clarity purposes is arranged, for example, along the base distance direction 108 along which the left and right channels are arranged offset from one another by the base distance BA at the outer right edge, i.e. furthest apart from the plurality $16_2$ of left channels, wherein the other right channels $16_{12}$-$16_{14}$ follow along the base distance direction 108. Thus, the channels $16_{11}$-$16_{14}$ form a single-line array of optical channels whose line-extension direction corresponds to the base distance direction 108. The left channels $16_2$ are structured in the same way. The same are also differentiated by the second subscript index. The left channels $16_{21}$-$16_{24}$ are arranged beside one another and in the same direction subsequent to one another like the right channels $16_{11}$-$16_{14}$, namely such that the channel $16_{21}$ is closest to the right channels and the channels $16_{24}$ furthest apart from the latter.

Each of the right channels $16_{11}$-$16_{14}$ includes respective optics that can consist, as indicated in FIG. 21, of one lens system. Alternatively, each channel could comprise a lens. Each optical channel $16_{11}$-$16_{14}$ captures one of overlapping partial fields of view 74a-d of the total field of view 72 which overlap as described in the context of FIG. 21a. The channel $16_{11}$ projects, for example, the partial field of view $74_{11}$ on an image sensor area $58_{11}$, the optical channel $16_{12}$ the partial field of view $74_{12}$ on an image sensor area $58_{12}$, the optical channel $16_{13}$ an allocated partial field of view $74_{13}$ on a respective image sensor area $58_{13}$ of the image sensor 12 not visible in FIG. 21, and the optical channel $16_{14}$ an allocated partial field of view $74_{14}$ on a respective image sensor area $58_{14}$ which is also not shown in FIG. 21 since the same is covered.

In FIG. 21, the image sensor areas $58_{11}$-$58_{14}$ of the image sensor 12 and the component $12_1$ of the image sensor 12, respectively, are arranged in a plane parallel to the base distance direction BA and parallel to the line-extension direction 108, respectively, and the lens planes of the optics of the optical channels $16_{11}$-$16_{14}$ are also parallel to this plane. Additionally, the image sensor areas $58_{11}$-$58_{14}$ are arranged with a lateral inter-channel distance 110, by which the optics of the optical channels $16_{11}$-$16_{14}$ are also arranged in this direction, such that the optical axes and optical paths of the optical channels $16_{11}$-$16_{14}$ run parallel to one another between the image sensor areas $58_{11}$-$58_{14}$ and the optics $16_{11}$-$16_{14}$. For example, centers of the image sensor areas $58_{11}$-$58_{14}$ and optical centers of the optics of the optical channels $16_{11}$-$16_{14}$ are arranged on the respective optical axis which run perpendicular to the above-mentioned common plane of the image sensor areas $58_{11}$-$58_{14}$.

The optical axes and optical paths, respectively, of the optical channels $16_{11}$-$16_{14}$ are deflected by a beam-deflecting means $18_1$ and hence provided with a divergence, which has the effect that the partial fields of view $74_{11}$-$74_{14}$ of the optical channels $16_{11}$-$16_{14}$ only overlap partly, such that, for example, the partial fields of view $74_{11}$-$74_{14}$ overlap at the most by 50% in the spatial angular sense. As indicated in FIG. 21, the beam-deflecting means 181 can comprise, for example for each optical channel $16_{11}$-$16_{14}$ a reflective facet which are tilted with respect to one another differently among the channels $16_{11}$-$16_{14}$. An average inclination of the reflective facets with respect to the image sensor plane deflects the total field of view of the right channels $16_{11}$-$16_{14}$ in a direction that is, for example, perpendicular to the plane in which the optical axes of the optics of the optical channels $16_{11}$-$16_{14}$ run prior to and without beam-deflection, respectively, by the device 181, or deviates from this perpendicular direction by less than 10°. Alternatively, the beam-deflecting means 181 could also use prisms for beam-deflection of the individual optical axes and optical paths, respectively of the optical channels $16_{11}$-$16_{14}$.

The beam-deflecting means 181 provides the optical paths of the optical channels $16_{11}$-$16_{14}$ with a divergence such that the channels $16_{11}$-$16_{14}$, actually disposed beside one another in linear way in the direction 108, cover the total field of view 72 in a two-dimensional manner.

It should be noted that the optical paths and optical axes, respectively, could also deviate from the described parallelism, but that the parallelism of the optical paths of the optical channels could still be so distinct that the partial fields of view covered by the individual channels $16_{11}$-$16_{14}$ and projected on the respective image sensor areas $58_{11}$-$58_{14}$, respectively, would mostly overlap without any further measures, such as beam-deflection, so that in order to cover a greater total field of view by the multi-aperture imaging device 140 the beam-deflecting means 18 provides the optical paths with additional divergence such that the partial fields of view of the channels $16_{11}$-$16_{14}$ overlap less. The beam-deflecting means $18_1$ has, for example, the effect that the total field of view has an aperture angle averaged over all azimuthal angles and over all transversal directions, respectively, which is greater than 1.5 times the respective average aperture angle of the partial fields of view of the optical channels $16_{11}$-$16_{14}$.

The left channels $16_{21}$-$16_{24}$ are structured in the same way as the right channels $16_{11}$-$16_{14}$ and positioned relative to the respective allocated image sensor areas $58_{21}$-$58_{24}$, wherein the optical axes of the optical channels $16_{21}$-$16_{24}$ running parallel to one another in the same plane as the optical axes of the channels $16_{11}$-$16_{14}$ are deflected by a corresponding beam-deflecting means $18_2$, such that the optical channels $16_{21}$-$16_{24}$ capture the same total field of view 72 almost congruently namely in partial fields of view $74_{21}$-$74_{24}$ into which the total field of view 72 is two-dimensionally divided, which overlap, and each of which overlaps almost completely with the respective partial field of view $74_{11}$-$74_{14}$ of a respective channel of the right channels $16_{11}$-$16_{14}$. For example, the partial field of view $74_{11}$ and the partial field of view $74_{21}$ overlap almost completely, the partial fields of view $74_{12}$ and $74_{22}$ etc. The image sensor areas $58_{11}$-$58_{24}$ can, for example, each be formed of one chip as described for the image sensor 12 in FIG. 18.

In addition to the above-mentioned components, the 3D multi-aperture imaging device comprises a processor 112 having the task of merging the images that have been captured when capturing by the 3D multi-aperture imaging device 10 by the right optical channels $16_{11}$-$16_{14}$ to a first total image. The problem that has to be addressed is the following: due to the inter-channel distances 110 between adjacent channels of the right channels $16_{11}$-$16_{14}$, the images that have been captured during capturing by the channels $16_{11}$-$16_{14}$ in the image areas $58_{11}$-$58_{14}$ cannot be simply and translationally moved with respect to one another and placed on top of one another. In other words, the same cannot easily be joined. The lateral offset along direction B, 108 and 110, respectively, in the images of the image sensor areas $58_{11}$-$58_{14}$ when capturing the same scene, that correspond to one another but that reside in different images is called disparity. The disparity of corresponding image contents depends again on the distance of this image content within the scene, i.e. the distance of the respective object from the device 140. The processor 112 could try to evaluate disparities among the images of the image sensor areas $58_{11}$-$58_{14}$ itself in order to merge these images with one another to a first total image, namely a "right total image". However, it is a disadvantage that the inter-channel distance 110 does exist and therefore causes the problem, but that the inter-channel distance 110 is also relatively low such that the depth resolution and estimation, respectively, is merely inaccurate. Therefore, the attempt of determining corresponding image content in an overlap area between two images, such as in the overlap area 114 between the images of the image sensor areas $58_{11}$-$58_{12}$, for example, by means of correlation is difficult.

Thus, for merging, the processor of FIG. 21 uses, in the overlap area 114 between the partial fields of view $74_{11}$ and $74_{12}$, disparities in a pair of images, one of which has been captured by one of the left channels $16_{21}$ or $16_{22}$, whose projected second partial field of view, namely $74_{21}$ and $74_{22}$, respectively, overlaps with the overlap area 114. For example, the process 112 for merging the images of the image sensor areas $58_{11}$ and $58_{12}$ evaluates disparities in images, one of which has been captured by one of the image sensor areas $58_{21}$ or $58_{22}$ and another one by a channel involved in the overlap area 140, i.e. an image that has been captured by one of the image sensor areas $58_{11}$ or $58_{12}$. Then, such a pair has a base distance from the base distance BA plus/minus one or no channel based distance 110. The latter base distance is significantly greater than a single channel base distance 110, which is why the disparities are easier to be determined in the overlap area 86 for the processor 112. Thus, for merging the images of the right channels, the processor 112 evaluates disparities that result with an image of the left channels and advantageously, but not exclusively, between images of one of the right channels and one of the left channels.

More specifically, it is possible that the processor 112 takes that part of the partial field of view $74_{11}$ that does not overlap with any of the other partial fields of view of the right channels more or less directly from the image $58_{11}$ and performs the same for the non-overlapping areas of the partial fields of view $74_{12}$, $74_{13}$, and $74_{14}$ based on the images of the image sensor areas $58_{12}$-$58_{14}$, wherein the images of the image sensor areas $58_{11}$-$58_{14}$ have, for example, been captured simultaneously. Merely in the overlap areas of adjacent partial fields of view, such as the partial fields of view $74_{11}$ and $74_{12}$, the processor 112 uses disparities of image pairs whose overlap in the total field of view 72 does overlap in the overlap area, but wherein the plurality but not merely one of them has been captured by one of the right channels and the other one by one of the left channels, such as again at the same time.

However, according to an alternative procedure, it would also be possible that the processor 112 warps all images of the right channel according to an evaluation of disparities between pairs of images where one of them has been captured by the right channels and the other one by the left channels. In that way, for example, the total image that is calculated by the processor 112 for the images of the right channels could be virtually "warped" not only in the overlap area of the partial fields of view $74_{11}$-$74_{14}$ of the right channels but also in the non-overlap area in a virtual manner on a focal point which is, for example, laterally in the center between the right channels $16_{11}$-$16_{14}$ by evaluating, also for those areas of the partial fields of view $74_{11}$-$74_{14}$ that do not overlap, disparities of image pairs by the processor 85 where one image has been captured by one of the right channels and another image by one of the left channels.

The 3D multi-aperture imaging device 140 of FIG. 21 is not only able to generate a total image from the images of the right channel, but the 3D multi-aperture imaging device 140 of FIG. 21 is also able, in one operating mode, to generate, in addition to the total image of the first channels, also a total image of the images of the left channels and/or to generate, in addition to the total image of the right channels, a depth map.

According to the first alternative, the processor 112 is, for example, configured to merge images captured by the left optical channels $16_{21}$-$16_{24}$ and the image sensor areas $58_{21}$-$58_{24}$ to a second total image, namely a total image of the left channel and to thereby use, in an overlap area of laterally adjacent ones of the partial fields of view $74_{21}$-$74_{24}$ of the left optical channels, disparities in a pair of images, the plurality of which but not only one has been captured by a right optical channel $16_{11}$-$16_{14}$ and overlaps with the respective overlap area of the pair of partial fields of view $74_{21}$-$74_{24}$, and the other one may be captured by one of the left optical channels whose partial field of view overlaps with the respective overlap area.

Thus, according to the first alternative, the processor 112 outputs two total images for one capturing, namely one for the right optical channels and the other for the left optical channels. These two total images could be supplied, for example, to the two eyes of a user separately and hence result in a three-dimensional impression of the captured scene.

According to the other above-mentioned alternative, the processor 112 generates, in addition to the total image of the right channels a depth map, by using disparities in pairs of images comprising at least one pair at least for each of the right channels $16_{11}$-$16_{14}$ comprising an image captured by the respective right channel and a further image captured by one of the left channels.

In one embodiment, where the depth map is generated by the processor 112, it is also possible to perform the above-mentioned warping for all the images that have been captured by the right channels based on the depth map. Since the depth map comprises depth information across the total field of view 72, it is possible to warp all the images that have been captured by the right channels, i.e. not only in the overlap areas of the same but also in the non-overlap areas, on a virtual common aperture point and a virtual optical center, respectively.

The two alternatives could also both be processed by the processor 112. The same could first generate, as described above, the two total images, namely one for the right optical channels and the other for the left optical channels by using, when merging the images of the right channels in the overlap areas between the images of the right channels also disparities from pairs of images where one of them belongs to the images of the left channels, and by using, when merging the images of the left channels in the overlap areas between the images of the left channels, also disparities from pairs of images where one of them belongs to the images of the right channels in order to generate then, from the total images obtained in that manner which represent the scene in the total field of view from different perspectives, a total image with an allocated depth map, such as a total image that lies between the optical centers of the optics of the right and left optical channels, but possibly not exclusively in the center between the same, for a virtual view and for a virtual optical center, respectively. For calculating the depth map and for warping one of the two total images or warping and merging both total images in the virtual view, the processor 85 would then use the right and left total image, virtually as intermediate result from the previous merging of the left and right individual images, respectively. Here, the processor evaluated disparities in the two intermediate result total images in order to obtain the depth map and to perform warping or warping/merging of the same.

It should be noted that the processor 112 performs evaluation of disparities in a pair of images, for example, by means of cross-correlation of image areas.

It should be noted that in a different coverage of the total field of view 72 by the partial fields of view of the left channels on the one hand and by the partial fields of view of the right channels on the other hand, possibly more than four channels (irrespective of their allocation to the left or right channels) overlap, as it was the case, for example, also at the mutual overlap between the overlap areas of partial fields of view adjacent in line direction or column direction of the previous examples, where the partial fields of view of the right channels as well as the partial fields of view of the left channels were each arranged in columns and lines. It applies generally to the number of disparity sources that the same are ($2^N$), wherein N relates to the number of channels with overlapping partials fields of view.

In addition to the above description, it should be noted that the processor 112 optionally also performs channel-by-channel correction of perspective projection faults of the respective channel.

It should be noted that the embodiment of FIG. 21 has been exemplary in many ways. This concerns, for example, the number of optical channels. The number of right optical channels might not be four but is somehow greater than or equal to 2 or is between 2 and 10, both inclusive, and the overlap area of the partial fields of view of the right optical channels can, as far as for each partial field of view or each channel the pair with the greatest overlap to the respective partial field of view is considered, can be, in terms of surface area for all these pairs, between ½ and ¹⁄₁₀₀₀ of an average image size of the images captured by the image areas $58_{11}$-$58_{14}$, measured, for example, in the image plane, i.e., the plane of the image sensor areas. The same applies, for example, to the left channels. However, the number can differ between the right channels and the left channels. This means that the number of left optical channels, $N_L$, and right optical channels, $N_R$, does not have to be the same and a division of the total field of view 72 into the partial fields of view of the left channels and the partial fields of view of the right channels does not have to be approximately the same as it was the case in FIG. 21. Concerning the partial fields of view and their overlap it can be such that the partial fields of view project into one another but at least 20 pixel, as long as an image distance and object distance, respectively, of 10 m is considered, for all pairs having a greater overlap, wherein this can apply both to the right channels as well as to the left channels.

In contrary to the above statements it is not necessary that the left optical channels and the right optical channels, respectively, are formed in a single line. The left and/or the right channels can also form a two-dimensional array of optical channels. Additionally, it is not necessary that the single-line arrays have a collinear line-extension direction. However, the arrangement of FIG. 21 is advantageous since the same results in a minimum installation height perpendicular to the plane in which the optical axes of the optical channels, i.e., both the right and the left channels run prior to and without beam deflection, respectively. Concerning the image sensor 12 it had already been mentioned that the same can be formed of one, two or several chips. For example, one chip could be provided per image sensor area $58_{11}$-$58_{14}$ and $58_{21}$-$58_{24}$, wherein in the case of several chips the same can be mounted on one or several printed circuit boards, such as one printed circuit board for the left channels and the image sensors of the left channels, respectively, and one printed circuit board for the image sensors of the right channels.

Thus, in the embodiment of FIG. 21 it is possible to place adjacent channels within the channels of the right or left channels as densely as possible, wherein in the optimum case the channel distance 110 corresponds to the lens diameter. This results in a low channel distance and hence low disparity. The right channels on the one hand and the left channels on the other hand can, however, be arranged at any distance BA to one another, such that great disparities can be realized. All in all, there is the option of artefact-reduced or artefact-free image fusion and a production of depth maps with a passive optical imaging system.

Compared to the above examples it would be possible to use more than only two groups of channels $16_1$ and $16_2$. The number of groups could be indicated by N. If in this case the number of channels per group were the same, and the total field of view division into partial fields of view were also the same for all groups, a number of disparity sources of $(_2^{2N})$, for example, would result per overlap area of partial fields of view of the group 161. A different total field of view division for the groups of channels is also possible as has already been mentioned above.

Finally, it should be noted that in the above description merely the exemplary case that the processor 112 merges the image of the right channels has been used. The same process could be performed by the processor 112, as mentioned above, for both and all channel groups, respectively, or also for the left one or the same.

Figure 22A:
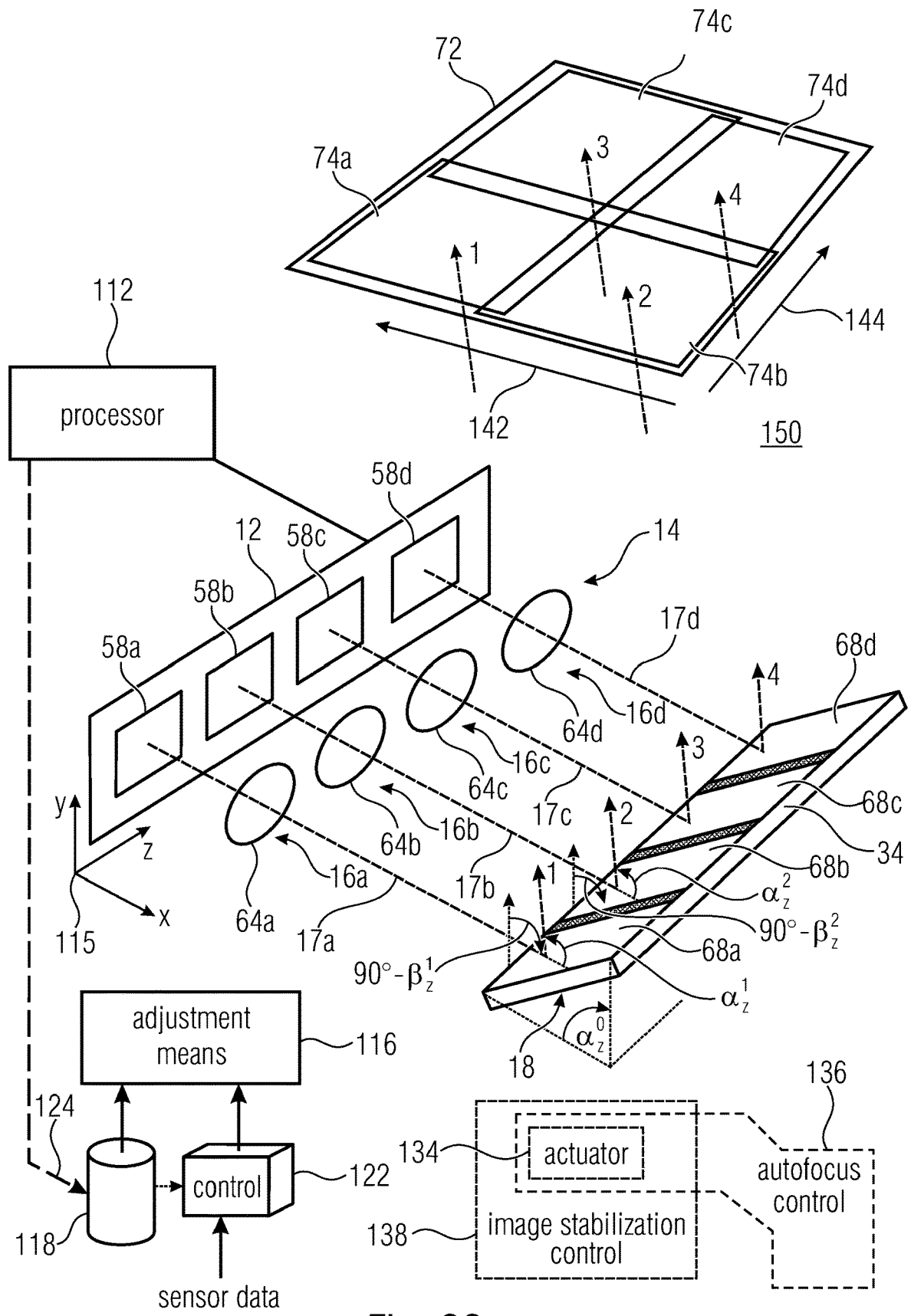
FIG. 22a shows a schematic view of a further multi-aperture imaging device according to an embodiment supplemented, according to an embodiment, by additional means for realizing relative movements for focus control and optical image stabilization.

FIG. 22a shows an embodiment of a multi-aperture imaging device 150. Advantageously, the image sensor areas 58a-d are arranged in a common plane, namely the image plane of the optical channels 16 and their optics, respectively. In FIG. 22a, this plane is exemplarily parallel to the plane spanned by a z and a y axis of a Cartesian coordinate system which is, for simplifying the following description, shown in FIG. 22a and provided with the reference number 115.

In a linear array of optical channels, the extension of the multi-aperture imaging device 150, as it is limited by the image sensor 12 and the optics 64 towards the bottom, is greater along the line-extension direction than the diameter of a lens. The minimum extension of the multi-aperture imaging device 150, as it is determined by the mutual arrangement of image sensor 12 to optics 64 along the z axis, i.e., along the optical axes and optical paths of the optical channels 16a-d, is smaller than the minimum extension along the z axis, but due to the implementation of the optical channels 16a-d as a single-line array, the same is greater than the minimum expansion of the multi-aperture imaging device in the lateral direction y perpendicular to the line-extension direction z. The latter is given by the lateral extension of each individual optical channel 16a-d, such as the extension of the optics 64a-d along the y axis, possibly including the holder 66.

As described above, in the embodiment of FIG. 22a, the optical axes 17a-d are parallel to another prior to and without the deflection by the beam-deflecting means 18, respectively, for example, at the optics 64a-d, respectively, as shown in FIG. 22a, or the same only deviate slightly therefrom. The corresponding centered positioning of optics 64a-d as well as the image sensor areas 58a-d is easy to produce and favorable as regards to minimizing the installation space. The parallelism of the optical paths of the optical channels has also the effect that the partial fields of view covered by the individual channels 16a-d and projected on the respective image sensor areas 58a-d, respectively would overlap almost completely without any further measures, such as beam deflection. In order to cover a greater total field of view by the multi-aperture imaging device 150, a further function of the beam-deflecting means 18 is to provide the optical paths with divergence such that the partial fields of view of the channels 16a-d overlap less.

It is assumed, for example, that the optical axes 17a-d of the optical paths of the optical channels 16a-d are parallel to one another prior to and without the beam-deflecting means 18, respectively, or deviate, with regard to a parallel alignment along the alignment averaged across all channels, by less than a tenth of a minimum aperture angle of the partial fields of view of the optical channels 16a-d. Without additional measures, the partial fields of view would largely overlap. Thus, the beam-deflecting means 18 of FIG. 22a includes, for each optical channel 16a-d, a reflecting facet 68a-d clearly allocated to this channel, which are each optically planar and tilted with respect to one another, namely such that the partial fields of view of the optical channels overlap less with regards to the solid angle and cover, for example a total field of view having an aperture angle that is, for example, greater than 1.5 times the aperture angle of the individual partial fields of view of the optical channels 16a-d. In the exemplary case of FIG. 22a, the mutual inclination of the reflective facets 68a-d has, for example, the effect that the optical channels 16a-d that are actually arranged linearly juxtaposed along the z axis cover the total field of view 72 according to a two-dimensional arrangement of the partial fields of view 74a-d.

If, in the embodiment of FIG. 22a, the angular deflection of the optical axes 17a-d of the optical channels 16a-d is considered in the plane spanned by the averaged direction of the optical axes prior to beam deflection and the averaged direction of the optical axes after beam deflection, i.e., in the zy plane in the example of FIG. 22a on the one hand and in the plane running perpendicular to the latter plane and parallel to the averaged direction of the optical axes after beam deflection on the other hand, the example of FIG. 22a corresponds to the exemplary case that the averaged direction after beam deflection corresponds to the y axis. Thus, on average, the optical axes of the optical channels are deflected by 90° in the yz plane around the z axis and, on average, the optical axes are not tiled out of the yz plane.

For example, $\beta_x^1$ indicates the inclination angle of the facet 68a with respect to the xz plane measured in the xy plane, i.e., tilting of the facet 68a around the z axis with respect to the xz plane in which the optical axes 17a-d run. $\beta_z^1=0°$ corresponds to an alignment of the facet 68a parallel to the xz plane. Accordingly, $\alpha_z^1=2\cdot\beta_z^1$ applies. Accordingly, N defines the inclination angle of the facet 68a with respect to a plane having the inclination $\beta_z^1$ with respect to the xz plane and running parallel to the z axis measured along the z axis. Therefore, $\alpha_x^1=2\cdot\beta_x^1$ applies accordingly. The same definitions apply for the other channels: $\alpha_x^i=2\cdot\beta_x^i$, $\alpha_z^i=2\cdot\beta_z^i$. For each optical channel, the setting angle can be greater than an inclination angle of the inclination of the reflecting facet allocated to this channel with respect to carrier substrate through which the optical channels run. Here, the carrier substrate can be positioned parallel to a line-extension direction of the array 14 and the setting angle can be in a plane perpendicular to the line-extension direction.

FIGS. 22b-22e show side views of a beam-deflecting device according to an embodiment for exemplarily four optical channels that are arranged linearly or unilaterally, respectively. The beam-deflecting device 18 of FIG. 22b-229e could be used as beam-deflecting device of FIG. 18a, wherein then the partial fields of view would not cover the total field of view clockwise 3, 4, 2, 1 as illustrated in FIG. 18a, but clockwise in the order 4, 2, 1, 3. The inclination angles of the facets 68a-d are indicated in FIG. 22b-e. The same are differentiated by superscript indices 1-4 and allocated to the respective channel, respectively. Here, both and are 0°. The rear side of the carrier substrate, i.e., the side opposing the surface provided with the facets 68a-d is indicated in FIG. 22b-22e by 12₁. The material forming the parallelepiped-shaped portion of the carrier substrate 123 is below the dotted line 125. It is obvious that the additional material added to the same has little volume such that molding is eased.

The carrier substrate 123 is placed inclined by a setting angle $\alpha_x^0$ with respect to the image sensor 12, namely around the axis around which the average direction of the optical axes of the optical channels is deflected, i.e., the z axis in FIG. 22a. This setting angle has the effect that the surface of the beam-deflecting device 18 facing the image sensor 12 already effects "coarse deflection" of the optical paths of the optical channels.

For the deflecting angles of the deflection of the optical path of each optical channel by the beam-deflecting means 18, this means that the same are each based on the setting angle $\alpha_x^0$ as well as on the respective inclination of the reflecting facet allocated to the optical channel with respect to the carrier substrate 123 itself. These mentioned facet-individual inclinations of the facets 68a-d can be defined, as described above, by an inclination angle in the xy plane and an inclination angle with respect to the normal of the carrier substrate 123 in the plane perpendicular thereto. It is of advantage when it applies that, for each channel, the setting angle $\alpha_x^0$ is greater than the inclination, i.e., $\alpha_x^0 > \max(|\beta_x|, |\beta_z|)$ for all channels. It is of even more advantage when said inequality is fulfilled already for $\alpha_x^0/2$ or even for $\alpha_x^0/3$. In other words, it is of advantage when the setting angle is great compared to the inclination angles of the facets 68a-d, such that the additional material compared to a pure parallelepiped-shape of the beam-deflecting device 18 is low. $\alpha_x^0$ can, for example, lie between 30° and 60°, each inclusive.

Production of the beam-deflecting means 18 of FIG. 22b-22e can be performed, for example, in that the additional material is molded on the carrier substrate 123 by a molding tool. Here, the carrier substrate 123 could, for example, be glass while the molded additional material thereon is polymer. A further option is forming the beam-deflecting device 18 of FIG. 22b-22e integrally by injection molding or the same. This has the effect that the surface of the beam-deflecting means facing the image sensor is mirrored at least on the reflecting facets allocated to the optical channels. The carrier substrate can be pivoted as described, for example, in the context of FIG. 11b.

Some aspects of the structure of the multi-aperture imaging device described so far relate, so to speak, to a desired or instantaneous setting prior to or at the time of capturing a total image, for example. The multi-aperture imaging device 150 of FIG. 22a includes, for example, a processor, such as the processor 112 that merges images that have been captured by the image sensor areas 58a-d at, for example, the same time, with the above mentioned settings, to a total image representing the scene in the total field of view 72. The algorithm used by the processor 112 to join or merge the images projected by the optical channels 16a-d on the image sensor areas 58a-d and captured by the latter is, for example, designed such that assumptions on maintaining specific parameters of the above-described components of the multi-aperture imaging device 150 should be complied with such that the quality of the total image fulfils certain specifications or the algorithm can be applied at all. For example, the algorithm assumes compliance with one or several of the following assumptions:

1) The optics to image sensor area distances along the x axis are the same for all optical channels 16a-d;
2) The relative location of the partial fields of view 74a-d and in particular the overlap between the same corresponds to a predetermined specification or deviates from the same by less than a predetermined maximum deviation.

For various reasons, it can be the case that one or several of the above stated assumptions are not complied with or are not complied with sufficiently. Reasons for not complying with the same could, for example, be production tolerances, such as inaccuracies of the relative locations of the optics 64a-d to one another and relative to the image sensor 12. Production inaccuracies can also include an inaccuracy of the installation of the beam-deflecting device 18 and possibly the relative locations of the facets 68a-d to one another when the beam-deflecting means 18 comprises facets 68a-f. In addition to or as an alternative to the production-induced tolerance deviations, temperature variations can have the effect that one or several of the above stated assumptions does not apply or is not sufficiently complied with.

To some degree, the algorithm for joining and merging, respectively, the images of the image sensor areas 58a-d to the total image executed by the processor 112 can possibly compensate deviations from an optimum alignment and arrangement of the components, such as deviations of the positions of the partial fields of view 74a-d within the total field of view 72 from a set constellation of relative locations of the partial fields of view to one another. When joining and merging, respectively, the images, the processor 112 could compensate, for example, such deviations to a certain degree. However, when specific deviation limits are exceeded (not complying with assumption 2), the processor 112 would, for example, not be able to compensate the deviations.

Producing the multi-aperture imaging device 150 such that the above-mentioned assumptions are complied with, such as across a specific temperature range, has the tendency of increasing production costs of the multi-aperture imaging device 150. In order to prevent this, the multi-aperture imaging device 150 of FIG. 22a includes an adjustment means 116 for channel-individually changing a relative location between the image sensor area 58i of a respective optical channel 16i, the optics 64i of the respective optical channel 16i and the beam-deflecting means 18 and the respective segment 68i of the same, or for channel-individually changing an optical characteristic 16i or an optical characteristic of the segment 68i of the beam-deflecting means 18 relating to the deflection of the optical path of the respective optical channel. The adjustment means 116 is controlled by default values and performs the adjustment tasks according to the default values. The same are provided by a memory 118 and/or a control 122 that will be discussed below.

The device 150 comprises, for example, a memory 118 with stored default values for channel-individual control of the adjustment means 116. The default values can be determined by the manufacturer and can be stored in the memory 118. Additionally, for example, as indicated in FIG. 22a by a dotted line 124, the processor 112 can be able, via evaluations of captured images of the image sensor areas 58a-d, such as images to be joined and merged to a total image, respectively, by the processor 112, to improve and update the stored default values in the memory 118. The processor 112 captures, for example, a scene by adjusting the multi-aperture imaging device 150 with current stored default values via the adjustment means 116, as will be described in more detail below. For this, the default values are read out of the memory 118 and used by the adjustment means 116 for channel-individual adjustment. By analyzing the images of the image sensor areas 58a-d captured in that way, the processor 112 obtains information on how the stored default values just used for capturing are to be modified in the memory 118 in order to result in a more accurate or improved compliance of the above assumptions in the next capturing by using these improved or updated default values.

The stored default values can comprise a complete set of adjustment values, i.e., a set of adjustment values for completely adjusting the device 150. The same are selected as described above and explained in more detail below in order to reduce or eliminate specific channel-individual deviations of the optical characteristics of the channels from a set characteristic.

It can be the case that the default values include several sets of adjustment values, such as one per sequence of successive temperature intervals such that for image capturing that set of adjustment values is used that is actually suitable for a current situation. For this, the control 122 can access or look up the table of allocations between default value sets and different predetermined situations in the memory 118. For this access, the control 122 receives sensor data reflecting the current situation, such as data concerning temperature, pressure, moisture, location of the device 150 in the room and/or a current acceleration or a current turning rate of the device 150 and determines from this data one of the several default value sets in the memory 118, namely the one allocated to the predetermined situation which is closest to the current situation as described by the sensor data.

Sensor data can also be obtained from the image sensor data of image sensor areas. For example, the control 122 selects a set in the allocated temperature interval of which the current temperature falls. The default values of the selected set from the memory 118 used for specific image capturing by the adjustment means 116 can then be updated again when the optional feedback 124 is used.

The stored default values can be configured, for example, such that a measure for dispersion of a distribution of one or several characteristics among the optical channels is reduced by controlling the adjustment device by means of the stored default values, namely a transversal deviation of the partial fields of view from a regular distribution of the partial fields of view, focal lengths of the optics or depth-of-field distances of the optical channels.

Alternatively, the default values in the control 122 can be determined without any memory 118, namely when, for example, mapping of the current sensor data on suitable default values is firmly integrated in the control 122. The mapping can be described by a functional context between sensor data and default values. A functional context could be adapted by parameters. The parameters could be adapted via the feedback 124.

The memory 118 can, for example, be a non-volatile memory. Possibly, it is a read-only memory but a rewritable memory is also possible. The control 122 and the processor 112 can be implemented in software, hardware or in programmable hardware. The same can be programs executed on a common microprocessor. The sensors for providing the sensor data for the control 122 can belong to the device 150, such as, for example, the image sensor areas or can also be external components, such as components of the apparatus incorporated into the device as will be discussed with reference to the following figures.

In the following, possible implementations for the adjustment means 116 will be described. Here, the adjustment means 116 of FIG. 22a can apply to one, several or all of the implementation variations described below. Specific combinations will also be discussed below.

In the shown variation, the adjustment means 116 comprises, for example, one actuator 126i for each channel 16i which moves the optics 64i of the respective channel 16i in axial direction along the optical axis 17i and along the optical path and/or transversal thereto along the z axis and/or the y axis. Alternatively, the actuator 126i could, for example, also move the image sensor 12 or an individual image sensor area 58i. Generally, the actuator 126i could effect a relative movement of image sensor area 58i, optics 64i and/or the respective segment 64i of the beam-deflecting means 24.

Figure 23B:
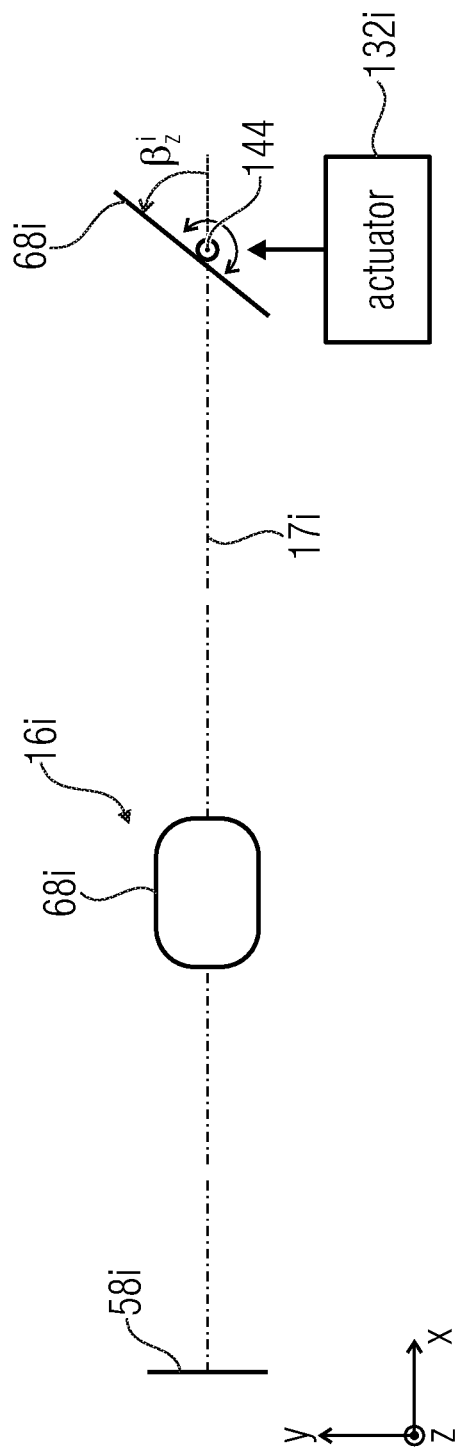
FIG. 23b shows a variation of a multi-aperture imaging device with the adjustment means according to an embodiment.

According to a variation to which FIG. 23a relates, the adjustment means 116 comprises a phase changing optical element and a phase changing element 128i for each channel 16i, which can, as indicated in FIG. 23a, be integrated in the respective optics 64ai (128i″) into the segment 61i (128i‴) between image sensor area 58i and optics 64i (128i′) or can be positioned between optics 64i and beam-deflecting segment 68i (128i‴), wherein also combinations of the above-mentioned options are possible. The phase changing optical element 128i can, for example effect a location-dependent change of a refractive index, i.e. a local distribution of the same, such as by liquid crystals. Alternatively or additionally, the phase-changing optical element 128i causes a change of the shape of an optically active surface, such as by using piezos having a mechanical effect on flexible fixed transparent materials and cause a deformation or by using an electro-wetting effect. The phase-changing optical element 128$i'''$ could, for example change the refractive index of optics 64$i$. Alternatively, the phase-changing element 128$i''$ could change a shape of an optical lens area of the optics 64$i$ and thereby change the effective refractive force of the optics 64$i$. The phase-changing element 128$i'''$ could, for example generate on an optically relevant surface of the segments 68$i$, such as on the reflective facet, a sinusoidal phase grid in order to effect virtual tilting of the respective surface. Similarly, the phase-changing element 128$i'$ or phase-changing element 128$i''$ could deflect the optical axis.

In other words, the phase change effected by the phase-changing optical element 128$i$ could be almost rotationally symmetrical such as rotationally symmetrical around the optical axis 17$i$ and hence effect in the case 128$i'$, for example a change of the focal width of the optics 64$i$.

The phase change effected by the element 128$i$ could, however, be almost linear such as linear along the z axis or along the y axis in order to effect a change of the deflection angle or a deflection of the optical axis 17$i$ in the respective direction.

The rotationally symmetric phase change can be used for focusing and the linear phase change for a position correction of the partial field of view of the respective optical channel 16$i$.

According to a further variation illustrated in FIG. 23$b$, the adjustment means 116 comprises one actuator 132$i$ for each channel 16$i$, which changes the segment 68$i$, such as the reflecting facet of the respective channel 16$i$ in its angular orientation with respect to the optical axis 17$i$, i.e. the setting angle $\beta_x^i$. Here, it should be noted that the segment 68$i$ is not limited to a reflecting facet. Each segment 68$i$ could also be implemented as a prism deflecting the direction of the optical axis 17$i$ in the yz plane while the prism is passed by the optical path of the optical channel 16$i$.

For realizing the relative movements by the actuators 126$i$ and 132$i$, respectively, i.e. for generating the movement of the optics 68$i$ which could be configured, for example in a translational manner, as well as for tilting the segment 68$i$ by the actuator 132$i$ and the z axis, for example, a pneumatic, hydraulic, piezoelectric, thermal, electrostatic or electrodynamic drive or DC or step motor or again a voice-coil drive could be used.

With renewed reference to FIG. 22$a$, it is indicated by dotted lines that the multi-aperture imaging device 150 can optionally include, in addition to the adjustment means 116, one or several actuators 134 for generating a channel global, i.e. for all optical channels 16$a$-$d$ equal relative movement between image sensor 12, optics array 14 and beam-deflecting means 18. The one or the several additional actuators 134 could, as indicated in FIG. 22$a$, be part of an optionally existing autofocus control 136 (focusing means) and/or an optionally existing image stabilization control of the multi-aperture imaging device.

Figure 24:
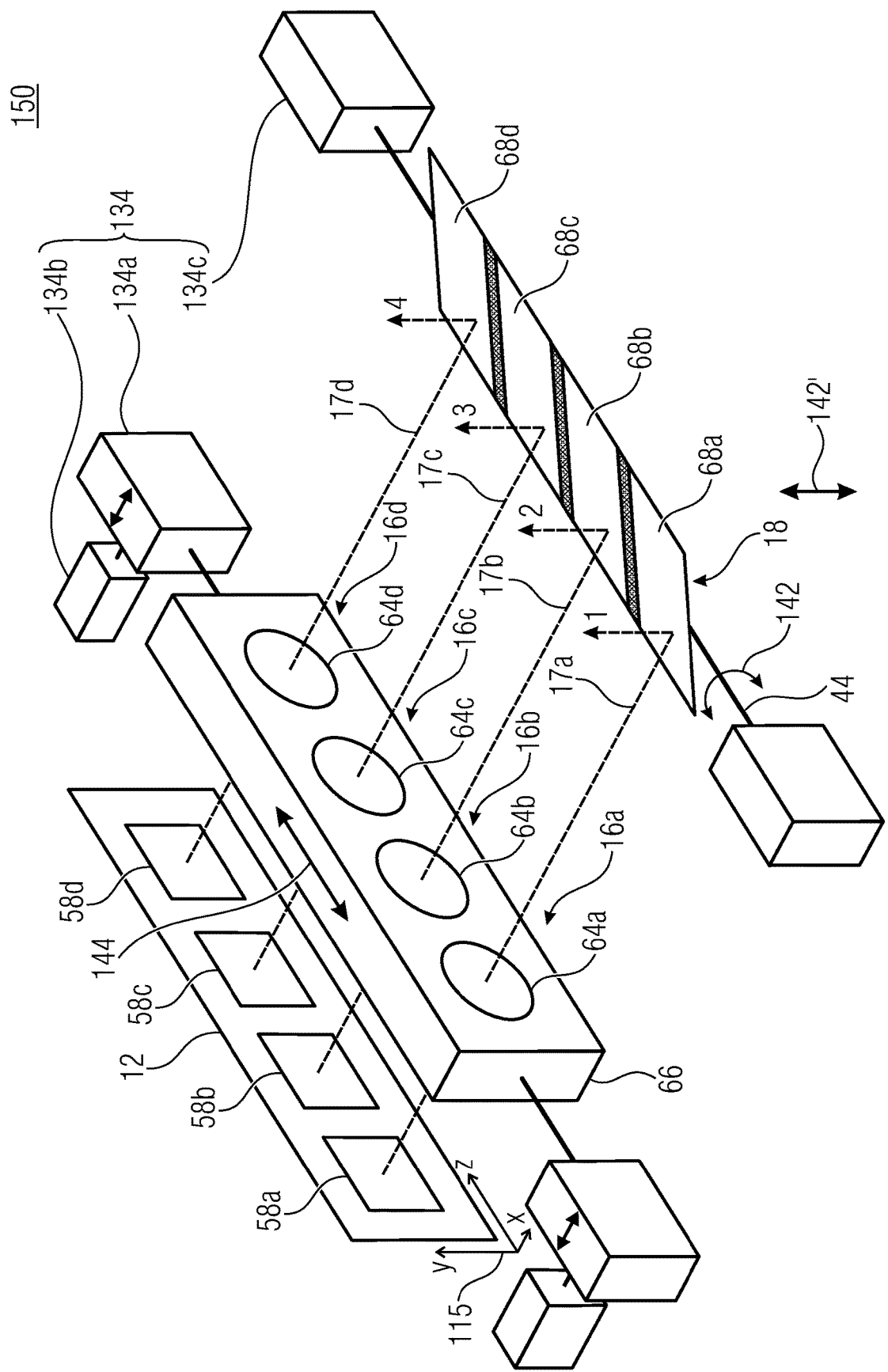
FIG. 24 shows a schematic view of the device of FIG. 22a supplemented by additional actuators according to an embodiment.

A specific example of a device 150 of FIG. 22$a$ supplemented by additional actuators is shown in FIG. 24. FIG. 24 shows the multi-aperture imaging device 150 of FIG. 22$a$, wherein the optics 64$a$-$d$ of the optical channels 16$a$-$d$ are mechanically fixed to one another via the common carrier 66. Via this common holder it is possible to subject the optics 64$a$-$d$ to a global movement which is the same for all channels, such as by translational movement of the carrier 66 in the z direction, i.e. along the line-extension direction of the array 14. For this, an actuator 134$a$ is provided. Thus, the actuator 134$a$ generates a translational movement of the optics 64$a$-$d$ which is the same for all optical channels 16$a$-$d$, in that the actuator 134$a$ subjects the common carrier 66 to the translational movement along the x axis. Regarding the type of actuator 134$a$, reference is made to the examples that have been referred to with reference to FIGS. 23$a$ and 23$b$. Further, the device 150 comprises an actuator 134$b$ for channel global, i.e. for all optical channels 16$a$-$d$ the same changing of the distance of the image sensor 58$i$ to optics 54$i$ along the x axis and along the optical axis 17$i$, respectively. As indicated in FIG. 24, for example the actuator 134$b$ subject to optics 64$a$-$d$ to the translational movement along the z axis for changing the distance from the allocated image sensor portions 58$a$-$d$ not via the carrier 66 but also via the actuator 134, which is thus also subject to the translational movement along the x axis and actually serves as suspension for the carrier 66.

Additionally, the device 150 of FIG. 24 comprises an actuator 134$c$ for rotating the beam-deflecting means 18 around an axis running parallel to the z axis and lying in or not far apart from the plane where the optical axes 17$a$-$d$ run. Also concerning actuators 134$b$ and 134$c$ reference is made to the list of examples provided with reference to FIGS. 23$a$ and 23$b$ above concerning possible implementation examples. The rotational movement exerted by the actuator 134$c$ on the beam-deflecting means 18 has the same or equal effect on the segments 68$a$-$d$ on the beam-deflecting means 18 for all channels 16$a$-$d$, i.e. the same is channel global.

Via the actuator 134$b$, the autofocus control 136 is, for example able to control the focus of an image by the device 150 by means of the channels 16$a$-$d$ in the channel global sense. The image stabilization control 138 is able to stabilize the total field of view 72 by means of the actuator 134$c$ in a first direction 142 and by means of the actuator 134$a$ in a direction 144 perpendicular thereto from shaking by a user. The first direction 142 can be obtained by a rotational movement around the axis of rotation 44. As indicated by the first direction 142', alternatively or additionally, translational movement of the beam-deflecting means 18 and/or the array 14 can be generated by the actuator 134. Here, the directions 142, 142' and 144 can be parallel to the image axis, in one plane of the direction or can correspond to the same. Image stabilizers described herein can be configured in order to commonly act for two, a plurality or all optical paths of the optical channels. This means that channel individual stabilization can be omitted which is advantageous.

For example, the device 150 of FIG. 22$a$ comprises an actuator for each channel 16$a$-$d$, such as an actuator 126$i$ for each channel 16$i$ in order to subject the image sensor segments or areas 58$a$-$d$ in a channel individual manner to a translational movement along the z axis and/or along the y axis in order to compensate, for example, to a reduction of inaccuracies or temperature-induced drifts of the partial fields of view within the total field of view. Alternatively or additionally, the device 150 of FIG. 22$a$ could comprise an actuator 128$i''$ in order to compensate focal width differences of the optics 64$a$-$d$ that have undesirably occurred caused by production. Additionally or alternatively, the device 150 of FIG. 22$a$ can comprise an actuator 128$i'''$ in order to compensate deviations of the relative inclinations of segments 68$a$-$d$ among one another caused by production or temperature that developed such that the relative inclinations result in the desired coverage of the total field of view 72 by the partial fields of view 74$a$-$d$. Additionally or alternatively, the device 150 then can comprise actuators of the types 128$i'$ and 128$i'''$, respectively.

Again, summarized, the device 150 can comprise an actuator 134$c$ that is configured to rotate the beam-deflecting means 18 around an axis which is parallel to the line-extension direction z of the array 14. The axis of rotation is, for example in the plane of the optical axes 17$a$-$d$ or apart therefrom left by a quarter of a diameter of the optics 64a-d. Alternatively, it could also be possible that the axis of rotation is further apart, such as less than one optics diameter or less than four optics diameters. The actuator 134c can, for example, be provided to rotate the beam-deflecting means 18 with a short response time in merely a small angular range, such as within a span of less than 5° or less than 10° in order to compensate shakings of the multi-aperture imaging device 150, for example by a user, during image capture. In this case, the actuator 134c would for example be controlled by the image stabilization control 138.

Alternatively or additionally, the actuator 134c could be configured to change the total field of view 72 with greater angular offsets, which is defined by the total coverage of the partial fields of view 74a-d (FIG. 22a) in its direction. Here it would further be possible that also deflections are obtained by rotating the beam-deflecting means 18 where the total field of view is arranged in the opposite direction relative to the device 150, for example in that the beam-deflecting means 18 is configured as a mirror array reflecting on both sides.

Again, alternatively or additionally, the device 150 can comprise an actuator 134a that is configured to move the optics 64a-d by means of the substrate 66 and the substrate 66 itself and hence the optics 64a-d in a translation manner along the line-extension direction. The actuator 134a could, for example also be controlled by the above-mentioned image stabilization control in order to obtain, by the movement 96 along the line-extension direction, image stabilization transversely to the image stabilization realized by the rotation of the mirror deflecting means 18.

Further, additionally or alternatively, the device 150 can comprise an actuator 134b for changing the image side distance between image sensor 12 and optics 64a-d and between the image sensor 12 and a body 66, respectively, to obtain depth of field adjustment, cf. FIG. 19. The means 98 can be controlled by a manual user control or by autofocus control of the device 150.

The actuator 134a serves as a suspension of the substrate 66 and, as indicated in FIG. 22a, the same may be arranged laterally besides substrate 66 along the line-extension direction in order to not increase the installation height. It also applies for actuators 134b and 134c that the same may be arranged in the plane of the optical path in order to not increase the installation height.

It should be noted that the optics 64a-d could not only be held with respect to one another, such as via the above-mentioned transparent substrate, but also relative to the beam-deflecting means in a constant relative position, such as via a suitable frame which advantageously does not increase installation height and hence once advantageously in the plane of the components 12, 14 and 66 and in the plane of the optical path, respectively. The consistency of the relative position could be limited to the distance between optics and beam-deflecting means along the optical axes, such that the actuator 134b moves, for example, the optics 64a-d together with the beam-deflecting means 18 in a translational manner along the optical axes. The optics-to-beam-deflecting means distance could be set to a minimum distance, such that the optical path of the channels is not laterally limited by segments of the beam-deflecting means 18, which reduces the installation height, since otherwise the segments 68i would have to be dimensioned, as regards to the lateral extension, for the greatest optics-to-beam-deflecting means distance in order to not limit the optical path. Additionally, the consistency of the relative position would mean that the above mentioned frame holds the optics and the beam-deflecting means along the z axis in a rigid manner to one another, such that the actuator 134a would move the optics 64a-d together with the beam-deflecting means translationally along the line-extension direction.

The above described beam-deflecting means 18 for deflecting the optical path of the optical channels allows, together with the actuator 134c for generating the rotational movement of the beam-deflecting means 18 and the actuator 134 of an optical image stabilization control of the multi-aperture imaging device 150 image and total image field stabilization, respectively, in two-dimension, namely by the translational movement of the substrate 66 image stabilization along a first image axis running essentially parallel to the line-extension direction and by generating the rotational movement of the beam-deflecting means 18 image stabilization along a second image axis running essentially parallel to the optical axis prior to and without beam deflection, respectively, or, if the deflected optical axes are considered, perpendicular to the optical axes and the line-extension direction. Additionally, the arrangement described herein can effect translational movement of the beam-deflecting means fixed in the state frame and the array 14 perpendicular to the line-extension direction such as by the described actuator 54, which can be used for realizing focus control and hence autofocus function.

Figure 25:
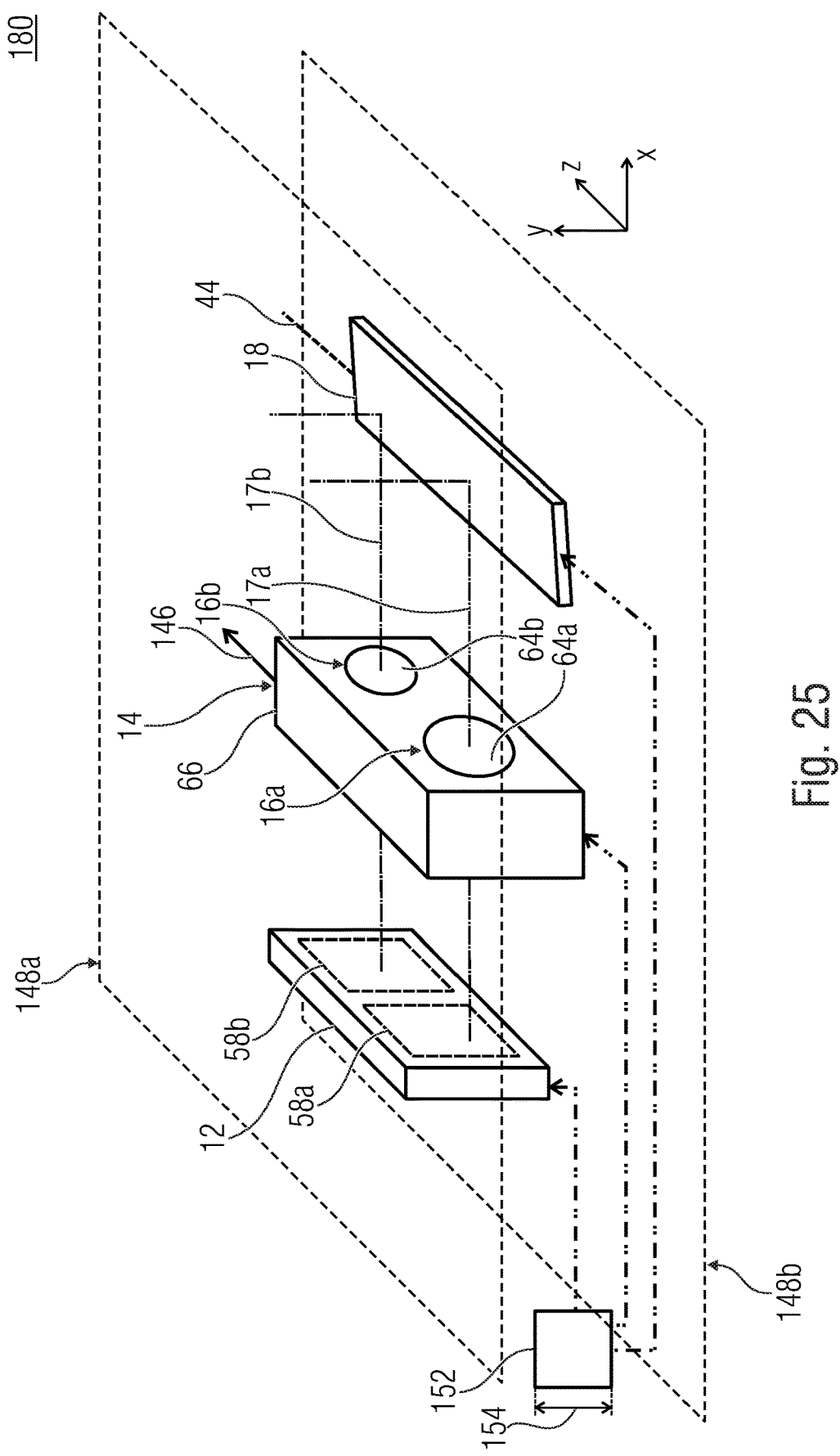
FIG. 25 shows a schematic view of an arrangement of actuators in a multi-aperture imaging device according to an embodiment.

FIG. 25 shows a schematic view of a multi-aperture imaging device 180 for illustrating an advantageous arrangement of actuators, such as for image stabilization and/or for adjusting a focus. The image sensor 12, the array 14 and the beam-deflecting means 18 can span a cuboid in space. The cuboid can also be considered as virtual cuboid and can have, for example, a minimum volume and in particular a minimum perpendicular extension along a direction parallel to the y direction and a thickness direction, respectively, and can include the image sensor 12, the single-line array 14 and the beam-deflecting means 18. The minimum volume can also be considered that the same describes a cuboid spanned by the arrangement and/or operative movement of the image sensor course, the array 14 and/or the beam-deflecting means 18. The array 14 can have a line-extension direction 146 along which the optical channels 16a and 16b are arranged juxta post, possibly parallel to one another. The line-extension direction 146 can be arranged stationary in space.

The virtual cuboid can comprise two sides that run opposite parallel to one another, parallel to the line-extension direction 146 of the single-line array 14 as well as parallel to part of the optical path 17a and/or 17b of the optical channels 16a and 16b, respectively, between the image sensor 12 and the beam-deflecting means 18. Simply put, but without any limiting effect, this could, for example, be a top and a bottom of the virtual cuboid. The two sides can span a first plane 148a and a second plane 148b. This means the two sides of the cuboids can each be part of the plane 148a and 148b, respectively. Further components of the multi-aperture imaging device can be arranged completely but at least partly inside the area between the planes 148a and 148b, such that installation space requirements of the multi-aperture imaging device 180 along a direction parallel to a surface normal of the plane 148a and/or 148b is low, which is advantageous. A volume of the multi-aperture imaging device can have a low or minimum installation space between the planes 148a and 148b. Along the lateral sides or extension directions of the planes 148a and/or 148b, the installation space of the multi-aperture imaging device can be large or of any size. The volume of the virtual cuboid is, for example, influenced by an arrangement of the image sensor 12, the single-line array 14 and the beam-deflecting means 18, wherein the arrangement of these components can be performed according to the embodiments described herein such that the installation space of these components along the direction perpendicular to the planes and hence the distance of the planes 148a and 148b to one another becomes low or minimum. Compared to other arrangements of the components, the volume and/or the distance of other sides of the virtual cuboid can be enlarged.

The multi-aperture imaging device 180 includes an actuator means 152 for generating a relative movement between the image sensor 12, the single-line array 14 and the beam-deflecting means 18. The actuator means 152 is arranged at least partly between the planes 148a and 148b. The actuator means 152 can be configured to move at least one of the image sensor 12, the single-line array 14 or the beam-deflecting means 18 rotationally around at least one axis and/or translationally along one or several directions. For this, the actuator means 152 can comprise at least one actuator, such as the actuator 128i, 132i and 134 for channel individually changing a relative position between the image sensor area 58i of a respective optical channel 16i, the optics 64i of the respective optical channel 16i and the beam-deflecting means 18 and the respective segment 68i of the same, respectively, or for channel individually changing an optical characteristic 16i or an optical characteristic of the segment 68i of the beam-deflecting means 18 concerning the deflection of the optical path of the respective optical channel. Alternatively or additionally, the actuator means can implement autofocus and/or optical image stabilization as described above.

The actuator means 152 can have a dimension or extension 154 parallel to the thickness direction. A proportion of at the most 50%, at the most 30% or at the most 10% of the dimension 154 can project beyond the plane 148a and/or 148b starting from an area between the planes 148a and 148b or can project from the area. This means that the actuator means 152 at the most projects insignificantly beyond the plane 148a and/or 148b. According to embodiments, the actuator means 152 does not project beyond the planes 148a and 148b. It is an advantage that an extension of the multi-aperture imaging device 180 along the thickness direction is not enlarged by the actuator means 152.

Based on FIG. 26a-e, advantageous implementations of a beam-deflecting means 18 will be described. The statements show a series of advantages that can be executed individually or in any combination, but are not to have any limiting effect.

Figure 26A:
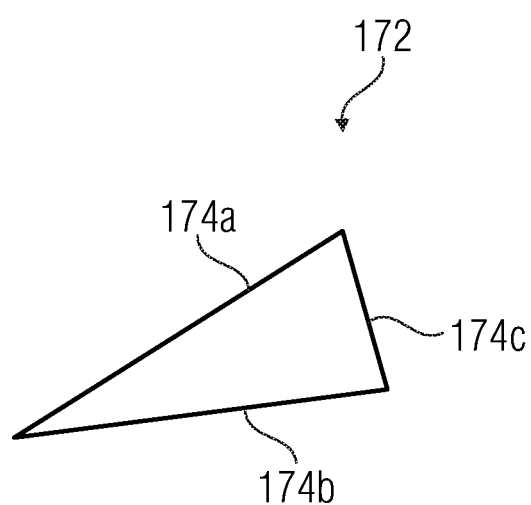

FIG. 26a shows a schematic side sectional view of the beam-deflecting element 172 as it can be used for a beam-deflecting means described herein, such as the beam-deflecting means 18 of FIGS. 1, 2, 3a, 3b, 4a, 4b, 5, 6b, 6c or in devices according to FIGS. 7a and/or 7b. The configuration, however, can also be combined with the embodiments of the beam-deflecting means according to the further Figures.

The beam-deflecting element 172 can be effective for one, a plurality or all of the optical channels 16a-d and can have a polygonal cross-section. Although a triangular cross-section is shown, it can also be any other polygon. Alternatively or additionally, the cross-section can also have at least one bent surface, wherein in particular in reflective surfaces a configuration that is planar at least in portions in order to prevent imaging errors can be advantageous.

The beam-deflecting element 172 comprises, for example, a first side 174a, a second side 174b and a third side 174c. At least two sides, such as the sides 174a and 174b are formed reflectively, such that the beam-deflecting element 172 is reflective on both sides. The sides 174a and 174b can be main sides of the beam-deflecting element 172, i.e. sides whose area is greater than the side 174c.

In other words, the beam-deflecting element 172 can be wedge-shaped and can be reflective on both sides. A further area can be arranged opposite to the area 174c, i.e. between areas 174a and 174b, which is, however, significantly smaller than the area 174c. In other words, the wedge formed by the areas 174a, b and c is not tapering in any manner but is provided with an area on the pointed side and is hence truncated.

Figure 26B:
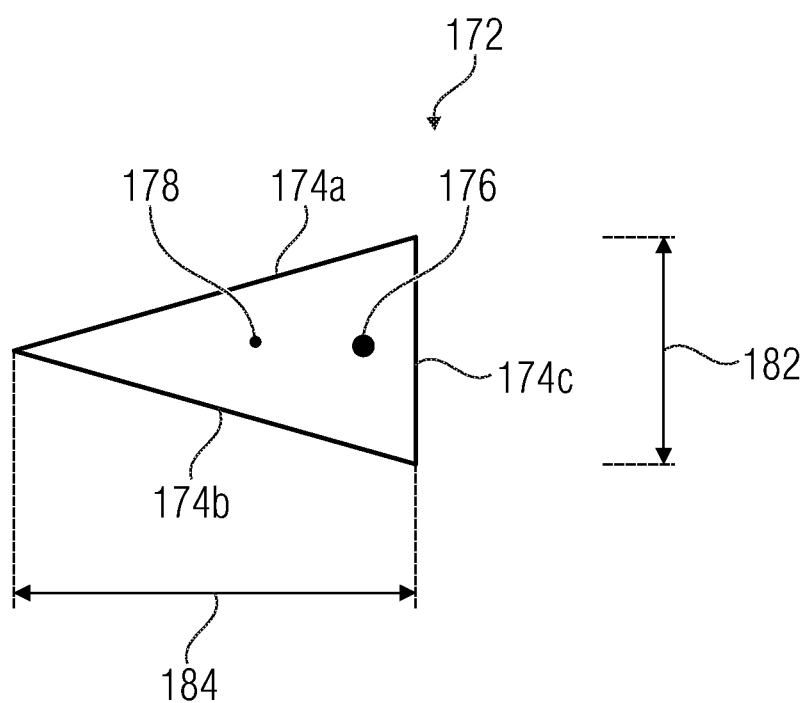

FIG. 26b shows a schematic side sectional view of the beam-deflecting element 172, wherein a suspension or displacement axis 176 of the beam-deflecting element 172 is described. The displacement axis 176, around which the beam-deflecting element 172 can be rotationally and/or translationally moved in the beam-deflecting means 18 can be displaced off-center with regard to a centroid 178 of the cross-section. The centroid can alternatively also be a point describing the dimension of the beam-deflecting element 172 in halves along a thickness direction 182 and along a direction 184 perpendicular thereto.

The displacement axis can, for example, be unamended along a thickness direction 182 and can have any offset in a direction perpendicular thereto. Alternatively, an offset along the thickness direction 182 is also possible. The displacement can be performed, for example, such that when rotating the beam-deflecting element 172 around the displacement axis 176, a greater actuator path is obtained than when rotating around the centroid 178. In this way, by displacing the displacement axis 176, the path by which the edge is moved between the sides 174a and 174b during rotation can be increased compared to a rotation around the centroid 178, with the same angle of rotation. Advantageously, the beam-deflecting element 172 is arranged such that the edge, i.e., the pointed side of the wedge-shaped cross-section, is facing the image sensor between sides 174a and 174b. By small rotational movements, a respective different side 174a or 174b can deflect the optical path of the optical channels. Here, it becomes clear that the rotation can be performed such that spatial requirements of the beam-deflecting means along the thickness direction 182 are low since a movement of the beam-deflecting element 172, such that a main side is perpendicular to the image sensor, is not necessitated.

The side 174c can also be referred to as secondary side or rear side. Several beam-deflecting elements can be connected to one another such that a connecting element is arranged on the side 174c or passes through the cross-section of the beam-deflecting elements, i.e., is arranged inside the beam-deflecting elements, for example in the area of the displacement axis 176. In particular, the holding element can be arranged such that the same projects not or only to a low extent, i.e., at the most 50%, at the most 30% or at the most 10% beyond the beam-deflecting element 172 along the direction 182, such that the holding element does not increase or determine the extension of the total structure along the direction 182. The extension in the thickness direction 182 can alternatively be determined by the lenses of the optical channels, i.e., the same have the dimension defining the minimum of the thickness.

The beam-deflecting element 172 can be formed of glass, ceramics, glass ceramics, plastic, metal or a combination of these materials and/or further materials.

In other words, the beam-deflecting element 172 can be arranged such that the tip, i.e., the edge between the main sides 174a and 174b points to the image sensor. Holding of the beam-deflecting elements can be such that the same are merely held on the rear side or inside the beam-deflecting elements, i.e., the main sides are not covered. A common holding or connecting element can extend beyond the rear side 174c. The axis of rotation of the beam-deflecting element 172 can be arranged off-center.

FIG. 26c shows a schematic perspective view of a multi-aperture imaging device 190 including an image sensor 12 and a single-line array 14 of juxtaposed optical channels 16a-d. The beam-deflecting means 18 includes a number of beam-deflecting elements 172a-d that can correspond to the number of optical channels. Alternatively, a lower number of beam-deflecting elements can be arranged, for example when at least one beam-deflecting element is used by two optical channels. Alternatively, a higher number can be arranged, for example when switching the deflecting means of the beam-deflecting means 18 is performed by translational movement as described in the context of FIGS. 4a and 4b. Each beam-deflecting element 172a-d can be allocated to an optical channel 16a-d. The beam-deflecting elements 172a-d can be formed as a plurality of elements 172 according to FIG. 4c and FIG. 4d. Alternatively, at least two, several or all beam-deflecting elements 172a-d can be formed integrally.

Figure 26D:
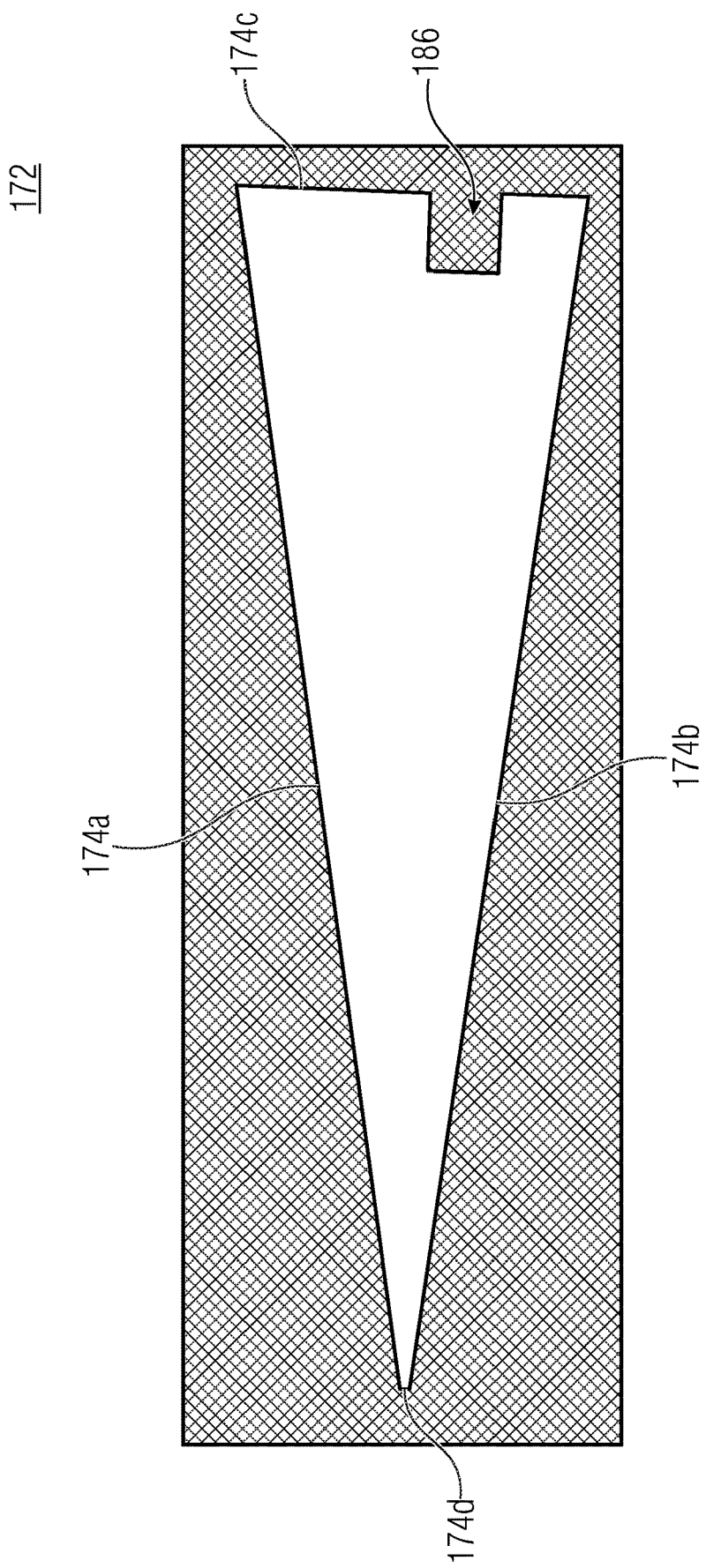

FIG. 26d shows a schematic side-sectional view of the beam-deflecting element 172 in which the cross-section is formed as a free-form area. In this way, the side 174c can comprise a recess 186 allowing mounting of a holding element, wherein the recess 186 can also be formed as projecting element, such as a tongue of a groove and tongue system. Further, the cross-section comprises a fourth side 174d that has a smaller area extension than the main sides 174a and 174b and connects the same to one another.

FIG. 26e shows a schematic side-sectional view of a first beam-deflecting element 172a and a second beam-deflecting element 172 behind the same in the illustration direction. Here, the recesses 186a and 186b can be arranged such that the same are essentially congruent, such that an arrangement of a connecting element in the recesses is enabled.

FIG. 26f shows a schematic perspective view of the beam-deflecting means 18 including, for example, four beam-deflecting elements 172a-d that are connected to a connecting element 188. The connecting element can be used in order to be translationally and/or rotationally moveable by an actuator. The connecting element 188 can be formed integrally and can run across an extension direction, for example the y-direction in FIG. 4e on or in the beam-deflecting elements 172a-d. Alternatively, the connecting element 188 can also be merely connected to at least one side of the beam-deflecting means 18, for example when the beam-deflecting elements 172a-d are integrally formed. Alternatively, a connection to an actuator and/or a connection of the beam-deflecting elements 172a-d can also be established in any other way, for example by means of adhering, bonding or soldering.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A multi-aperture imaging device comprising:
at least one image sensor; and
an array of juxtaposed optical channels, wherein each optical channel comprises optics for projecting at least one partial area of an object area on an image sensor area of the at least one image sensor;
a beam deflector for deflecting an optical path of the optical channels in beam-deflecting areas of the beam deflector;
wherein the beam deflector is formed as an array of facets arranged along a line-extension direction of the array of optical channels and wherein one facet is allocated to each optical channel and wherein each facet comprises at least one beam-deflecting area;
wherein a stray light suppressing structure is arranged between a first beam-deflecting area of a first facet and a second beam-deflecting area of a juxtaposed second facet, which is configured to reduce transition of stray light between the first beam-deflecting area and the second beam-deflecting area.

2. The multi-aperture imaging device according to claim 1, wherein the stray light suppressing structure is arranged on a main side of the beam deflector.

3. The multi-aperture imaging device according to claim 1, wherein the stray light suppressing structure is elevated with respect to the topography of the first or second facet.

4. The multi-aperture imaging device according to claim 1, wherein the stray light suppressing structure comprises a topography with respect to the first or second facets that comprises a polygonal chain.

5. The multi-aperture imaging device according to claim 4, wherein the polygonal chain comprises a portion that runs essentially parallel to a juxtaposed at least partly transparent cover of the multi-aperture imaging device during operation of the multi-aperture imaging device, wherein the beam deflector is configured to deflect the optical channels through the at least partly transparent cover and wherein the at least partly transparent cover forms a housing part of the multi-aperture imaging device.

6. The multi-aperture imaging device according to claim 5, wherein the beam deflector comprises a first position and a second position between which the beam deflector is movable, wherein the beam deflector is configured to deflect the optical path of each optical channel in the first position and in the second position in differing directions; wherein the polygonal chain is a first polygonal chain arranged on a first main side of the beam deflector, wherein the at least partly transparent cover is a first at least partly transparent cover that is arranged facing the first main side and wherein a second polygonal chain of the stray light suppressing structure or a further stray light suppressing structure is arranged on a second main side of the beam deflector and runs parallel to a juxtaposed second at least partly transparent cover of the multi-aperture imaging device in the second position, wherein the beam deflector is configured to deflect the optical channels in the second position through the second at least partly transparent cover and wherein the second at least partly transparent cover forms a housing part of the multi-aperture imaging device.

7. The multi-aperture imaging device according to claim 1, wherein the stray light suppressing structure extends along a direction perpendicular to the line-extension direction on a main side of the beam deflector to an extent of at least 30% of the extension of the beam deflector.

8. The multi-aperture imaging device according to claim 1, wherein the stray light suppressing structure is formed as continuous structure and extends along a direction perpendicular to the line-extension direction on a main side of the beam deflector to an extent of at least 95% of the extension of the beam deflector.

9. The multi-aperture imaging device according to claim 1, wherein the stray light suppressing structure comprises at least one of a metal material, a plastic material and/or a semi-conductor material.

10. The multi-aperture imaging device according to claim 1, wherein the stray light suppressing structure is arranged spaced-apart from a housing of the multi-aperture imaging device in an operating state of the multi-aperture imaging device.

11. The multi-aperture imaging device according to claim 1, wherein the beam deflector comprises a first position and a second position between which the beam deflector is movable, wherein the beam deflector is configured to deflect the optical path of each optical channel in a differing direction in the first position and in the second position.

12. The multi-aperture imaging device according to claim 11, wherein the beam deflector is rotationally moveable around an axis of rotation between the first position and the second position.

13. The multi-aperture imaging device according to claim 11, wherein the beam deflector comprises a first reflective main side and a second reflective main side, wherein in the first position the first reflective side is arranged facing the at least one image sensor and in the second position the second reflective side is arranged facing the at least one image sensor.

14. The multi-aperture imaging device according to claim 13, wherein the stray light suppressing structure is a first stray light suppressing structure that is arranged on the first main side of the beam deflector, and wherein a third stray light suppressing structure is arranged on the second main side between a third beam-deflecting area of a third facet and a fourth beam-deflecting area of a fourth facet.

15. The multi-aperture imaging device according to claim 14, wherein the first stray light suppressing structure and the third stray light suppressing structure are formed integrally.

16. The multi-aperture imaging device according to claim 3, wherein the stray light suppressing structure is a first stray light suppressing structure and is connected to an adjacent second stray light suppressing structure between the second beam-deflecting area and the third beam-deflecting area of a third facet arranged adjacent to the second facet, via a ridge that extends on a side of the beam deflector facing the optics.

17. The multi-aperture imaging device according to claim 16, wherein the ridge is formed integrally with the first or second stray light suppressing structure.

18. The multi-aperture imaging device according to claim 16, wherein the ridge is arranged such that the optical path of an optical channel is arranged in an area between the array and the beam deflector between the ridge and an exit side of the multi-aperture imaging device, wherein the exit side is a side of the multi-aperture imaging device through which the optical path passes when the same is deflected by the beam deflector.

19. The multi-aperture imaging device according to claim 1, wherein the beam deflector is connected to an at least partly transparent cover, wherein the transparent cover is moved at least partly out of the housing during movement of the beam deflector from the first position to the second position, wherein the beam deflector is configured to deflect the optical paths of the optical channels such that the optical channels pass through the transparent cover.

20. The multi-aperture imaging device according to claim 1, wherein the beam deflector is configured to deflect the optical path of the optical channels in a first position such that the same passes through a first at least partly transparent cover and to deflect the optical path of the optical channels in a second position such that the same passes through a second at least partly transparent area.

21. The multi-aperture imaging device according to claim 20, wherein a first diaphragm is configured to optically close the first at least partly transparent cover in the second position at least partly, and wherein a second diaphragm is configured to optically close the second at least partly transparent cover in the first position at least partly, at least at times.

22. The multi-aperture imaging device according to claim 21, wherein the first diaphragm and/or the second diaphragm is formed as electrochromic diaphragm.

23. The multi-aperture imaging device according to claim 21, wherein a first diaphragm and the second diaphragm is effective for at least two optical channels of the multi-aperture imaging device.

24. The multi-aperture imaging device according to claim 20, wherein the stray light suppressing structure is arranged in the first position and in the second position of the beam deflector in a contactless manner with respect to a housing of the multi-aperture imaging device.

25. The multi-aperture imaging device according to claim 1, wherein at least two optical channels are allocated to one facet.

26. The multi-aperture imaging device according to claim 1, further comprising an optical image stabilizer comprising a joint effect for two, a plurality or all optical paths of the optical channels for image stabilization along a first image axis and a second image axis by generating a translational relative movement between the at least one image sensor and the array or the beam deflector, wherein the translational movement runs parallel to a first image axis and a second image axis of an image captured by the multi-aperture imaging device.

27. The multi-aperture imaging device according to claim 1, further comprising an optical image stabilizer comprising a joint effect for two, a plurality or all optical paths of the optical channels for image stabilization along a first image axis by generating a translational relative movement between the at least one image sensor and the array and for image stabilization along a second image axis by generating a rotational movement of the beam deflector.

28. The multi-aperture imaging device according to claim 26, wherein the optical image stabilizer comprises at least one actuator and is arranged such that the same is arranged at least partly between two planes that are spanned by sides of a cuboid, wherein the sides of the cuboid are oriented parallel to one another as well as to a line-extension direction of the array and part of the optical path of the optical channels between the at least one image sensor and the optics and whose volume is minimal and still comprises the at least one image sensor and the array.

29. The multi-aperture imaging device according to claim 28, wherein the image stabilizer projects by at the most 50% out of an area between the planes.

30. The multi-aperture imaging device according to claim 1, further comprising a focuser comprising at least one actuator for adjusting a focus of the multi-aperture imaging device that is configured to provide a relative movement between at least one optics of one of the optical channels and the at least one image sensor.

31. The multi-aperture imaging device according to claim 30, wherein the focuser is arranged such that the same is arranged at least partly between two planes that are spanned by sides of a cuboid, wherein the sides of the cuboid are oriented parallel to one another as well as to a line-extension direction of the array and part of the optical path of the optical channels between the at least one image sensor and the optics and whose volume is minimal and still comprises the at least one image sensor and the array.

32. The multi-aperture imaging device according to claim 30, wherein the focuser is configured to commonly adjust the focus for all optical channels.

33. The multi-aperture imaging device according to claim 1, wherein each partial area of the object area is projected on at least two image sensor areas by at least two optical channels.

34. The multi-aperture imaging device according to claim 1, wherein a total amount of the optical channels of the array projects a total amount of partial areas of the object area on a total amount of image sensor areas of the at least one image sensor and wherein the total amount of the partial areas completely projects the object area to be captured.

35. The multi-aperture imaging device according to claim 1, wherein the array for capturing the object area is formed as a single line.

36. An imaging system with a multi-aperture imaging device according to claim 1.

37. The imaging system according to claim 36, comprising at least a first and at least a second multi-aperture imaging device according to claim 1.

38. The imaging system according to claim 37, further comprising for the first and second multi-aperture imaging device at least one of:
- a common image sensor;
- a common focuser comprising at least one actuator for commonly adjusting a focus of the first and second multi-aperture imaging devices;
- an optical image stabilizer comprising a joint effect for at least one optical path of the first multi-aperture imaging device and for at least one optical path of the second multi-aperture imaging device for image stabilization along a first image axis and a second image axis by generating a translational relative movement between the common image sensor and the array or the beam deflector of the first or second multi-aperture imaging devices; and
- a common beam deflector arranged between the array of the first and second multi-aperture imaging devices and the object area and configured to deflect an optical path of the optical channels of the first and second multi-aperture imaging devices.

39. The imaging system according to claim 38, comprising an optical image stabilizer comprising a joint effect for the at least one optical path of the first multi-aperture imaging device and for the at least one optical path of the second multi-aperture imaging device, wherein the optical image stabilizer is configured to generate a translational relative movement between the common image sensor and the array for image stabilization along a first image axis and to generate a rotational movement of the beam deflector of the first multi-aperture imaging device or the beam deflector of the second multi-aperture imaging device for image stabilization along the second image axis.

40. The imaging system according to claim 36 that is configured as a mobile phone, smartphone, tablet or monitor.

41. A method for capturing an object area, comprising:
providing an image sensor;
projecting an object area with an array of juxtaposed optical channels, wherein each optical channel comprises optics for projecting at least one partial area of an object area on an image sensor area of the image sensor;
deflecting an optical path of the optical channels in beam-deflecting areas of a beam deflector that is formed as an array of facets arranged along a line-extension direction of the array of optical channels and wherein one facet is allocated to each optical channel and wherein each facet comprises a beam-deflecting area; and
reducing transition of stray light between a first beam-deflecting area of a first facet and a second beam-deflecting area of a second facet by arranging a stray light suppressing structure between the first beam-deflecting area and the second beam-deflecting area.

* * * * *